US008625875B2

(12) United States Patent
Csulits et al.

(10) Patent No.: US 8,625,875 B2
(45) Date of Patent: Jan. 7, 2014

(54) DOCUMENT IMAGING AND PROCESSING SYSTEM FOR PERFORMING BLIND BALANCING AND DISPLAY CONDITIONS

(75) Inventors: Frank M. Csulits, Gurnee, IL (US);
Matthew Anderson, Salem, WI (US);
John R. Blake, St. Charles, IL (US);
Curtis W. Hallowell, Palatine, IL (US);
Robert J. Klein, Chicago, IL (US);
Douglas U. Mennie, Barrington, IL (US); Gary Watts, Buffalo Grove, IL (US)

(73) Assignee: Cummins-Allison Corp., Mt. Prospect, IL (US)

( * ) Notice: Subject to any disclaimer, the term of this patent is extended or adjusted under 35 U.S.C. 154(b) by 0 days.

(21) Appl. No.: 13/402,633

(22) Filed: Feb. 22, 2012

(65) Prior Publication Data

US 2012/0150745 A1 Jun. 14, 2012

Related U.S. Application Data

(63) Continuation of application No. 12/044,720, filed on Mar. 7, 2008, now Pat. No. 8,204,293.

(60) Provisional application No. 60/905,965, filed on Mar. 9, 2007, provisional application No. 61/022,752, filed on Jan. 22, 2008.

(51) Int. Cl.
*G06K 9/00* (2006.01)
*G06Q 40/00* (2012.01)

(52) U.S. Cl.
USPC .............. 382/135; 382/318; 705/39; 235/379

(58) Field of Classification Search
USPC ......................................................... 382/135
See application file for complete search history.

(56) References Cited

U.S. PATENT DOCUMENTS

| 2,669,998 A | 2/1954 | Buchholz ........................ 133/8 |
| 2,750,949 A | 6/1956 | Kulo et al. ....................... 133/8 |
| 2,835,260 A | 5/1958 | Buchholz ........................ 133/8 |

(Continued)

FOREIGN PATENT DOCUMENTS

| CA | 2 624 638 A1 | 12/2007 | ............ B65H 29/12 |
| CA | 2 684 159 A1 | 4/2010 | ............ G07D 11/00 |

(Continued)

OTHER PUBLICATIONS

Andy Pargh, "Vending Machines Dispense New Tricks It's a Breeze. Just Drop in Your Money and Create a Card, Buy a Ticket or Even Pose for a Photo on the Moon.; [3 Star Editiion]." Orlando Sentinel, Orlando, Fla., Nov. 1, 1993, p. D2, ProQuest Oct. 19, 2010, 2 pages.

(Continued)

*Primary Examiner* — David Zarka
(74) *Attorney, Agent, or Firm* — Nixon Peabody LLP

(57) ABSTRACT

A document processing system comprising one or more document scanning devices that extract information from document images that uniquely identify a document. The system further comprises a central processor remotely connected to the document scanning devices. The central processor is configured to receive the document images and the extracted information from the document scanning devices and is further configured to execute a correction routine configured to adjust errors in the extracted information from the document image.

88 Claims, 25 Drawing Sheets

(56) References Cited

U.S. PATENT DOCUMENTS

| | | | | |
|---|---|---|---|---|
| 2,936,684 A | 5/1960 | Simjian | | 95/1.1 |
| 3,104,314 A | 9/1963 | Simjian | | 235/61.9 |
| 3,148,932 A | 9/1964 | Simjian | | 346/22 |
| 3,150,912 A | 9/1964 | Simjian | | 346/22 |
| 3,246,295 A | 4/1966 | DeClaris et al. | | 340/146.3 |
| 3,280,974 A | 10/1966 | Riddle et al. | | 209/111.8 |
| 3,443,107 A | 5/1969 | Modglin | | 250/219 |
| 3,480,785 A | 11/1969 | Aufderheide | | 250/219 |
| 3,496,370 A | 2/1970 | Haville et al. | | 250/219 |
| 3,509,535 A | 4/1970 | Berube | | 340/149 |
| 3,612,835 A | 10/1971 | Andrews et al. | | 235/61.11 D |
| 3,618,765 A | 11/1971 | Cooper et al. | | 209/122 |
| 3,656,615 A | 4/1972 | Ptacek | | 209/73 |
| 3,679,314 A | 7/1972 | Mustert | | 356/71 |
| 3,715,031 A | 2/1973 | Okkonen | | 209/75 |
| 3,725,667 A | 4/1973 | Schwartz | | 250/219 |
| 3,764,899 A | 10/1973 | Peterson et al. | | 324/61 |
| 3,778,628 A | 12/1973 | Novak et al. | | 250/556 |
| 3,782,543 A | 1/1974 | Martelli et al. | | 209/75 |
| 3,798,603 A | 3/1974 | Wahlberg | | 340/149 |
| 3,800,078 A | 3/1974 | Cochran et al. | | 178/7.1 |
| 3,806,710 A | 4/1974 | Shigemori et al. | | 235/92 |
| 3,815,021 A | 6/1974 | Kerr | | 324/61 R |
| 3,842,281 A | 10/1974 | Goodrich | | 250/461 |
| 3,870,629 A | 3/1975 | Carter et al. | | 209/111.8 |
| 3,906,449 A | 9/1975 | Marchak | | 340/149 |
| 3,930,582 A | 1/1976 | Gartner et al. | | 209/88 |
| 3,966,047 A | 6/1976 | Steiner | | 209/75 |
| 3,976,198 A | 8/1976 | Carnes, Jr. et al. | | 209/111.7 T |
| 4,023,011 A | 5/1977 | Nakajima et al. | | 235/61.11 R |
| 4,027,142 A | 5/1977 | Paup et al. | | 235/61.9 R |
| 4,040,010 A | 8/1977 | Crane | | 340/146.3 SY |
| 4,041,456 A | 8/1977 | Ott et al. | | 340/146.3 R |
| 4,096,991 A | 6/1978 | Iguchi | | 235/419 |
| 4,109,238 A | 8/1978 | Creekmore | | 340/149 A |
| 4,114,027 A | 9/1978 | Slater | | 235/419 |
| 4,114,804 A | 9/1978 | Jones et al. | | 235/476 |
| 4,147,430 A | 4/1979 | Gorgone et al. | | 356/51 |
| 4,166,945 A | 9/1979 | Inoyama et al. | | 235/379 |
| 4,179,685 A | 12/1979 | O'Maley | | 340/146.3 H |
| 4,180,798 A | 12/1979 | Komori et al. | | 340/146.3 H |
| 4,187,463 A | 2/1980 | Kivenson | | 324/228 |
| 4,187,498 A | 2/1980 | Creekmore | | 340/149 A |
| 4,197,986 A | 4/1980 | Nagata | | 235/379 |
| 4,201,978 A | 5/1980 | Nally | | 340/146.3 C |
| 4,205,780 A | 6/1980 | Burns et al. | | 235/454 |
| 4,231,014 A | 10/1980 | Ponzio | | 340/146.3 Y |
| 4,231,561 A | 11/1980 | Kaneko et al. | | 271/3.1 |
| 4,237,378 A | 12/1980 | Jones | | 250/223 R |
| 4,250,806 A | 2/1981 | Boyson et al. | | 101/2 |
| 4,255,651 A | 3/1981 | Phillips | | 235/92 SB |
| 4,264,808 A | 4/1981 | Owens et al. | | 235/379 |
| 4,275,874 A | 6/1981 | DiBlasio | | 271/4 |
| 4,277,774 A | 7/1981 | Fujii et al. | | 340/146.3 Q |
| 4,283,708 A | 8/1981 | Lee | | 340/146.3 Z |
| 4,288,781 A | 9/1981 | Sellner et al. | | 340/146.3 Q |
| 4,302,781 A | 11/1981 | Ikeda et al. | | 358/288 |
| 4,310,885 A | 1/1982 | Azcua et al. | | 364/405 |
| 4,311,914 A | 1/1982 | Huber | | 250/556 |
| 4,313,598 A | 2/1982 | DiBlasio | | 271/124 |
| 4,326,636 A | 4/1982 | Kawakami | | 209/534 |
| 4,334,619 A | 6/1982 | Horino et al. | | 209/551 |
| 4,337,864 A | 7/1982 | McLean | | 209/534 |
| 4,348,656 A | 9/1982 | Gorgone et al. | | 340/146.3 R |
| 4,349,111 A | 9/1982 | Shah et al. | | 209/534 |
| 4,352,988 A | 10/1982 | Ishida | | 250/559 |
| 4,355,300 A | 10/1982 | Weber | | 340/146.3 C |
| 4,355,369 A | 10/1982 | Garvin | | 364/900 |
| 4,356,473 A | 10/1982 | Freudenthal | | 340/146.3 H |
| 4,360,034 A | 11/1982 | Davila et al. | | 133/3 D |
| 4,381,447 A | 4/1983 | Horvath et al. | | 250/223 R |
| 4,383,540 A | 5/1983 | De Meyer et al. | | 133/3 H |
| 4,386,432 A | 5/1983 | Nakamura et al. | | 382/7 |
| 4,396,902 A | 8/1983 | Warthan et al. | | 382/64 |
| 4,416,299 A | 11/1983 | Bergman | | 133/1 R |
| 4,420,153 A | 12/1983 | Winkler et al. | | 271/304 |
| 4,435,834 A | 3/1984 | Pauli et al. | | 382/7 |
| 4,441,205 A | 4/1984 | Berkin et al. | | 382/8 |
| 4,442,541 A | 4/1984 | Finkel et al. | | 382/7 |
| 4,449,240 A | 5/1984 | Yoshida | | 382/15 |
| 4,461,028 A | 7/1984 | Okubo | | 382/15 |
| 4,464,786 A | 8/1984 | Nishito et al. | | 382/7 |
| 4,464,787 A | 8/1984 | Fish et al. | | 382/7 |
| RE31,692 E | 10/1984 | Tyburski et al. | | 382/7 |
| 4,479,049 A | 10/1984 | Hirose | | 235/379 |
| 4,480,177 A | 10/1984 | Allen | | 235/379 |
| 4,482,058 A | 11/1984 | Steiner | | 209/534 |
| 4,487,306 A | 12/1984 | Nao et al. | | 194/4 C |
| 4,490,846 A | 12/1984 | Ishida et al. | | 382/7 |
| 4,513,439 A | 4/1985 | Gorgone et al. | | 382/7 |
| 4,521,008 A | 6/1985 | Granzow et al. | | 271/3 |
| 4,523,330 A | 6/1985 | Cain | | 382/7 |
| 4,530,067 A | 7/1985 | Dorr | | 364/900 |
| 4,538,719 A | 9/1985 | Gray et al. | | 194/100 A |
| 4,539,702 A | 9/1985 | Oka | | 382/7 |
| 4,542,829 A | 9/1985 | Emery et al. | | 209/534 |
| 4,543,969 A | 10/1985 | Rasmussen | | 133/3 A |
| 4,544,266 A | 10/1985 | Antes | | 356/71 |
| 4,547,896 A | 10/1985 | Ohtombe et al. | | 382/7 |
| 4,553,222 A | 11/1985 | Kurland et al. | | 364/900 |
| 4,553,846 A | 11/1985 | Hilton et al. | | 356/429 |
| 4,556,140 A | 12/1985 | Okada | | 194/4 C |
| 4,558,224 A | 12/1985 | Gober | | 250/461.1 |
| 4,559,451 A | 12/1985 | Curl | | 250/560 |
| 4,563,771 A | 1/1986 | Gorgone et al. | | 382/7 |
| 4,567,370 A | 1/1986 | Falls | | 250/461.1 |
| 4,569,421 A | 2/1986 | Sandstedt | | 186/39 |
| 4,582,172 A | 4/1986 | Takeuchi et al. | | 186/38 |
| 4,584,529 A | 4/1986 | Aoyama | | 324/261 |
| 4,587,412 A | 5/1986 | Apisdorf | | 235/449 |
| 4,587,434 A | 5/1986 | Roes et al. | | 250/556 |
| 4,590,606 A | 5/1986 | Rohrer | | 382/7 |
| 4,592,090 A | 5/1986 | Curl et al. | | 382/7 |
| 4,593,184 A | 6/1986 | Bryce | | 235/449 |
| 4,594,664 A | 6/1986 | Hashimoto | | 364/405 |
| 4,602,332 A | 7/1986 | Hirose et al. | | 364/408 |
| 4,605,926 A | 8/1986 | Onishi et al. | | 340/825.3 |
| 4,611,345 A | 9/1986 | Ohnishi et al. | | 382/7 |
| 4,617,457 A | 10/1986 | Granzow et al. | | 235/379 |
| 4,617,458 A | 10/1986 | Bryce | | 235/449 |
| 4,628,194 A | 12/1986 | Dobbins et al. | | 235/379 |
| 4,630,813 A | 12/1986 | Watanabe et al. | | 271/227 |
| 4,645,936 A | 2/1987 | Gorgone | | 250/556 |
| 4,653,647 A | 3/1987 | Hashimoto | | 209/534 |
| 4,658,289 A | 4/1987 | Nagano et al. | | 358/75 |
| 4,676,343 A | 6/1987 | Humble et al. | | 186/61 |
| 4,677,682 A | 6/1987 | Miyagawa et al. | | 382/7 |
| 4,678,072 A | 7/1987 | Kobayashi et al. | | 194/206 |
| 4,680,803 A | 7/1987 | Dilella | | 382/9 |
| 4,685,141 A | 8/1987 | Hoque et al. | | 382/7 |
| 4,686,357 A | 8/1987 | Douno et al. | | 235/379 |
| 4,694,963 A | 9/1987 | Takesako | | 209/534 |
| 4,697,071 A | 9/1987 | Hiraoka et al. | | 235/379 |
| 4,700,368 A | 10/1987 | Munn et al. | | 377/8 |
| 4,716,456 A | 12/1987 | Hosaka | | 358/75 |
| 4,733,308 A | 3/1988 | Nakamura et al. | | 358/288 |
| 4,735,289 A | 4/1988 | Kenyon | | 186/37 |
| 4,743,743 A | 5/1988 | Fukatsu | | 235/379 |
| 4,743,974 A | 5/1988 | Lockwood | | 358/285 |
| 4,748,679 A | 5/1988 | Gold et al. | | 382/61 |
| 4,749,087 A | 6/1988 | Buttifant | | 209/534 |
| 4,753,625 A | 6/1988 | Okada | | 453/32 |
| 4,764,725 A | 8/1988 | Bryce | | 324/234 |
| 4,764,976 A | 8/1988 | Kallin et al. | | 382/65 |
| 4,768,100 A | 8/1988 | Kunishima et al. | | 358/285 |
| 4,774,663 A * | 9/1988 | Musmanno et al. | | 705/36 R |
| 4,782,328 A | 11/1988 | Denlinger | | 340/365 P |
| 4,784,274 A | 11/1988 | Mori et al. | | 209/534 |
| 4,803,347 A | 2/1989 | Sugahara et al. | | 235/379 |
| 4,806,709 A | 2/1989 | Evans | | 179/19 |
| 4,811,004 A | 3/1989 | Person et al. | | 340/712 |
| 4,817,176 A | 3/1989 | Marshall et al. | | 382/43 |
| 4,821,332 A | 4/1989 | Durham | | 382/7 |
| 4,823,393 A | 4/1989 | Kawakami | | 382/7 |

(56) References Cited

U.S. PATENT DOCUMENTS

| | | | |
|---|---|---|---|
| 4,825,246 A | 4/1989 | Fukuchi et al. | 355/4 |
| 4,827,531 A | 5/1989 | Milford | 382/29 |
| 4,837,842 A | 6/1989 | Holt | 382/26 |
| 4,841,358 A | 6/1989 | Kammoto et al. | 358/75 |
| 4,843,219 A | 6/1989 | Franchi | 235/379 |
| 4,851,616 A | 7/1989 | Wales et al. | 178/18 |
| 4,877,230 A | 10/1989 | Winkler et al. | 271/3 |
| 4,880,096 A | 11/1989 | Kobayashi et al. | 194/206 |
| 4,881,268 A | 11/1989 | Uchida et al. | 382/7 |
| 4,883,181 A | 11/1989 | Yoshikawa | 209/534 |
| 4,888,812 A | 12/1989 | Dinan et al. | 382/7 |
| 4,903,953 A | 2/1990 | Winkler et al. | 271/4 |
| 4,905,839 A | 3/1990 | Yuge et al. | 209/534 |
| 4,905,840 A | 3/1990 | Yuge et al. | 209/534 |
| 4,908,516 A | 3/1990 | West | 250/556 |
| 4,922,109 A | 5/1990 | Bercovitz et al. | 250/556 |
| 4,928,094 A | 5/1990 | Smith | 340/712 |
| 4,931,782 A | 6/1990 | Jackson | 340/706 |
| 4,947,441 A | 8/1990 | Hara et al. | 382/7 |
| 4,948,174 A | 8/1990 | Thomson et al. | 283/58 |
| 4,954,697 A | 9/1990 | Kokubun et al. | 235/381 |
| 4,958,235 A | 9/1990 | Sims et al. | 358/402 |
| 4,960,981 A | 10/1990 | Benton et al. | 235/379 |
| 4,970,655 A | 11/1990 | Winn et al. | 364/479 |
| 4,973,851 A | 11/1990 | Lee | 250/556 |
| 4,980,543 A | 12/1990 | Hara et al. | 235/379 |
| 4,984,280 A | 1/1991 | Abe | 382/7 |
| 4,992,860 A | 2/1991 | Hamaguchi et al. | 358/75 |
| 4,996,604 A | 2/1991 | Ogawa et al. | 358/474 |
| 5,001,766 A | 3/1991 | Baird | 382/290 |
| 5,010,238 A | 4/1991 | Kadono et al. | 235/379 |
| 5,023,782 A | 6/1991 | Lutz et al. | 364/405 |
| 5,025,483 A | 6/1991 | Dinan et al. | 382/58 |
| 5,027,415 A | 6/1991 | Hara et al. | 382/7 |
| 5,040,226 A | 8/1991 | Elischer et al. | 382/7 |
| 5,047,871 A | 9/1991 | Meyer et al. | 358/486 |
| 5,053,607 A | 10/1991 | Carlson et al. | 705/18 |
| 5,054,621 A | 10/1991 | Murphy et al. | 209/534 |
| 5,055,834 A | 10/1991 | Chiba | 340/825.34 |
| 5,063,599 A | 11/1991 | Concannon et al. | 382/7 |
| 5,064,999 A | 11/1991 | Okamoto et al. | 235/379 |
| 5,068,519 A | 11/1991 | Bryce | 235/449 |
| 5,076,441 A | 12/1991 | Gerlier | 209/534 |
| 5,091,961 A | 2/1992 | Baus, Jr. | 382/7 |
| 5,097,517 A | 3/1992 | Holt | 382/7 |
| 5,105,364 A | 4/1992 | Kawamura et al. | 364/478 |
| 5,105,601 A | 4/1992 | Horiguchi et al. | 53/465 |
| 5,114,381 A | 5/1992 | Ueda et al. | 453/57 |
| 5,119,433 A | 6/1992 | Will | 382/7 |
| 5,120,944 A | 6/1992 | Kern et al. | 235/379 |
| 5,122,754 A | 6/1992 | Gotaas | 324/676 |
| 5,134,663 A | 7/1992 | Kozlowski | 382/7 |
| 5,135,115 A | 8/1992 | Miller et al. | 209/564 |
| 5,144,115 A | 9/1992 | Yoshida | 235/379 |
| 5,146,067 A | 9/1992 | Sloan et al. | 235/381 |
| 5,146,512 A | 9/1992 | Weideman et al. | 382/30 |
| 5,151,607 A | 9/1992 | Crane et al. | 250/556 |
| 5,154,272 A | 10/1992 | Nishiumi et al. | 194/318 |
| 5,159,548 A | 10/1992 | Caslavka | 364/408 |
| 5,163,672 A | 11/1992 | Mennie | 271/187 |
| 5,163,868 A | 11/1992 | Adams et al. | 453/11 |
| 5,167,313 A | 12/1992 | Dobbins et al. | 194/317 |
| 5,179,517 A | 1/1993 | Sarbin et al. | 364/410 |
| 5,183,142 A | 2/1993 | Latchinian et al. | 194/206 |
| 5,184,115 A | 2/1993 | Black et al. | 340/708 |
| 5,184,709 A | 2/1993 | Nishiumi et al. | 194/318 |
| 5,186,334 A | 2/1993 | Fukudome et al. | 209/534 |
| 5,187,750 A | 2/1993 | Behera | 382/7 |
| 5,191,525 A | 3/1993 | LeBrun et al. | 364/419 |
| 5,193,121 A | 3/1993 | Elischer et al. | 382/7 |
| 5,198,976 A | 3/1993 | Form et al. | 364/410 |
| 5,199,543 A | 4/1993 | Kamagami et al. | 194/207 |
| 5,201,395 A | 4/1993 | Takizawa et al. | 194/206 |
| 5,204,811 A | 4/1993 | Bednar et al. | 705/45 |
| 5,206,915 A | 4/1993 | Kern et al. | 382/7 |
| 5,207,788 A | 5/1993 | Geib | 271/122 |
| 5,220,501 A | 6/1993 | Lawlor et al. | 364/408 |
| 5,231,381 A | 7/1993 | Duwaer | 340/712 |
| 5,237,158 A | 8/1993 | Kern et al. | 235/379 |
| 5,237,159 A | 8/1993 | Stephens et al. | 235/379 |
| 5,239,593 A | 8/1993 | Wittner et al. | 382/14 |
| 5,251,273 A | 10/1993 | Betts et al. | 382/311 |
| 5,251,738 A | 10/1993 | Dabrowski | 194/206 |
| 5,252,811 A | 10/1993 | Henochowicz et al. | 235/379 |
| 5,261,518 A | 11/1993 | Bryce | 194/206 |
| 5,265,008 A | 11/1993 | Benton et al. | 364/408 |
| 5,272,641 A | 12/1993 | Ford et al. | 364/468 |
| 5,274,641 A | 12/1993 | Shobatake et al. | 370/94.1 |
| 5,279,403 A | 1/1994 | Harbaugh et al. | 194/207 |
| 5,286,954 A | 2/1994 | Sato et al. | 235/379 |
| 5,295,196 A | 3/1994 | Raterman et al. | 382/135 |
| 5,297,030 A | 3/1994 | Vassigh et al. | 364/405 |
| 5,304,813 A | 4/1994 | De Man | 250/556 |
| 5,308,992 A | 5/1994 | Crane et al. | 250/556 |
| 5,309,515 A | 5/1994 | Troung et al. | 382/7 |
| 5,317,140 A | 5/1994 | Dunthorn | 250/221 |
| 5,321,238 A | 6/1994 | Kamata et al. | 235/379 |
| 5,335,292 A | 8/1994 | Lovelady et al. | 382/17 |
| 5,341,408 A | 8/1994 | Melcher et al. | 377/8 |
| 5,342,165 A | 8/1994 | Graef et al. | 414/788.9 |
| 5,363,949 A | 11/1994 | Matsubayashi | 194/206 |
| 5,367,577 A | 11/1994 | Gotaas | 382/7 |
| 5,368,147 A | 11/1994 | Menke et al. | 194/206 |
| 5,371,345 A | 12/1994 | LeStrange et al. | 235/380 |
| 5,371,798 A | 12/1994 | McWhortor | 380/51 |
| 5,373,550 A | 12/1994 | Campbell et al. | 379/100 |
| 5,379,344 A | 1/1995 | Larsson et al. | 380/23 |
| 5,381,019 A | 1/1995 | Sato | 250/556 |
| 5,383,754 A | 1/1995 | Sumida et al. | 412/11 |
| 5,394,969 A | 3/1995 | Harbaugh | 194/206 |
| 5,399,874 A | 3/1995 | Gonsalves et al. | 250/556 |
| 5,402,895 A | 4/1995 | Mikkelsen et al. | 209/534 |
| 5,416,307 A | 5/1995 | Danek et al. | 235/449 |
| 5,417,316 A | 5/1995 | Harbaugh | 194/206 |
| 5,418,458 A | 5/1995 | Jeffers | 324/235 |
| 5,419,424 A | 5/1995 | Harbaugh | 194/206 |
| 5,421,443 A | 6/1995 | Hatamachi et al. | 194/206 |
| 5,422,467 A | 6/1995 | Graef et al. | 235/379 |
| 5,430,664 A | 7/1995 | Cargill et al. | 364/550 |
| 5,434,427 A | 7/1995 | Crane et al. | 250/556 |
| 5,437,357 A | 8/1995 | Ota et al. | 194/206 |
| 5,438,184 A | 8/1995 | Roberts et al. | 235/380 |
| 5,442,162 A | 8/1995 | Armel | 235/381 |
| 5,444,793 A | 8/1995 | Kelland | 382/138 |
| 5,444,794 A | 8/1995 | Uhland, Sr. | 382/137 |
| 5,453,601 A | 9/1995 | Rosen | 235/379 |
| 5,459,304 A | 10/1995 | Eisenmann | 235/380 |
| 5,465,301 A | 11/1995 | Jotcham et al. | 380/54 |
| 5,465,821 A | 11/1995 | Akioka | 194/207 |
| 5,467,405 A | 11/1995 | Raterman et al. | 382/135 |
| 5,467,406 A | 11/1995 | Graves et al. | 382/135 |
| 5,468,941 A | 11/1995 | Sasaki | 235/379 |
| 5,468,971 A | 11/1995 | Ebstein et al. | 250/556 |
| 5,469,241 A | 11/1995 | Takahashi et al. | 355/64 |
| 5,471,039 A | 11/1995 | Irwin et al. | 235/441 |
| 5,476,169 A | 12/1995 | Takarada et al. | 194/207 |
| 5,481,377 A | 1/1996 | Udagawa et al. | 358/501 |
| 5,488,671 A | 1/1996 | Kern | 382/138 |
| 5,491,325 A | 2/1996 | Huang et al. | 235/379 |
| 5,504,822 A | 4/1996 | Holt | 382/218 |
| 5,506,691 A | 4/1996 | Bednar et al. | 358/402 |
| 5,509,692 A | 4/1996 | Oz | 283/70 |
| D369,984 S | 5/1996 | Larsen | D10/97 |
| 5,523,575 A | 6/1996 | Machida et al. | 250/208.1 |
| 5,530,772 A | 6/1996 | Storey | 382/135 |
| 5,530,773 A | 6/1996 | Thompson | 382/138 |
| 5,537,486 A | 7/1996 | Stratigos et al. | 382/137 |
| 5,544,043 A | 8/1996 | Miki et al. | 364/406 |
| 5,544,086 A | 8/1996 | Davis et al. | 364/408 |
| 5,545,885 A | 8/1996 | Jagielinski | 235/449 |
| 5,564,546 A | 10/1996 | Molbak et al. | 194/216 |
| 5,586,036 A | 12/1996 | Pintsov | 364/464.02 |
| 5,590,196 A | 12/1996 | Moreau | 380/18 |
| 5,592,377 A | 1/1997 | Lipkin | 395/242 |

(56) References Cited

U.S. PATENT DOCUMENTS

| | | | |
|---|---|---|---|
| 5,592,561 A | 1/1997 | Moore | 382/103 |
| 5,594,225 A | 1/1997 | Botvin | 235/379 |
| 5,600,704 A | 2/1997 | Ahlberg et al. | 379/58 |
| 5,600,732 A | 2/1997 | Ott et al. | 382/112 |
| 5,602,933 A | 2/1997 | Blackwell et al. | 382/116 |
| 5,602,936 A | 2/1997 | Green et al. | 382/140 |
| 5,607,040 A | 3/1997 | Mathurin, Sr. | 194/207 |
| 5,615,280 A | 3/1997 | Izawa et al. | 382/135 |
| 5,616,902 A | 4/1997 | Cooley et al. | 235/380 |
| 5,620,079 A | 4/1997 | Molbak | 194/217 |
| 5,633,949 A | 5/1997 | Graves et al. | 382/135 |
| 5,640,463 A | 6/1997 | Csulits | 382/135 |
| 5,652,802 A | 7/1997 | Graves et al. | 382/135 |
| 5,657,846 A | 8/1997 | Schwartz | 194/206 |
| 5,671,282 A | 9/1997 | Wolff et al. | 380/25 |
| 5,678,046 A | 10/1997 | Cahill et al. | 395/616 |
| 5,680,472 A | 10/1997 | Conant | 382/135 |
| 5,687,963 A | 11/1997 | Mennie | 271/119 |
| 5,692,067 A | 11/1997 | Raterman et al. | 382/135 |
| 5,703,344 A | 12/1997 | Bezy et al. | 235/379 |
| 5,704,491 A | 1/1998 | Graves | 209/534 |
| 5,708,810 A | 1/1998 | Kern et al. | 395/712 |
| 5,719,948 A | 2/1998 | Liang | 382/112 |
| 5,724,438 A | 3/1998 | Graves | 382/135 |
| 5,727,667 A | 3/1998 | Nye | 194/207 |
| 5,729,623 A | 3/1998 | Omatu et al. | 382/155 |
| 5,751,840 A | 5/1998 | Raterman et al. | 382/135 |
| 5,751,842 A | 5/1998 | Riach et al. | 382/137 |
| 5,754,673 A | 5/1998 | Brooks et al. | 382/112 |
| 5,761,089 A | 6/1998 | McInerny | 364/550 |
| 5,781,654 A | 7/1998 | Carney | 382/137 |
| 5,790,693 A | 8/1998 | Graves et al. | 382/135 |
| 5,790,697 A | 8/1998 | Munro et al. | 382/135 |
| 5,799,767 A | 9/1998 | Molbak | 194/217 |
| 5,806,650 A | 9/1998 | Mennie et al. | 194/206 |
| 5,813,510 A | 9/1998 | Rademacher | 194/206 |
| 5,815,592 A | 9/1998 | Mennie et al. | 382/135 |
| 5,822,448 A | 10/1998 | Graves et al. | 382/135 |
| 5,830,054 A | 11/1998 | Petri | 453/5 |
| 5,832,104 A | 11/1998 | Graves et al. | 382/135 |
| 5,832,463 A | 11/1998 | Funk | 705/35 |
| 5,842,188 A | 11/1998 | Ramsey et al. | 705/416 |
| 5,852,811 A | 12/1998 | Atkins | 705/36 |
| 5,867,589 A | 2/1999 | Graves et al. | 382/135 |
| 5,870,487 A | 2/1999 | Graves et al. | 382/135 |
| 5,870,725 A | 2/1999 | Bellinger et al. | 705/45 |
| 5,874,717 A | 2/1999 | Kern et al. | 235/379 |
| 5,875,259 A | 2/1999 | Mennie et al. | 382/135 |
| 5,892,211 A | 4/1999 | Davis et al. | 235/380 |
| 5,894,937 A | 4/1999 | Schmidt | 209/534 |
| 5,905,810 A | 5/1999 | Jones et al. | 382/135 |
| 5,909,502 A | 6/1999 | Mazur | 382/135 |
| 5,909,503 A | 6/1999 | Graves et al. | 382/135 |
| 5,912,982 A | 6/1999 | Munro et al. | 382/135 |
| 5,917,930 A | 6/1999 | Kayani et al. | 382/135 |
| 5,918,748 A | 7/1999 | Clark et al. | 209/534 |
| 5,923,413 A | 7/1999 | Laskowski | 356/71 |
| 5,926,392 A | 7/1999 | York et al. | 364/478.11 |
| 5,926,550 A | 7/1999 | Davis | 380/25 |
| 5,930,778 A | 7/1999 | Geer | 705/45 |
| 5,936,219 A | 8/1999 | Yoshida et al. | 235/379 |
| 5,938,044 A | 8/1999 | Weggesser | 209/534 |
| 5,940,623 A | 8/1999 | Watts et al. | 395/712 |
| 5,940,844 A | 8/1999 | Cahill et al. | 707/526 |
| 5,943,655 A | 8/1999 | Jacobson | 705/30 |
| 5,947,255 A | 9/1999 | Shimada et al. | 194/207 |
| 5,960,103 A | 9/1999 | Graves et al. | 382/135 |
| 5,966,456 A | 10/1999 | Jones et al. | 382/135 |
| 5,982,918 A | 11/1999 | Mennie et al. | 382/135 |
| 5,992,601 A | 11/1999 | Mennie et al. | 194/207 |
| 6,012,565 A | 1/2000 | Mazur | 194/207 |
| 6,021,883 A | 2/2000 | Casanova et al. | 194/217 |
| 6,023,684 A | 2/2000 | Pearson | 705/35 |
| 6,026,175 A | 2/2000 | Munro et al. | 382/135 |
| 6,028,951 A | 2/2000 | Raterman et al. | 382/135 |
| 6,036,344 A * | 3/2000 | Goldenberg | 705/39 |
| 6,038,553 A | 3/2000 | Hyde, Jr. | 705/45 |
| 6,045,039 A | 4/2000 | Stinson et al. | 235/379 |
| 6,065,672 A | 5/2000 | Haycock | 235/379 |
| 6,068,194 A | 5/2000 | Mazur | 235/492 |
| 6,072,896 A | 6/2000 | Graves et al. | 382/135 |
| 6,073,744 A | 6/2000 | Raterman et al. | 194/207 |
| 6,074,334 A | 6/2000 | Mennie et al. | 493/438 |
| 6,076,826 A | 6/2000 | Gerlier et al. | 271/274 |
| 6,078,683 A | 6/2000 | Denison et al. | 382/135 |
| D427,623 S | 7/2000 | Kuwada | D18/3 |
| 6,097,834 A | 8/2000 | Krouse et al. | 382/137 |
| 6,101,266 A | 8/2000 | Laskowski et al. | 382/135 |
| 6,105,007 A | 8/2000 | Norris | 705/38 |
| 6,119,946 A | 9/2000 | Teicher | 235/492 |
| 6,128,402 A | 10/2000 | Jones et al. | 382/135 |
| 6,131,718 A | 10/2000 | Witschorik | 194/206 |
| 6,141,438 A | 10/2000 | Blanchester | 382/140 |
| 6,144,459 A | 11/2000 | Satou | 358/1.15 |
| 6,145,738 A | 11/2000 | Stinson et al. | 235/379 |
| 6,181,837 B1 | 1/2001 | Cahill et al. | 382/305 |
| 6,220,419 B1 | 4/2001 | Mennie | 194/207 |
| 6,237,739 B1 | 5/2001 | Mazur et al. | 194/207 |
| 6,241,069 B1 | 6/2001 | Mazur et al. | 194/207 |
| 6,256,407 B1 | 7/2001 | Mennie et al. | 382/135 |
| 6,278,795 B1 | 8/2001 | Anderson et al. | 382/135 |
| 6,282,523 B1 | 8/2001 | Tedesco et al. | 705/45 |
| 6,283,366 B1 | 9/2001 | Hills et al. | 235/379 |
| 6,311,819 B1 | 11/2001 | Stromme et al. | 194/207 |
| 6,318,537 B1 | 11/2001 | Jones et al. | 194/346 |
| 6,351,551 B1 | 2/2002 | Munro et al. | 382/135 |
| 6,351,552 B1 | 2/2002 | Weaver et al. | 382/135 |
| 6,354,491 B2 | 3/2002 | Nichols et al. | 235/379 |
| 6,363,164 B1 | 3/2002 | Jones et al. | 382/135 |
| 6,363,362 B1 | 3/2002 | Burfield | 705/40 |
| 6,371,303 B1 | 4/2002 | Klein et al. | 209/534 |
| 6,373,965 B1 | 4/2002 | Liang | 382/112 |
| 6,378,683 B2 | 4/2002 | Mennie | 194/207 |
| 6,381,354 B1 | 4/2002 | Mennie et al. | 382/135 |
| 6,398,000 B1 | 6/2002 | Jenrick et al. | 194/200 |
| 6,415,983 B1 | 7/2002 | Ulvr et al. | 235/487 |
| 6,430,320 B1 | 8/2002 | Jia et al. | 382/289 |
| 6,459,806 B1 | 10/2002 | Raterman et al. | 382/135 |
| 6,460,705 B1 | 10/2002 | Hallowell | 209/534 |
| 6,473,519 B1 | 10/2002 | Pidhirny et al. | 382/140 |
| 6,493,461 B1 | 12/2002 | Mennie et al. | 382/135 |
| 6,516,078 B1 | 2/2003 | Yang et al. | 382/100 |
| 6,539,104 B1 | 3/2003 | Raterman et al. | 382/135 |
| 6,540,090 B1 | 4/2003 | Sakai et al. | 209/534 |
| 6,546,351 B1 | 4/2003 | Haycock et al. | 702/127 |
| 6,550,671 B1 | 4/2003 | Brown et al. | 235/379 |
| 6,560,355 B2 | 5/2003 | Graves et al. | 382/135 |
| 6,573,983 B1 | 6/2003 | Laskowski | 356/71 |
| 6,574,377 B1 | 6/2003 | Cahill et al. | 382/305 |
| 6,588,569 B1 | 7/2003 | Jenrick et al. | 194/206 |
| 6,601,687 B1 | 8/2003 | Jenrick et al. | 194/206 |
| 6,603,872 B2 | 8/2003 | Jones et al. | 382/135 |
| 6,611,351 B1 | 8/2003 | Simonoff | 358/1.18 |
| 6,621,919 B2 | 9/2003 | Mennie et al. | 382/135 |
| 6,628,816 B2 | 9/2003 | Mennie et al. | 382/135 |
| 6,636,624 B2 | 10/2003 | Raterman et al. | 382/135 |
| 6,637,576 B1 | 10/2003 | Jones et al. | 194/216 |
| 6,647,136 B2 | 11/2003 | Jones et al. | 382/137 |
| 6,650,767 B2 | 11/2003 | Jones et al. | 382/135 |
| 6,654,149 B1 * | 11/2003 | Sheng | 358/474 |
| 6,654,486 B2 | 11/2003 | Jones et al. | 382/135 |
| 6,661,910 B2 | 12/2003 | Jones et al. | 382/135 |
| 6,665,431 B2 | 12/2003 | Jones et al. | 382/135 |
| 6,678,401 B2 | 1/2004 | Jones et al. | 382/135 |
| 6,678,402 B2 | 1/2004 | Jones et al. | 382/135 |
| 6,697,511 B1 | 2/2004 | Haycock | 382/135 |
| 6,705,470 B2 | 3/2004 | Klein et al. | 209/534 |
| 6,721,442 B1 | 4/2004 | Mennie et al. | 382/135 |
| 6,724,926 B2 | 4/2004 | Jones et al. | 382/135 |
| 6,724,927 B2 | 4/2004 | Jones et al. | 382/135 |
| 6,731,785 B1 | 5/2004 | Mennie et al. | 382/135 |
| 6,731,786 B2 | 5/2004 | Jones et al. | 382/135 |
| 6,748,101 B1 * | 6/2004 | Jones et al. | 382/135 |
| 6,778,693 B2 | 8/2004 | Jones et al. | 382/135 |

(56) References Cited

U.S. PATENT DOCUMENTS

| | | |
|---|---|---|
| 6,785,405 B2 | 8/2004 | Tuttle et al. ............... 382/112 |
| 6,786,398 B1 | 9/2004 | Stinson et al. ............. 235/379 |
| 6,798,899 B2 | 9/2004 | Mennie et al. ............. 382/135 |
| 6,810,137 B2 | 10/2004 | Jones et al. ............... 382/135 |
| 6,843,418 B2 | 1/2005 | Jones et al. ............ 235/462.01 |
| 6,860,375 B2 | 3/2005 | Hallowell et al. ........... 194/328 |
| 6,863,214 B2 | 3/2005 | Garner et al. .............. 235/379 |
| 6,866,134 B2 | 3/2005 | Stromme et al. ........... 194/207 |
| 6,868,954 B2 | 3/2005 | Stromme et al. ........... 194/207 |
| 6,880,692 B1 | 4/2005 | Mazur et al. .............. 194/207 |
| 6,883,707 B2 | 4/2005 | Nagasaka et al. ........... 235/379 |
| 6,913,130 B1 | 7/2005 | Mazur et al. .............. 194/207 |
| 6,913,260 B2 | 7/2005 | Maier et al. ............ 271/265.04 |
| 6,915,893 B2 | 7/2005 | Mennie ..................... 194/207 |
| 6,929,109 B1 | 8/2005 | Klein et al. ................ 194/206 |
| 6,955,253 B1 | 10/2005 | Mazur et al. .............. 194/207 |
| 6,957,733 B2 | 10/2005 | Mazur et al. .............. 194/215 |
| 6,959,800 B1 | 11/2005 | Mazur et al. .............. 194/207 |
| 6,962,247 B2 | 11/2005 | Maier et al. ............... 194/207 |
| 6,980,684 B1 | 12/2005 | Munro et al. .............. 382/135 |
| 6,994,200 B2 | 2/2006 | Jenrick et al. ............. 194/206 |
| 6,996,263 B2 | 2/2006 | Jones et al. ............... 382/135 |
| 7,000,828 B2 | 2/2006 | Jones ....................... 235/379 |
| 7,006,664 B2 | 2/2006 | Paraskevakos ............. 382/100 |
| 7,016,767 B2 | 3/2006 | Jones et al. ............... 700/224 |
| 7,034,324 B2 | 4/2006 | Voser ....................... 250/556 |
| 7,036,651 B2 | 5/2006 | Tam et al. ................. 194/217 |
| 7,082,216 B2 | 7/2006 | Jones et al. ............... 382/137 |
| 7,092,560 B2 | 8/2006 | Jones et al. ............... 382/135 |
| 7,103,206 B2 | 9/2006 | Graves et al. .............. 382/135 |
| 7,103,438 B2 | 9/2006 | Hallowell et al. ........... 700/104 |
| 7,113,615 B2 | 9/2006 | Rhoads et al. ............. 382/100 |
| 7,113,925 B2 | 9/2006 | Waserstein et al. ........... 705/50 |
| 7,120,608 B1 * | 10/2006 | Gallagher et al. ............ 705/68 |
| 7,124,113 B1 | 10/2006 | Fairclough ................. 705/50 |
| 7,146,245 B2 | 12/2006 | Jones et al. ............... 700/224 |
| 7,149,336 B2 | 12/2006 | Jones et al. ............... 382/135 |
| 7,158,662 B2 * | 1/2007 | Chiles ...................... 382/135 |
| 7,171,032 B2 | 1/2007 | Jones et al. ............... 382/135 |
| 7,187,795 B2 | 3/2007 | Jones et al. ............... 382/135 |
| 7,191,657 B2 | 3/2007 | Maier et al. ................ 73/587 |
| 7,197,173 B2 | 3/2007 | Jones et al. ............... 382/135 |
| 7,200,255 B2 | 4/2007 | Jones et al. ............... 382/135 |
| 7,201,320 B2 | 4/2007 | Csulits et al. ............ 235/462.01 |
| 7,201,340 B2 | 4/2007 | Dietrich et al. ............ 241/101.2 |
| 7,216,106 B1 | 5/2007 | Buchanan et al. ............ 705/45 |
| 7,232,024 B2 | 6/2007 | Mazur et al. .............. 194/207 |
| 7,243,773 B2 | 7/2007 | Bochonok et al. .......... 194/350 |
| 7,248,730 B2 | 7/2007 | Matsui et al. .............. 382/135 |
| 7,248,731 B2 | 7/2007 | Raterman et al. ........... 382/135 |
| 7,256,874 B2 | 8/2007 | Csulits et al. ............... 356/71 |
| 7,269,279 B2 | 9/2007 | Chiles ...................... 382/135 |
| 7,312,902 B2 | 12/2007 | Mastie et al. .............. 358/3.28 |
| 7,349,566 B2 | 3/2008 | Jones et al. ............... 382/139 |
| 7,362,891 B2 | 4/2008 | Jones et al. ............... 382/135 |
| 7,366,338 B2 | 4/2008 | Jones et al. ............... 382/135 |
| 7,391,897 B2 | 6/2008 | Jones et al. ............... 382/135 |
| 7,494,052 B1 | 2/2009 | Carpenter et al. ........... 235/379 |
| 7,505,831 B2 | 3/2009 | Jones et al. ............... 700/224 |
| 7,536,046 B2 | 5/2009 | Raterman et al. ........... 382/135 |
| 7,542,598 B2 | 6/2009 | Jones et al. ............... 382/135 |
| 7,551,764 B2 | 6/2009 | Chiles et al. ............... 382/135 |
| 7,567,698 B2 | 7/2009 | Paraskevakos ............. 382/135 |
| 7,574,377 B2 | 8/2009 | Carapelli ................... 705/26 |
| 7,590,274 B2 | 9/2009 | Raterman et al. ........... 382/135 |
| 7,591,428 B2 | 9/2009 | Freeman et al. ............ 235/449 |
| 7,599,543 B2 | 10/2009 | Jones et al. ............... 382/137 |
| 7,600,626 B2 | 10/2009 | Hallowell et al. ........... 194/206 |
| 7,602,956 B2 | 10/2009 | Jones et al. ............... 382/135 |
| 5,909,503 C1 | 11/2009 | Graves et al. .............. 382/135 |
| 7,619,721 B2 | 11/2009 | Jones et al. ................ 356/71 |
| 7,620,231 B2 | 11/2009 | Jones et al. ............... 382/137 |
| 5,966,456 C1 | 12/2009 | Jones et al. ............... 382/135 |
| 6,381,354 C1 | 12/2009 | Mennie et al. ............. 382/135 |
| 7,628,326 B2 | 12/2009 | Freeman et al. ............ 235/450 |
| 7,635,082 B2 | 12/2009 | Jones ....................... 235/379 |
| 7,647,275 B2 | 1/2010 | Jones ........................ 705/40 |
| 7,650,980 B2 | 1/2010 | Jenrick et al. ............. 194/206 |
| 7,672,499 B2 | 3/2010 | Raterman et al. ........... 382/135 |
| 7,686,151 B2 | 3/2010 | Renz et al. ................ 194/206 |
| 7,724,938 B2 | 5/2010 | Pareskevakos ............. 382/135 |
| 7,726,457 B2 | 6/2010 | Maier et al. ............... 194/206 |
| 7,735,621 B2 | 6/2010 | Hallowell et al. ........... 194/206 |
| 7,753,189 B2 | 7/2010 | Maier et al. ............... 194/206 |
| 7,762,380 B2 | 7/2010 | Freeman et al. ............ 194/210 |
| 7,778,456 B2 | 8/2010 | Jones et al. ............... 382/135 |
| 7,779,982 B2 | 8/2010 | Fitzgerald et al. .......... 194/206 |
| 7,817,842 B2 | 10/2010 | Mennie ..................... 382/137 |
| 7,849,994 B2 | 12/2010 | Klein et al. ................ 194/206 |
| 7,873,576 B2 | 1/2011 | Jones et al. ................ 705/43 |
| 7,881,519 B2 | 2/2011 | Jones et al. ............... 382/135 |
| 7,882,000 B2 | 2/2011 | Jones ........................ 705/35 |
| 7,885,880 B1 | 2/2011 | Prasad et al. ................ 705/35 |
| 7,900,829 B1 | 3/2011 | Folk et al. ................. 235/380 |
| 7,903,863 B2 | 3/2011 | Jones et al. ............... 382/135 |
| 7,929,749 B1 | 4/2011 | Jones et al. ............... 382/135 |
| 7,938,245 B2 | 5/2011 | Jenrick et al. ............. 194/206 |
| 7,949,582 B2 | 5/2011 | Mennie et al. ............... 705/35 |
| 7,962,411 B1 | 6/2011 | Prasad et al. ................ 705/45 |
| 7,974,899 B1 | 7/2011 | Prasad et al. ................ 705/35 |
| 8,011,581 B1 | 9/2011 | Folk et al. ................. 235/385 |
| 8,023,715 B2 | 9/2011 | Jones et al. ............... 382/135 |
| 8,041,098 B2 | 10/2011 | Jones et al. ............... 382/137 |
| 8,103,084 B2 | 1/2012 | Jones et al. ............... 382/140 |
| 8,125,624 B2 | 2/2012 | Jones et al. ................. 356/71 |
| 8,126,793 B2 | 2/2012 | Jones ........................ 705/35 |
| 8,141,772 B1 | 3/2012 | Folk et al. ................. 235/379 |
| 8,162,125 B1 | 4/2012 | Csulits et al. .............. 194/206 |
| 8,169,602 B2 | 5/2012 | Jones et al. ................. 356/71 |
| 2001/0006557 A1 | 7/2001 | Mennie et al. ............. 382/135 |
| 2001/0015311 A1 | 8/2001 | Mennie ..................... 194/207 |
| 2001/0018739 A1 | 8/2001 | Anderson et al. ........... 713/176 |
| 2001/0019624 A1 | 9/2001 | Raterman et al. ........... 382/135 |
| 2001/0035603 A1 | 11/2001 | Graves et al. ............ 271/265.01 |
| 2001/0053241 A1 | 12/2001 | Haycock .................... 382/135 |
| 2002/0001393 A1 | 1/2002 | Jones et al. ............... 382/100 |
| 2002/0020603 A1 | 2/2002 | Jones et al. ............... 194/346 |
| 2002/0037097 A1 | 3/2002 | Hoyos et al. .............. 382/137 |
| 2002/0056605 A1 | 5/2002 | Mazur et al. .............. 194/207 |
| 2002/0082993 A1 | 6/2002 | Hoyos et al. ................ 705/43 |
| 2002/0085245 A1 | 7/2002 | Mennie et al. ............. 358/498 |
| 2002/0085745 A1 | 7/2002 | Jones et al. ............... 382/135 |
| 2002/0103757 A1 | 8/2002 | Jones et al. ................. 705/45 |
| 2002/0104785 A1 | 8/2002 | Klein et al. ............... 209/534 |
| 2002/0107801 A1 | 8/2002 | Jones et al. ................. 705/45 |
| 2002/0118871 A1 | 8/2002 | Jones et al. ............... 382/137 |
| 2002/0122580 A1 | 9/2002 | Jones et al. ............... 382/137 |
| 2002/0126885 A1 | 9/2002 | Mennie et al. ............. 382/135 |
| 2002/0126886 A1 | 9/2002 | Jones et al. ............... 382/135 |
| 2002/0131630 A1 | 9/2002 | Jones et al. ............... 382/137 |
| 2002/0136442 A1 | 9/2002 | Jones et al. ............... 382/135 |
| 2002/0145035 A1 | 10/2002 | Jones ....................... 235/379 |
| 2002/0154804 A1 | 10/2002 | Jones et al. ............... 382/135 |
| 2002/0154805 A1 | 10/2002 | Jones et al. ............... 382/135 |
| 2002/0154806 A1 | 10/2002 | Jones et al. ............... 382/135 |
| 2002/0154807 A1 | 10/2002 | Jones et al. ............... 382/135 |
| 2002/0154808 A1 | 10/2002 | Jones et al. ............... 382/135 |
| 2002/0181805 A1 * | 12/2002 | Loeb et al. ................ 382/317 |
| 2002/0186876 A1 | 12/2002 | Jones et al. ............... 382/135 |
| 2003/0005303 A1 | 1/2003 | Auslander et al. .......... 713/176 |
| 2003/0006277 A1 | 1/2003 | Maskatiya et al. .......... 235/379 |
| 2003/0009420 A1 | 1/2003 | Jones ........................ 705/39 |
| 2003/0015395 A1 | 1/2003 | Hallowell et al. ........... 194/206 |
| 2003/0015396 A1 | 1/2003 | Mennie ..................... 194/206 |
| 2003/0023557 A1 | 1/2003 | Moore ....................... 705/50 |
| 2003/0059098 A1 | 3/2003 | Jones et al. ............... 382/135 |
| 2003/0062242 A1 | 4/2003 | Hallowell et al. ........... 194/302 |
| 2003/0080032 A1 | 5/2003 | Heidel et al. .............. 209/534 |
| 2003/0081824 A1 | 5/2003 | Mennie et al. ............. 382/135 |
| 2003/0099379 A1 | 5/2003 | Monk et al. ............... 382/115 |
| 2003/0108233 A1 | 6/2003 | Raterman et al. ........... 382/135 |
| 2003/0121752 A1 | 7/2003 | Stromme et al. ........... 194/207 |
| 2003/0121753 A1 | 7/2003 | Stromme et al. ........... 194/207 |
| 2003/0128240 A1 | 7/2003 | Martinez et al. ............ 345/764 |

(56) References Cited

U.S. PATENT DOCUMENTS

| | | | |
|---|---|---|---|
| 2003/0132281 A1* | 7/2003 | Jones et al. | 235/379 |
| 2003/0139994 A1 | 7/2003 | Jones | 705/36 |
| 2003/0168308 A1 | 9/2003 | Maier et al. | 194/207 |
| 2003/0174874 A1 | 9/2003 | Raterman et al. | 382/135 |
| 2003/0182217 A1 | 9/2003 | Chiles | 705/35 |
| 2003/0198373 A1 | 10/2003 | Raterman et al. | 382/135 |
| 2003/0202690 A1 | 10/2003 | Jones et al. | 382/139 |
| 2003/0233317 A1* | 12/2003 | Judd | 705/39 |
| 2004/0003980 A1 | 1/2004 | Hallowell et al. | 194/206 |
| 2004/0016621 A1 | 1/2004 | Jenrick et al. | 194/206 |
| 2004/0016797 A1 | 1/2004 | Jones et al. | 235/379 |
| 2004/0028266 A1* | 2/2004 | Jones et al. | 382/135 |
| 2004/0083149 A1 | 4/2004 | Jones | 705/35 |
| 2004/0131230 A1 | 7/2004 | Paraskevakos | 382/100 |
| 2004/0145726 A1 | 7/2004 | Csulits et al. | 356/71 |
| 2004/0149538 A1 | 8/2004 | Sakowski | 194/207 |
| 2004/0153408 A1 | 8/2004 | Jones et al. | 705/43 |
| 2004/0154964 A1* | 8/2004 | Jones | 209/534 |
| 2004/0173432 A1 | 9/2004 | Jones | 194/216 |
| 2004/0182675 A1 | 9/2004 | Long et al. | 194/206 |
| 2004/0238619 A1 | 12/2004 | Nagasaka et al. | 235/379 |
| 2004/0251110 A1 | 12/2004 | Jenrick et al. | 194/207 |
| 2005/0029168 A1 | 2/2005 | Jones et al. | 209/534 |
| 2005/0035034 A1 | 2/2005 | Long et al. | 209/534 |
| 2005/0040225 A1 | 2/2005 | Csulits et al. | 235/379 |
| 2005/0045448 A1 | 3/2005 | Sugano et al. | 194/207 |
| 2005/0047642 A1 | 3/2005 | Jones et al. | 382/137 |
| 2005/0060055 A1 | 3/2005 | Hallowell et al. | 700/95 |
| 2005/0060059 A1 | 3/2005 | Klein et al. | 700/213 |
| 2005/0060061 A1 | 3/2005 | Jones | 700/226 |
| 2005/0077142 A1 | 4/2005 | Tam et al. | 194/217 |
| 2005/0086271 A1 | 4/2005 | Jones et al. | 707/200 |
| 2005/0087422 A1 | 4/2005 | Maier et al. | 194/207 |
| 2005/0108165 A1 | 5/2005 | Jones et al. | 705/43 |
| 2005/0117791 A2 | 6/2005 | Raterman et al. | 382/135 |
| 2005/0117792 A2 | 6/2005 | Graves et al. | 382/135 |
| 2005/0150738 A1 | 7/2005 | Hallowell et al. | 194/206 |
| 2005/0151995 A1* | 7/2005 | Hauser et al. | 358/1.15 |
| 2005/0163361 A1 | 7/2005 | Jones et al. | 382/135 |
| 2005/0163362 A1 | 7/2005 | Jones et al. | 382/137 |
| 2005/0169511 A1 | 8/2005 | Jones | 382/135 |
| 2005/0173221 A1 | 8/2005 | Maier et al. | 194/207 |
| 2005/0183928 A1 | 8/2005 | Jones et al. | 194/207 |
| 2005/0207634 A1 | 9/2005 | Jones et al. | 382/135 |
| 2005/0213803 A1 | 9/2005 | Mennie et al. | 382/135 |
| 2005/0241909 A1 | 11/2005 | Mazur et al. | 194/207 |
| 2005/0249394 A1 | 11/2005 | Jones et al. | 382/135 |
| 2005/0265591 A1 | 12/2005 | Jones et al. | 382/135 |
| 2005/0267843 A1* | 12/2005 | Acharya et al. | 705/42 |
| 2005/0276458 A1 | 12/2005 | Jones et al. | 382/135 |
| 2005/0278239 A1 | 12/2005 | Jones et al. | 705/35 |
| 2005/0281450 A1* | 12/2005 | Richardson | 382/139 |
| 2005/0289030 A1* | 12/2005 | Smith | 705/35 |
| 2006/0010071 A1 | 1/2006 | Jones et al. | 705/42 |
| 2006/0054454 A1 | 3/2006 | Oh | 194/207 |
| 2006/0078186 A1 | 4/2006 | Freeman et al. | 382/135 |
| 2006/0106717 A1* | 5/2006 | Randle et al. | 705/45 |
| 2006/0124724 A1 | 6/2006 | Kotovich et al. | 235/379 |
| 2006/0136317 A1* | 6/2006 | Mizrah | 705/35 |
| 2006/0182330 A1 | 8/2006 | Chiles | 382/135 |
| 2006/0195567 A1 | 8/2006 | Mody et al. | 709/224 |
| 2006/0210137 A1 | 9/2006 | Raterman et al. | 382/135 |
| 2006/0213979 A1* | 9/2006 | Geller et al. | 235/380 |
| 2006/0274929 A1 | 12/2006 | Jones et al. | 382/135 |
| 2007/0064991 A1 | 3/2007 | Douglas et al. | 382/137 |
| 2007/0071302 A1 | 3/2007 | Jones et al. | 382/135 |
| 2007/0076939 A1 | 4/2007 | Jones et al. | 382/135 |
| 2007/0078560 A1 | 4/2007 | Jones et al. | 700/224 |
| 2007/0095630 A1 | 5/2007 | Mennie et al. | 194/206 |
| 2007/0102863 A1* | 5/2007 | Burns et al. | 271/3.01 |
| 2007/0112674 A1 | 5/2007 | Jones et al. | 705/45 |
| 2007/0122023 A1 | 5/2007 | Jenrick et al. | 382/135 |
| 2007/0172106 A1 | 7/2007 | Paraskevakos | 382/135 |
| 2007/0172107 A1 | 7/2007 | Jones et al. | 382/137 |
| 2007/0209904 A1 | 9/2007 | Freeman et al. | 194/210 |
| 2007/0221470 A1 | 9/2007 | Mennie et al. | 194/216 |
| 2007/0237381 A1 | 10/2007 | Mennie et al. | 382/135 |
| 2007/0258633 A1 | 11/2007 | Jones et al. | 382/135 |
| 2007/0269097 A1 | 11/2007 | Chiles et al. | 382/135 |
| 2007/0278064 A1 | 12/2007 | Hallowell et al. | 194/206 |
| 2007/0288382 A1 | 12/2007 | Narayanan et al. | 705/45 |
| 2008/0006505 A1 | 1/2008 | Renz et al. | 194/206 |
| 2008/0033829 A1 | 2/2008 | Mennie et al. | 705/16 |
| 2008/0037856 A1 | 2/2008 | Paraskevakos | 382/140 |
| 2008/0044077 A1 | 2/2008 | Mennie et al. | 382/135 |
| 2008/0052189 A1 | 2/2008 | Walker et al. | 705/26 |
| 2008/0060906 A1 | 3/2008 | Fitzgerald et al. | 194/207 |
| 2008/0123932 A1 | 5/2008 | Jones et al. | 382/135 |
| 2008/0133411 A1 | 6/2008 | Jones et al. | 705/42 |
| 2008/0177420 A1 | 7/2008 | Klein et al. | 700/224 |
| 2008/0219543 A1 | 9/2008 | Csulits et al. | 382/135 |
| 2008/0285838 A1 | 11/2008 | Jones et al. | 382/135 |
| 2009/0001661 A1 | 1/2009 | Klein et al. | 271/258.01 |
| 2009/0013653 A1 | 1/2009 | Sekiguchi | 53/531 |
| 2009/0022390 A1 | 1/2009 | Yacoubian et al. | 382/135 |
| 2009/0087076 A1 | 4/2009 | Jenrick | 382/135 |
| 2009/0090779 A1 | 4/2009 | Freeman | 235/450 |
| 2009/0148025 A1 | 6/2009 | Calman | 382/135 |
| 2009/0148027 A1 | 6/2009 | Paraskevakos | 382/135 |
| 2009/0183967 A1 | 7/2009 | Hamasaki | 194/320 |
| 2009/0310188 A1 | 12/2009 | Jones et al. | 358/448 |
| 2009/0313159 A1 | 12/2009 | Jones et al. | 705/35 |
| 2010/0034454 A1 | 2/2010 | Jones et al. | 382/137 |
| 2010/0051687 A1 | 3/2010 | Jones et al. | 235/379 |
| 2010/0057617 A1 | 3/2010 | Jones et al. | 705/44 |
| 2010/0063916 A1 | 3/2010 | Jones et al. | 705/35 |
| 2010/0092065 A1 | 4/2010 | Jones et al. | 382/135 |
| 2010/0108463 A1 | 5/2010 | Renz et al. | 194/206 |
| 2010/0116619 A1 | 5/2010 | Jones | 194/217 |
| 2010/0163366 A1 | 7/2010 | Jenrick et al. | 194/206 |
| 2010/0236892 A1 | 9/2010 | Jones et al. | 194/206 |
| 2010/0263984 A1 | 10/2010 | Freeman et al. | 194/206 |
| 2010/0276485 A1 | 11/2010 | Jones et al. | 235/379 |
| 2010/0303111 A1 | 12/2010 | Kupershmidt | 372/32 |
| 2011/0035316 A2 | 2/2011 | Morgan et al. | 705/39 |
| 2011/0042178 A1 | 2/2011 | Luecking | 194/302 |
| 2011/0087599 A1 | 4/2011 | Jones | 705/45 |
| 2011/0099105 A1 | 4/2011 | Mennie et al. | 705/41 |
| 2011/0206267 A1 | 8/2011 | Jones et al. | 382/139 |
| 2011/0215034 A1 | 9/2011 | Mennie et al. | 209/534 |
| 2011/0220717 A1 | 9/2011 | Jones et al. | 235/380 |
| 2011/0255767 A1 | 10/2011 | Jenrick et al. | 382/135 |
| 2011/0258113 A1 | 10/2011 | Jones et al. | 705/39 |
| 2012/0008131 A1 | 1/2012 | Jones et al. | 356/71 |
| 2012/0008850 A1 | 1/2012 | Jones et al. | 382/135 |
| 2012/0013891 A1 | 1/2012 | Jones et al. | 356/71 |
| 2012/0013892 A1 | 1/2012 | Jones et al. | 356/71 |

FOREIGN PATENT DOCUMENTS

| | | | | |
|---|---|---|---|---|
| DE | 28 24 849 | A1 | 12/1979 | G07D 7/00 |
| EP | 0 030 413 | A1 | 6/1981 | G07F 7/02 |
| EP | 0 071 421 | A2 | 2/1983 | G07D 7/00 |
| EP | 0 077 464 | A2 | 4/1983 | G03H 1/08 |
| EP | 0 083 062 | A2 | 7/1983 | G07D 7/00 |
| EP | 0 101 115 | A1 | 2/1984 | G07D 7/00 |
| EP | 0 109 743 | A2 | 5/1984 | G07D 1/00 |
| EP | 0 185 200 | A2 | 6/1986 | G06F 3/14 |
| EP | 0 253 935 | A2 | 1/1988 | G06K 7/10 |
| EP | 0 314 312 | A2 | 5/1989 | G07D 7/00 |
| EP | 0 325 364 | A2 | 7/1989 | H04N 1/46 |
| EP | 0 338 123 | A2 | 10/1989 | G07D 7/00 |
| EP | 0 342 647 | A2 | 11/1989 | G07D 7/00 |
| EP | 0 402 627 | A1 | 12/1990 | H01R 17/12 |
| EP | 0 416 916 | A2 | 3/1991 | G07F 7/10 |
| EP | 0 416 960 | A1 | 3/1991 | G07F 7/10 |
| EP | 0 473 106 | A2 | 3/1992 | G07D 1/00 |
| EP | 0 548 142 | A1 | 6/1993 | G06K 19/08 |
| EP | 0 578 875 | A1 | 1/1994 | G06F 15/68 |
| EP | 0 583 526 | A1 | 2/1994 | G06K 7/00 |
| EP | 0 583 723 | A1 | 2/1994 | G06K 7/00 |
| EP | 0 593 209 | A2 | 4/1994 | H04L 29/06 |
| EP | 0 612 042 | A2 | 8/1994 | G07D 7/00 |
| EP | 0 613 107 | A1 | 8/1994 | G07F 19/00 |

(56) References Cited

FOREIGN PATENT DOCUMENTS

| | | | | |
|---|---|---|---|---|
| EP | 0 616 296 A2 | 9/1994 | ............... | G06K 9/20 |
| EP | 0 686 292 A1 | 9/1994 | ............... | G07D 7/00 |
| EP | 0 632 415 A1 | 1/1995 | ............... | G07F 7/10 |
| EP | 0 633 533 A2 | 1/1995 | ............... | G06F 15/00 |
| EP | 0 633 552 A2 | 1/1995 | ............... | G07C 5/00 |
| EP | 0 633 553 A1 | 1/1995 | ............... | G07D 7/00 |
| EP | 0 661 654 A2 | 7/1995 | ............... | G06F 17/60 |
| EP | 0 671 696 A1 | 9/1995 | ............... | G06F 17/30 |
| EP | 0 708 419 A1 | 4/1996 | ............... | G07D 7/00 |
| EP | 0 718 809 A2 | 6/1996 | ............... | G07D 7/00 |
| EP | 0 760 987 A1 | 9/1996 | ............... | G07D 7/00 |
| EP | 0 824 736 A1 | 11/1996 | ............... | G07D 7/00 |
| EP | 1 004 089 A1 | 6/1998 | ............... | G06K 9/00 |
| EP | 1 008 096 A2 | 9/1998 | | |
| EP | 1 019 869 A1 | 10/1998 | ............... | G06K 9/78 |
| EP | 0 984 410 A1 | 3/2000 | ............... | G07F 19/00 |
| EP | 1 028 359 A2 | 8/2000 | ............... | G03H 1/18 |
| EP | 1 041 523 A2 | 10/2000 | ............... | G07F 7/10 |
| EP | 1 134 704 A1 | 9/2001 | ............... | G07D 7/00 |
| EP | 1 160 737 A1 | 12/2001 | ............... | G07D 3/00 |
| EP | 1 437 692 A1 | 7/2004 | ............... | G07F 11/00 |
| EP | 1 480 177 B1 | 11/2007 | ............... | G07F 19/00 |
| FR | 2 539 898 A1 | 7/1984 | ............... | G07D 7/00 |
| FR | 2 722 316 A1 | 1/1996 | ............... | G07D 7/00 |
| GB | 2 038 063 A | 7/1980 | ............... | G07D 7/00 |
| GB | 2 190 996 A | 12/1987 | ............... | G06K 5/00 |
| GB | 2 204 166 A | 11/1988 | ............... | G06M 9/02 |
| GB | 2 272 762 A | 5/1994 | ............... | G01N 21/88 |
| GB | 2 355 522 A | 4/2001 | ............... | G07D 7/00 |
| GB | 2 464 826 A | 5/2010 | ............... | G07D 11/00 |
| JP | 62-220843 A | 9/1987 | ............... | G01N 21/89 |
| JP | 63-073497 A | 4/1988 | ............... | G07D 9/00 |
| JP | 02-012492 A | 1/1990 | ............... | G07D 7/00 |
| JP | 04-131986 A | 5/1992 | ............... | G07D 9/00 |
| JP | 04-243497 A | 8/1992 | ............... | G07D 9/00 |
| JP | 06-203248 A | 7/1994 | ............... | G07D 9/00 |
| JP | 07-168857 A | 7/1995 | ............... | G06F 17/40 |
| WO | WO 85/02148 A1 | 5/1985 | ............... | B42D 15/00 |
| WO | WO 87/06041 A1 | 10/1987 | ............... | G07D 7/00 |
| WO | WO 90/07165 A1 | 6/1990 | ............... | G07D 7/00 |
| WO | WO 91/11778 A1 | 8/1991 | ............... | G06K 9/00 |
| WO | WO 92/04692 A1 | 3/1992 | ............... | G06K 19/08 |
| WO | WO 92/14221 A1 | 8/1992 | ............... | G07D 7/00 |
| WO | WO 92/16931 A2 | 10/1992 | | |
| WO | WO 92/17394 A1 | 10/1992 | ............... | B65H 3/06 |
| WO | WO 93/23824 A1 | 11/1993 | ............... | G06K 9/00 |
| WO | WO 94/06102 A1 | 3/1994 | ............... | G07D 7/00 |
| WO | WO 94/16412 A1 | 7/1994 | ............... | G07D 7/00 |
| WO | WO 94/19773 A1 | 9/1994 | ............... | G07D 7/00 |
| WO | WO 95/10088 A1 | 4/1995 | ............... | G06F 15/30 |
| WO | WO 95/19019 A2 | 7/1995 | ............... | G07D 7/00 |
| WO | WO 95/24691 A1 | 9/1995 | ............... | G06K 9/00 |
| WO | WO 96/03719 A1 | 2/1996 | ............... | G07F 7/10 |
| WO | WO 96/10800 A1 | 4/1996 | ............... | G06K 9/00 |
| WO | WO 96/29683 A1 | 9/1996 | ............... | G07D 7/00 |
| WO | WO 96/36021 A1 | 11/1996 | ............... | G07D 7/00 |
| WO | WO 96/36933 A1 | 11/1996 | ............... | G06K 9/00 |
| WO | WO 97/05583 A1 | 2/1997 | ............... | G07F 7/10 |
| WO | WO 97/29459 A1 | 8/1997 | ............... | G07D 7/00 |
| WO | WO 97/30422 A1 | 8/1997 | ............... | G07D 7/00 |
| WO | WO 97/43734 A1 | 11/1997 | ............... | G06K 9/00 |
| WO | WO 97/45810 A1 | 12/1997 | ............... | G07D 7/00 |
| WO | WO 98/12662 A1 | 3/1998 | ............... | G06K 9/00 |
| WO | WO 98/13785 A1 | 4/1998 | ............... | G06K 9/46 |
| WO | WO 98/24041 A1 | 6/1998 | ............... | G06F 17/60 |
| WO | WO 98/24052 A1 | 6/1998 | ............... | G06K 9/00 |
| WO | WO 98/24067 A1 | 6/1998 | ............... | G07D 3/14 |
| WO | WO 98/26364 A1 | 6/1998 | ............... | G06F 17/60 |
| WO | WO 98/35323 A2 | 8/1998 | | |
| WO | WO 98/40839 A2 | 9/1998 | | |
| WO | WO 98/47100 A1 | 10/1998 | ............... | G06K 9/78 |
| WO | WO 98/50892 A1 | 11/1998 | ............... | G07D 7/00 |
| WO | WO 98/51082 A1 | 11/1998 | ............... | H04N 7/18 |
| WO | WO 99/00776 A1 | 1/1999 | ............... | G07F 9/06 |
| WO | WO 99/09511 A1 | 2/1999 | ............... | G06K 9/00 |
| WO | WO 99/14668 A1 | 3/1999 | ............... | G06F 9/445 |
| WO | WO 99/23601 A1 | 5/1999 | ............... | G06K 9/00 |
| WO | WO 99/41695 A1 | 8/1999 | ............... | G06K 5/00 |
| WO | WO 99/48040 A1 | 9/1999 | ............... | G06K 9/00 |
| WO | WO 99/48042 A1 | 9/1999 | ............... | G06K 9/20 |
| WO | WO 99/50795 A1 | 10/1999 | ............... | G07D 1/00 |
| WO | WO 99/50796 A1 | 10/1999 | ............... | G07D 7/00 |
| WO | WO 00/24572 A1 | 5/2000 | ............... | B31F 1/00 |
| WO | WO 00/58876 A1 | 10/2000 | ............... | G06F 17/60 |
| WO | WO 00/65546 A1 | 11/2000 | ............... | G07F 1/04 |
| WO | WO 01/08108 A2 | 2/2001 | | |
| WO | WO 01/59685 A2 | 8/2001 | ............... | G06K 9/00 |
| WO | WO 01/59723 A1 | 8/2001 | ............... | G07F 7/04 |
| WO | WO 02/29735 A2 | 4/2002 | ............... | G07D 7/00 |
| WO | WO 02/054360 A2 | 7/2002 | ............... | G07D 11/00 |
| WO | WO 03/005312 A1 | 1/2003 | ............... | G07F 19/00 |
| WO | WO 03/028361 A2 | 4/2003 | | |
| WO | WO 03/029913 A2 | 4/2003 | | |
| WO | WO 03/030113 A1 | 4/2003 | ............... | G07F 7/04 |
| WO | WO 03/067532 A1 | 8/2003 | ............... | G07F 7/04 |
| WO | WO 03/107282 A2 | 12/2003 | | |
| WO | WO 2004/010367 A1 | 1/2004 | ............... | G06K 5/00 |
| WO | WO 2004/027717 A2 | 4/2004 | | |
| WO | WO 2004/036508 A2 | 4/2004 | ............... | G07D 7/12 |
| WO | WO 2004/038631 A2 | 5/2004 | ............... | G06F 17/60 |
| WO | WO 2004/068422 A1 | 8/2004 | ............... | G07D 11/00 |
| WO | WO 2005/013209 A2 | 2/2005 | ............... | G07D 11/00 |
| WO | WO 2005/017842 A1 | 2/2005 | ............... | G07D 11/00 |
| WO | WO 2005/028348 A2 | 3/2005 | ............... | B65H 1/00 |
| WO | WO 2005/029240 A2 | 3/2005 | | |
| WO | WO 2005/036445 A1 | 4/2005 | ............... | G06F 19/00 |
| WO | WO 2005/041134 A2 | 5/2005 | | |
| WO | WO 2005/076229 A1 | 8/2005 | ............... | G07D 7/12 |
| WO | WO 2006/039439 A2 | 4/2006 | ............... | G06K 9/00 |
| WO | WO 2006/076289 A2 | 7/2006 | ............... | G07D 11/00 |
| WO | WO 2006/076634 A2 | 7/2006 | ............... | G06Q 90/00 |
| WO | WO 2007/044570 A2 | 4/2007 | ............... | G07D 11/00 |
| WO | WO 2007/120825 A2 | 10/2007 | ............... | G06K 9/00 |
| WO | WO 2007/143128 A2 | 12/2007 | ............... | B65H 29/12 |
| WO | WO 2008/030356 A1 | 3/2008 | ............... | G06K 7/00 |
| WO | WO 2008/112132 A1 | 9/2008 | ............... | G06K 9/00 |
| WO | WO 2009/081085 A1 | 7/2009 | ............... | G07D 11/00 |
| WO | WO 2011/109569 A1 | 9/2011 | ............... | G07F 11/00 |

OTHER PUBLICATIONS

Applied Communications Inc.: BASE24 software, "Applied Communications Announces Joint Venture," Business Wire, 4 pages (Jan. 6, 1989).
AFB: AFB Currency Recognition System, 1 page (1982).
ASCOM: Cashflow Emerald, 2 pages, (date unknown, prior to Jan. 15, 2001).
ATM Cardpay Corp: "ATM Cardpay Introduces New Bill Payment Idea," Retail Delivery Systems News, vol. 3, Iss. 1, p. 1; 2 pages (Jan. 16, 1998).
ATM Cardpay Corp: "The Next Generation of ATM Network Survival. ATM Cardpay Show Switches How to Win Bill Presentment/Payments Market," EFT Report, vol. 20, Iss. 17, p. 1; 3 pages (Aug. 27, 1997).
AUI: Coinverter—"No More Lines . . . Self-Serve Cash-Out," by Cassius Elston, 1995 World Games Congress/Exposition Converter, 1 page (dated prior to 1995).
Barton, Louis L., "Check Processing Operations"—A Hands-On Guide to Developing and Managing a State-of-the-Art Check Processing Operation, Chp. 8 and App. 2, 31 pages (1994).
Brandt: Mach 7 High-Speed Coin Sorter/Counter, 2 pages (1992).
Brandt: Model 8904 Upfeed—"High Speed 4-Denomination Currency Dispenser," 2 pages (1989).
Cummins: JetScan™ Model 4060, Currency Scanner/Counter, Operator's Manual, 43 pages (Aug. 1991).
Cummins: JetScan™ Model 4060, Sale of JetScan Currency Scanner/Counter, 1 page (Aug. 1991).
Cummins: JetScan™ Model 4061, Currency Scanner/Counter—Operating Instructions, 47 pages (Apr. 20, 1993).
Cummins: JetScan™ Model 4061, Sale of JetScan Currency Scanner/Counter, 1 page (Apr. 20, 1993).

(56) References Cited

OTHER PUBLICATIONS

Cummins: JetScan™ Model 4062, Currency Scanner/Counter—Operating Instructions (022-7120-00), 53 pages (Nov. 28, 1994).
Cummins: JetScan™ Model 4062, Sale of JetScan Currency Scanner/Counter, Model 4062, 1 page (Nov. 28, 1994).
Cummins: JetSort® High Speed Sorter/Counter Kits I & J—Operating Instructions (Form 022-7123-00) 12 pages (1994).
Currency Systems International: Mr. W. Kranister in Conversation with Richard Haycock, 5 pages (estimated 1994).
Currency Systems International: CPS 300 Currency Processing System, 4 pages (® 1992).
Currency Systems International: CPS 600/900, Medium Speed Currency Sorting Family, CPS 600 and CPS 900, 4 pages (® 1994).
Currency Systems International: CPS 600/900, Description of CSI CPS 600 and CPS 900 devices, 1 page (date: estimated 1994).
De La Rue: CDS 5700 and CDS 5800 Cash Deponier System (German) and translation, 7 pages (date unknown, prior to Aug. 13, 1996).
EP App. No. 04 020 193.1 [claiming priority to U.S. Appl. No. 60/043,516], European Patent Office, Communication pursuant to Article 96(2), Discussion of FR 2 722 316, 4 pages (Jul. 18, 2005).
Elcom International Inc: PECOS Internet Procurement Manager, "Elcom.com and Visa Announce Systems Link to Offer B2B Ecommerce Solutions," PRNewsire, 4 pages (Nov. 29, 1999).
Glory: CRS-8000 Cash Redemption System, 2 pages (1996).
Glory: GFB-200/210/220/230 DeskTop Bank Note Counter brochure, 2 pages (estimated before Aug. 9, 1994).
Glory: GSA-500 Sortmaster brochure, 2 pages (estimated Jan. 14, 1994).
Glory: System 8000 Recycle Currency Processing Teller System, p. 5 of General Catalogue of Glory Products, 2 pages (1995).
Glory: UF-1D brochure and translation, 2 pages (estimated before Aug. 9, 1994).
ISH Electronic: ISH 12005/500 Coin Counter (with translation), 4 pages (date unknown, prior to Aug. 1996).
ISH Electronic: ISH 12005/501 Self-Service Unit (with translation), 4 pages (date unknown, prior to Aug. 1996).
J&B Software Inc.: TMS Image, "J&B Software Announces New Successes for TMS Image ™ Remittance," PRNewswire, 2 pages (Mar. 23, 1998).
NGZ Geldzahlmaschinengesellschaft: NGZ 2100 Automated Coin Depository, 4 pages (date unknown, prior to Sep. 1996).
Perconta: Cassomat A.C.S. Automated Cash System Types I and II, 6 pages (1998).
Perconta: Contomat Coin Settlement Machine for Customer Self Service, 2 pages (date unknown, prior to Apr. 2003).
Prema GmbH: Prema 405 (RE) Self Service Coin Deposit Facility, 2 pages (date unknown, prior to Apr. 2003).
Reis Eurosystems: CRS 6501/Crs 6510 Cash Receipt Systems for Self-Service Area, 3 pages (date unknown, prior to Apr. 2003).
Scan Coin: CDS 600 Cash Deposit System, 2 pages (1994).
Scan Coin: CDS 640 Cash Deposit System, "With Scan Coin's customer operated coin deposit system . . . ," 2 pages (date unknown, prior to Apr. 2003).
ShieldSpec LLC: Currency Manager for Law Enforcement, 1 page (downloaded from www.shieldspec.com/product.html on Aug. 18, 2010).
ShieldSpec LLC: Presentation on Currency Manager for Law Enforcement, 10 pages (downloaded from www.shieldspec.com/documents/CurrencyManagerLawEnforcement.pdf on Aug. 18, 2010), © 2005.
Toshiba/(Mosler): CF-400 Series Fitness Sorter, 6 pages (estimated 1989 or earlier).
(Toshiba)/Mosler: CF-420 Cash Management System—Operator's Manual, 137 pages (© 1989).
Toshiba/Mosler: CF-420—Description of Toshiba/Mosler CF-420 Device, 1 page (date estimated 1989).
Toshiba/Mosler: CF-420—Revised drawings of portions of Mosler CF-420 Cash Management System (Figs. A-C) and description of the same, 4 pages (1989).

BARS: 5000 Currency Sorter, 6 pages (estimated prior to Aug. 13, 2003).
BARS: 5600 Currency Sorter, 6 pages (estimated prior to Aug. 12, 2003).
BARS: 6000 Single Note Inspection System, 6 pages (estimated prior to Aug. 12, 2003).
Cummins: JetScan™ iFX i100 Series Currency Scanner brochure (Form 023-1789), 6 pages (May 2009).
Cummins: JetScan™ iFX i100 Series Currency Scanner brochure (Form 023-1789, Rev. 1), 6 pages (Sep. 2009).
Cummins: JetScan™ iFX i100 Series Currency Scanner brochure (Form 023-1789, Rev. 2), 6 pages (© 2010).
Cummins: JetScan™ iFX Series i100 shell, "The Next Generation JetScan," (Form 023-1792), 2 pages (May 2009).
Cummins: JetScan™ iFX i100 Series Currency Scanner brochure, "Ideal for Law Enforcement Applications," (Form 023-1798), 1 page (Sep. 2009).
Cummins: JetScan™ iFX i100 Series Currency Scanner mailer, "Don't Let the Evidence Get Away!," (Form 023-1799), 2 pages (Sep. 2009).
Cummins: JetScan™ iFX i100 Series Currency Scanner mailer, "Two departments just made large drug busts . . . ," (Form 023-1820), 3 pages (Jun. 2010).
Cummins: JetScan™ iFX i100 Series Currency Scanner, Operating Instructions (Form 022-7614-00), 108 pages (Oct. 2010).
Cummins: JetScan™ iFX i100 Series Currency Scanner brochure, "Advanced Evidence Processing for Law Enforcement," (Form 023-1816), 6 pages (© 2010).
Cummins: JetScan™ iFX Series i100 brochure, "The Next Generation JetScan," (Form 023-1792 Rev. 1), 2 pages (Mar. 2011).
Cummins: JetScan™ iFX i100 Series, Quick Reference (022-7631-00), 28 pages (Mar. 2011).
Cummins: JetScan™ iFX i100 Currency and Check Processor website, "Revolutionizing the way you process currency and checks," (http://ifx.cumminsallison.com/models/i100), 2 pages (Jul. 2011).
Cummins: JetScan™ iFX Series i100 Currency and Check Solution brochure, "Never process a check or bill the same way again," (Form 023-1858), 6 pages (© 2011).
Cummins: JetScan™ iFX Series i100 Currency and Check Scanner brochure, "Never process a check or bill the same way again," (Form 023-1858), 6 pages (© 2011) [downloaded Jul. 20, 2011].
Cummins: JetScan™ iFX Series i100 Currency Scanner brochure, "Never Photocopy a Bill Again," (Form 023-1863), 4 pages (© 2011).
Cummins: JetScan™ iFX Series i200 Currency Scanner brochure, "20%, 60% Fewer Rejects," (Form 023-1859), 6 pages (© 2011).
Cummins: JetScan™ iFX i400 Series, Quick Reference (022-7669-00), 20 pages (May 2011).
Cummins: JetScan™ iFX i400 Series Currency Scanner, Operating Instructions (Form 022-7666-00), 87 pages (May 2011).
Cummins: JetScan™ iFX Series i400 Multi-Pocket Sorter brochure, "Smallest, fastest, most flexible multi-pocket sorter," (Form 023-1860), 6 pages (© 2011).
Cummins: JetScan™ iFX Image-Management Software, Operating Instructions (022-7615-00), 58 pages (Jul. 2011).
De La Rue: 2700 Currency Counting Machine—User Guide, Revision 1, 53 pages (Aug. 26, 1999).
Document Solutions Inc.: Image Solution, DialogWeb, "Bank Gets Big Response to Image Statements", Electronic Imaging Report, vol. 2, No. 9, 3 pp. (May 6, 1992 ).
Glory: GFF-8CF and GFF-8 Desktop Currency and Check Counter, 4 pages (date estimated Jan. 1994).
Hayosh, Thomas D, "The History of the Check and Standardization Efforts," 5 pages, dated Sep. 26, 1995, available at http://home.comcast.net/~hayosh/HISTMICR.pdf (visited Sep. 22, 2011).
Litton Integrated Automation: Proceedings, SPIE—International Society for Optical Engineering, Optical Security and Anticounterfeiting Systems (vol. 1210), "High Speed Print Quality Inspection and Verification," by Cynthia Ott and Nagesh Chowla re Mavis, 9 pages (Jan. 1990) [GL 010713-21].
NCR: NCR 5685 ATM Deposit Processing Module, DialogWeb, "NCR's ATM Captures Images at the Point of Deposit. (NCR Corp.'s

(56) References Cited

OTHER PUBLICATIONS

New Automated Teller Machine)", Financial Services Report, vol. 10, No. 2, p. 8(1), 2 pages (Jan. 20, 1993).

NCR: Intelligent Deposit Atm's, "Mixes of cash, checks no problem with Regions Bank ATMs," article, 2 pages (Jun. 10, 2009).

Vector: Miscellaneous meeting notes and communications between Cummins Allison Corp. and Vector Co. Ltd regarding Vector imager, 65 pages (Apr. 1, 1996 to Jun. 15, 1997).

Vector Tech: Document Imaging Product Demonstration video on CD in .wmv format (Jun. 1996).

* cited by examiner

| ACCOUNT | 123 | DESCRIPTION | DEPOSIT |
| BATCH | 503 | BILL | 1 |

OK

CK 69860277A  — 910

EDIT SERIAL NUMBER

CK****0277A  — 920

[CANCEL]  [OK]  [NEXT]

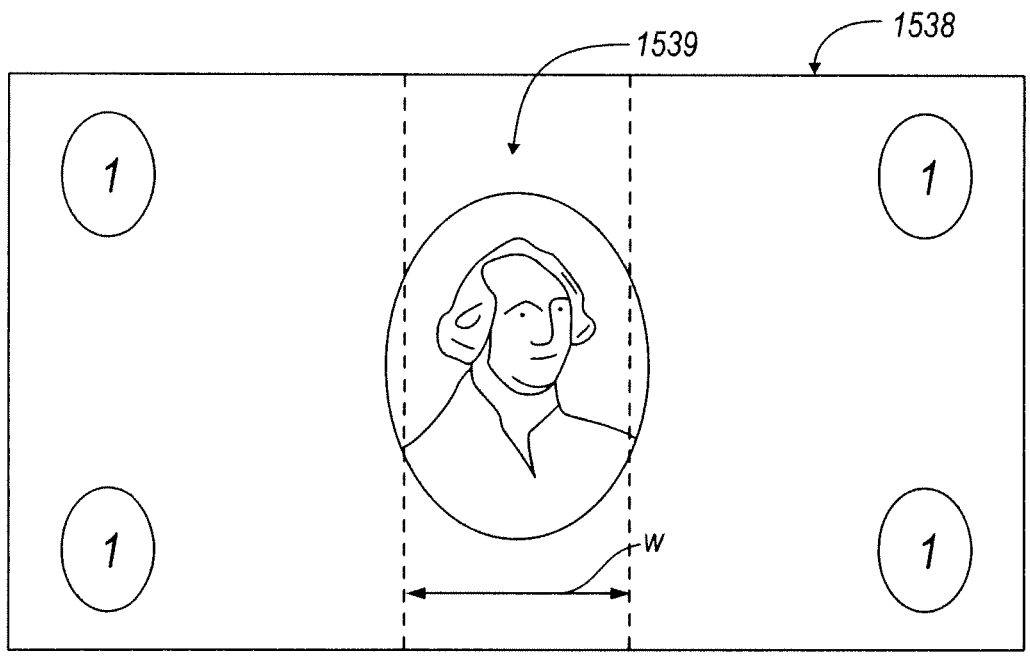
FIG. 15a
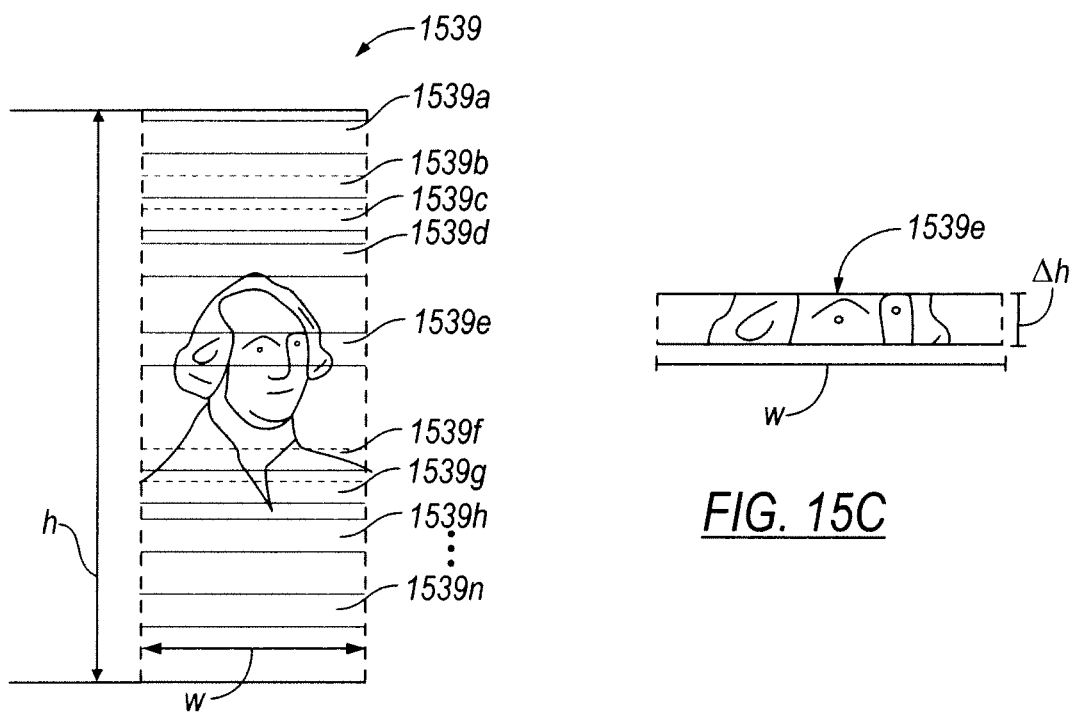
FIG. 15b
FIG. 15C

DOCUMENT IMAGING AND PROCESSING SYSTEM FOR PERFORMING BLIND BALANCING AND DISPLAY CONDITIONS

CROSS-REFERENCE TO RELATED APPLICATIONS

This application is a continuation of prior U.S. patent application Ser. No. 12/044,720, filed Mar. 7, 2008, now U.S. Pat. No. 8,204,293, which claims the benefit of U.S. Provisional Application No. 60/905,965, filed Mar. 9, 2007, and U.S. Provisional Application No. 61/022,752, filed Jan. 22, 2008, each of which is hereby incorporated by reference herein in its entirety.

FIELD OF THE INVENTION

The field of the invention relates generally to document processing systems. More particularly, the present invention relates to systems for the imaging and handling of financial documents along with systems for processing information extracted from financial documents.

BACKGROUND OF THE INVENTION

In the financial banking industry, and in general, it is important that counterfeit or forged financial documents (for example, currency bills or checks) be discovered quickly and accurately. There is a need for improved financial document processing systems and, in particular, for improved currency processing systems including currency processing systems that can image currency bills, retain electronic records containing the image of processed currency bills or portions thereof, and data associated with those images and/or processed bills. There is also a need for financial document processing systems with improved systems for processing data associated with financial documents.

SUMMARY OF THE INVENTION

According to some embodiments, a document processing system comprises one or more currency scanning devices configured to rapidly process a stack of currency bills, obtain images of the processed bills, and extract information from the images of the processed bills that uniquely identify a bill. The system further comprises a processor connected to the one or more scanning devices. The processor is configured to receive the images and/or the extracted information from the scanning devices and is further configured to employ a correction routine configured to adjust errors in the extracted information from the document image.

According to some embodiments, a document processing device comprises an input receptacle configured to receive a plurality of documents and an image scanner configured to obtain a document image of at least a portion of one side of each of the plurality of documents. The scanner is further configured to extract information from the document image. The device further comprises a transport mechanism configured to transport each of the plurality of documents one at a time from the input receptacle passed the image scanner and to an output receptacle. A controller is coupled to the transport mechanism and to the image scanner. The controller is configured to at least partially control the transport mechanism and the image scanner. A memory is coupled to at least one of the controller and the image scanner. The memory being configured to store at least one of information extracted from the document image and information identifying at least one of counterfeit and forged documents. The device further comprises a processor that is coupled to the memory. The processor is configured to compare the information extracted from the document image with information stored in the memory for identifying at least one of counterfeit and forged documents. The processor further being configured to identify at least one of a suspected counterfeit and forged document based on the comparison operation. The document processing device continuously transports documents during the comparison and identification operation. Moreover, the information extracted from the document image at least partially contains character information obtained from a predetermined field of the document image. The processor may also contain a search routine configured to search the character information.

According to some embodiments, a document processing system comprises a plurality of document scanning devices that extract information from document images. The document system further comprises a central processor remotely connected to the document scanning devices. The central processor is configured to receive the document images and the extracted information from the document scanning devices. The central processor is further configured to employ a correction routine configured to adjust an error in the extracted information from the document image.

According to some embodiments, a currency note processing device comprises at least one input receptacle configured to receive a plurality of currency notes and an image scanner configured to obtain at least a partial image of at least one side of each of the plurality of currency notes. The currency note processing device further comprises a transport mechanism configured to transport each of the plurality of currency notes one at a time from the input receptacle to the image scanner and from the image scanner to an output receptacle. A controller is coupled to the transport mechanism and to the image scanner. The controller is configured to at least partially control the transport mechanism and the image scanner. A memory, configured to store the at least partial image, is coupled to the image scanner. The currency note processing device further comprises a processor coupled to the memory. The processor is configured to denominate the plurality of currency notes by applying a denominating algorithm to the stored at least partial image.

According to certain embodiments, a document processing device comprises an input receptacle configured to receive a plurality of documents and an image scanner configured to obtain a document image of at least a portion of at least one side of each of the plurality of documents. The scanner is further configured to extract information from the document image. The document processing device further comprises a transport mechanism configured to transport each of the plurality of documents one at a time from the input receptacle to the image scanner and from the image scanner to an output receptacle. A controller is coupled to the transport mechanism and to the image scanner. The controller is configured to at least partially control the transport mechanism and the image scanner. A memory, coupled to at least one of the controller and the image scanner, is configured to store the information from the document image. The document processing device further comprises a processor coupled to the memory. The processor is configured to execute a correction routine that applies a first algorithm for automatically adjusting errors identified in the extracted information.

Additional aspects and other advantages of the invention will become apparent upon reading the following detailed description and upon reference to the drawings.

BRIEF DESCRIPTION OF THE DRAWINGS

In the following, certain embodiments of the invention will be described with reference to the drawings, wherein:

FIG. 2b is a side cross-sectional view of the device shown in FIG. 2a.

FIG. 3b is a side cross-sectional view of the device shown in FIG. 3a.

FIG. 4b is a top partial view of the device shown in FIG. 4a.

FIG. 4c is a side, partial sectional view of the device shown in FIG. 4a.

FIG. 9 is a representation of an interface for correcting incomplete serial number extractions according to some embodiments of the present disclosure.

FIG. 15a is a top view of an image of a currency bill having an image portion.

FIG. 15b is a top view of the image portion of FIG. 15a with a plurality of sample areas defined.

FIG. 15c is a top view of one of the sample areas of FIG. 15b.

Figure 1:
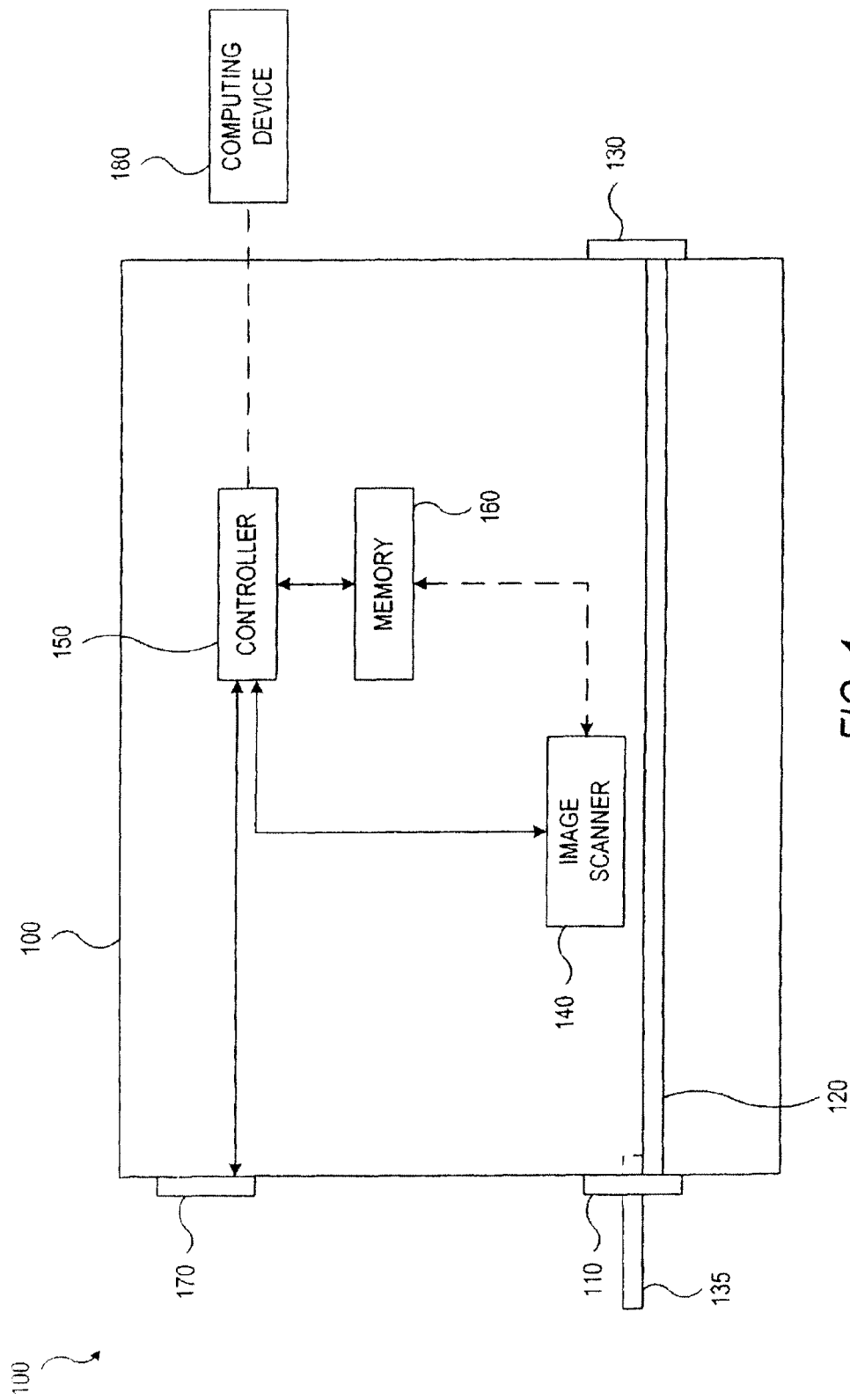
FIG. 1 is a functional block diagram of a document scanning device according to some embodiments of the present disclosure.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF ILLUSTRATIVE EMBODIMENTS

When describing various embodiments, the term "currency bills" refers to official currency bills including both U.S. currency bills, such as a $1, $2, $5, $10, $20, $50, or $100 note, and foreign currency bills.

Foreign currency bills are bank notes issued by a non-U.S. governmental agency as legal tender, such as a Euro, Japanese Yen, or British Pound note.

"Substitute currency notes" are sheet-like documents similar to currency bills but are issued by non-governmental agencies such as casinos and amusement parks and include, for example, casino script and Disney Dollars. Substitute currency notes each have a denomination and an issuing entity associated therewith such as a $5 Disney Dollar, a $10 Disney Dollar, a $20 ABC Casino note and a $100 ABC Casino note.

"Currency notes" consist of currency bills and substitute currency notes.

"Substitute currency media" are documents that represent a value by some marking or characteristic such as a bar code, color, size, graphic, or text. Examples of "substitute currency media" include without limitation: casino cashout tickets (also variously called cashout vouchers or coupons) such as "EZ Pay" tickets issued by International Gaming Technology or "Quicket" tickets issued by Casino Data Systems; casino script; promotional media such as Disney Dollars or Toys 'R Us "Geoffrey Dollars"; or retailer coupons, gift certificates, gift cards, or food stamps. Accordingly, substitute currency media includes, but is not limited to, substitute currency notes. Substitute currency media may or may not be issued by a governmental body.

The term "currency documents" includes both currency bills and "substitute currency media."

The term "non-currency documents" includes any type of document, except currency documents.

Although many embodiments refer to the "denomination" of currency bills as a criterion used in judging the currency bills, other predetermined criteria can be used to judge the currency bills or documents, such as, for example, color, size, orientation, series, fitness, condition, etc.

Various embodiments described herein can be used to judge non-currency documents and/or currency documents according to one or more predetermined criteria, such as color, size, shape, orientation, series, fitness, condition, etc.

Everyday, businesses and people unknowingly accept counterfeit currency documents as genuine. A counterfeit currency document is a currency document which is not issued by an authorized maker. For example, in the case of U.S. currency bills, a counterfeit currency bill would be a document printed to look like a genuine U.S. bill but not printed by the U.S. Treasury Department's Bureau of Engraving and Printing. In terms of casino script, a counterfeit currency document would be a script that is not issued by the casino or one that has been tampered with or altered.

The term "businesses" refers to any business or entity accepting money from another entity or person. Throughout most of this description, the term "bank" will be used for ease of description. It should be understood, however, that this disclosure also applies to people, companies, corporations, other financial institutions such as savings and loans, and any other entity that receives currency bills or currency documents. To reduce the costs associated with receiving counterfeit currency documents and to prevent the receiving entity, such as a bank, from having to assume all of the risks and costs from accepting counterfeit currency documents, a document processing system according to the present disclosure may be used.

Turning now to FIG. 1, a block diagram of a document scanning device 100 according to some embodiments of the present disclosure is illustrated. The document scanning device 100 includes an input receptacle 110, a transport mechanism 120, and an output receptacle 130. Only one input receptacle 110 and one output receptacle 130 are illustrated in FIG. 1. According to other embodiments, however, the document scanning device 100 may include a varying number of input receptacles 110 and output receptacles 130. For example, according to some embodiments, the device 100 may have two input receptacles, one for currency bills and one for checks, or simply to accommodate a greater number of currency documents. As another example, a device 100 can have a single input receptacle 110 capable of accommodating both currency bills and checks within input receptacle 110 and one or more output receptacles 130. According to some embodiments, the document scanning device 100 may be adapted to receive a stack of intermingled currency bills and checks in the input receptacle 110 and to process the intermingled stack of documents.

An operator inserts a currency document 135 into the input receptacle 110. In this application, the term "operator" refers to someone operating scanning device under normal operating conditions such as a bank employee or customer. The document scanning device 100 may be used in a variety of situations. For example, the document scanning device 100 may be used as an unattended device, like an Automated Teller Machine (ATM) or other interfaced device, in which the operator is a customer who uses the device to deposit currency documents and/or checks into a bank account. In another embodiment, the document scanning device 100 may be a non-interfaced, stand-alone device. In another embodiment, the document scanning device 100 may be a semi-attended device where both a customer and an employee are at the device. In another alternative embodiment, the document scanning device 100 may be used only by employees of the bank or other entity using it.

According to some embodiments, the document scanning device 100 may be adapted to receive only one currency document at a time. According to other embodiments, the document scanning device may be adapted to receive a stack of currency documents in the input receptacle 110. The transport mechanism 120 is coupled to the input receptacle 110 and is adapted to transport currency bills or documents along a transport path through the document scanning device 100, past an image scanner 140 and to one or more output receptacles 130. According to some embodiments, a controller or processor 150 is linked to the image scanner 140, the transport mechanism 120, a memory 160, and an operator interface or control panel 170. The controller is adapted to control the operation of the transport mechanism 120 and the image scanner 140, communicate information to and from the memory 160, and to communicate information to and from the operator control panel 170. For example, the controller 150 may send display information to and receive operator input from the operator control panel 170.

Once the image scanner 140 receives an instruction from the controller 150, the image scanner 140 scans a currency document 135, and obtains an image of the currency document. The image may be an image of substantially the entire currency document 135 (a "full image") or of selected portions of the currency document 135. The image scanner 140 or controller 150 may contain data extraction software such as optical character recognition (OCR) software for identifying the characters contained in one or more fields of the image of a currency document. For example, the OCR software may implement a search of the full image of a currency bill for a serial number field, extract the serial number once the field is located, and transfer the determined serial number data to the memory 160 through the controller 150 for storage. In an alternative embodiment, the image scanner 140 is directly linked to the memory 160 for the transfer and storage of the images and/or extracted data.

The memory 160 may be adapted to store the images of the currency documents 135 or other documents scanned by the image scanner 140. According to some embodiments, the memory 160 is adapted to store the full image of processed currency documents 135 or other processed documents (that is, data associated with a picture of the entire document 135). According to some embodiments, the memory 160 may be adapted to only store an image of a portion of currency documents 135. For example, it may be that the memory 160 only needs to store an image of half of the currency document 135 and still have the fields needed for a particular application. According to some embodiments, the memory 160 is also adapted to store extracted information, such as information which may be used to uniquely identify bills, track documents, and/or assist in detecting counterfeit currency documents. For example, it is known that people who create counterfeit U.S. currency bills often reuse the same serial number on the counterfeit currency bills. Therefore, according to some embodiments, the memory 160 is adapted to store serial numbers associated with known counterfeit bills and/or the serial numbers extracted from bills otherwise determined to be suspected counterfeit bills by the scanning device 100.

According to some embodiments, when a currency bill is scanned, the controller 150 or an alternate computing device 180 compares the serial number of the scanned currency bill against any serial numbers stored in the memory 160. If a match is found, the controller 150 may send a signal to the operator control panel 170 to indicate that a suspected counterfeit bill has been found. In some embodiments, the bill suspected to be counterfeit may be flagged. In some embodiments, a number of data can be used to assess whether a bill is a suspect bill, including serial number, denomination, series, issuing bank, image quality, infrared characteristics, ultraviolet characteristics, color shifting ink, watermarks, metallic threads, holograms, etc., or some combination thereof.

In other types of currency documents, another predetermined or encoded field may be used to check for authenticity. For example, in bar coded tickets or currency documents using bar codes, certain bar codes may be known to be counterfeit. Alternatively, other security features, such as certain arrangements only going with certain denominations, may be utilized to determine the authenticity of the currency bill. For example, a hologram may only be used with high denomination currency bills, so a lower denomination bill that has a hologram would be recognized as being counterfeit. Other encoded fields may also be utilized in a similar fashion. In some embodiments, the fields utilized may be overt security codes, such as a series number, or they may be covert security codes that are not made public by the government to provide greater security, such as magnetic coated threads or radio frequency identification (RFID) tags.

In some embodiments, the controller 150 may cause the operation of the document scanning device 100 to halt once a counterfeit currency document is flagged or detected so that the suspect document may be examined. According to some embodiments, such as devices having more than one output receptacle, suspected counterfeit bills may be off-sorted to another output receptacle, while the document scanning device 100 continues to run. Once this occurs, the operator may be notified of the serial number of the counterfeit bill via the operator control panel 170. The operator control panel 170 may be, for example, a display screen that is capable of depicting images or it may only be an LED light that illuminates or blinks to warn of a counterfeit currency document.

According to some embodiments, the document scanning device 100 is communicatively coupled to a separate computing device or processor 180 such as a personal computer (PC). In some embodiments, the scanning device 100 is adapted to obtain images of processed currency documents or checks and to send those images to a PC 180 or other remote device able to process the images. According to some embodiments, the data extraction from the obtained images, such as by OCR software and/or additional image processing, is performed on a computing device 180 that is separate from document scanning device 100 as opposed to within the scanning device 100 itself. In other embodiments, data extraction such as via OCR is performed within the document scanning device 100, such as on a processor that is part of image scanner 140 or controller 150.

According to some embodiments, the extracted data such as OCRed characters retrieved from a scanned image of a currency bill are then sent to an external computing device 180 for further processing or storage. In an exemplary embodiment, a document scanning device is self-contained to perform the computing operations needed to perform one or more of the following tasks: obtain a full image of a currency bill, capture the currency bill serial number, recognize the currency bill denomination, identify the currency bill series, perform an OCR algorithm to extract character information from the currency bill, enhance an image such as by deskewing, correct errors to the OCR character information extracted from a currency bill, and/or transferring extracted data to a database. In other embodiments, image and extracted character data may be sent to an external device such as a printer, computer, and/or external storage device. Image and extracted character data can be used to update customer account information, identify counterfeit documents, and/or provide an archive record for retrieval at a later date.

Additional information regarding scanning devices, systems, and method associated with the present disclosure may be found in:

U.S. application Ser. No. 11/194,380, filed on Aug. 1, 2005, and published as U.S. Pub. No. 2005-0265591 A1;

U.S. application Ser. No. 11/198,065, filed on Aug. 5, 2005, and published as U.S. Pub. No. 2006-0010071 A1;

U.S. application Ser. No. 11/199,511, filed on Aug. 8, 2005, and published as U.S. Pub. No. 2005-0278239 A1;

U.S. application Ser. No. 09/965,428, filed Sep. 27, 2001, now issued as U.S. Pat. No. 7,187,795; and U.S. application Ser. No. 10/638,231, filed on Aug. 7, 2003, and published as U.S. Pub. No. US 2004-0028266 A1.

Each of the applications and publications identified above are incorporated herein by reference in their entireties.

Figure 2A:
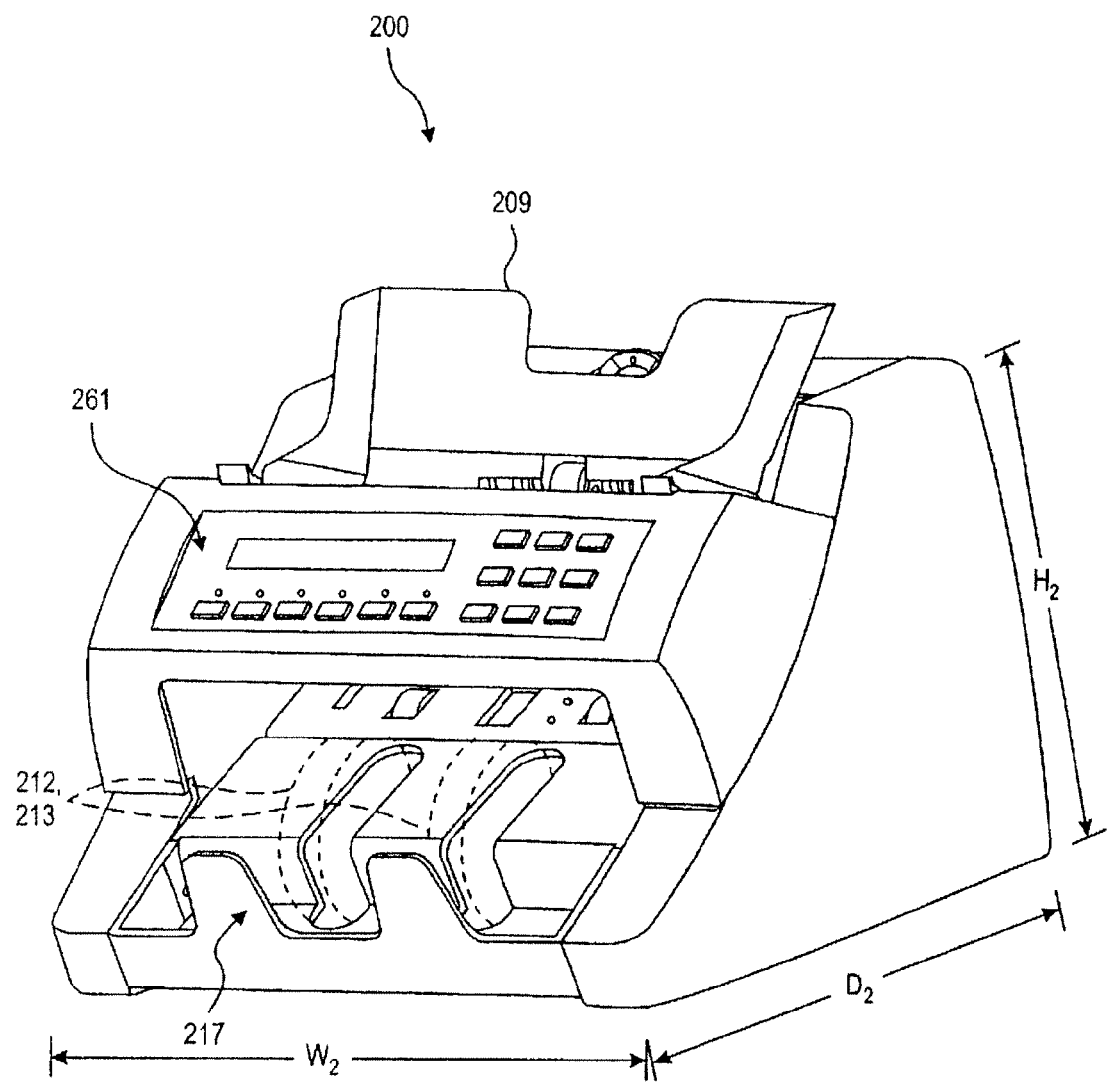
FIG. 2a is a perspective view of a compact document scanning device according to some embodiments of the present disclosure.
Figure 2B:
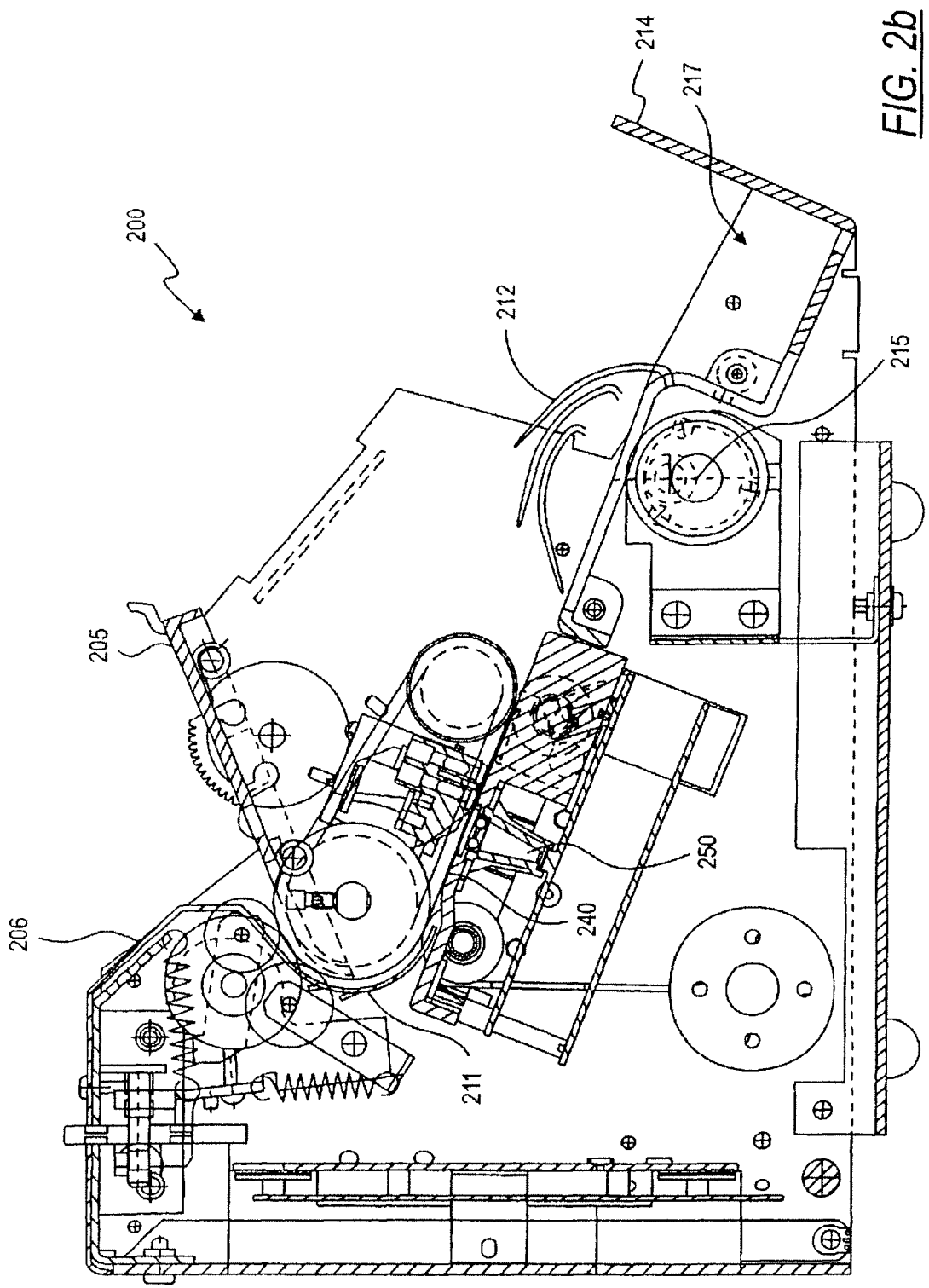

FIGS. 2a and 2b depict a compact document scanning device 200 according to some embodiments of the present disclosure. The compact document scanning device 200 illustrated in FIGS. 2a and 2b is described and illustrated in more detail in U.S. Pat. No. 5,687,963, which is incorporated herein by reference in its entirety. The device 200 contains one or more image scanners as described in the present disclosure. Documents are fed one by one from a stack of documents placed in an input receptacle 209 into a transport mechanism. The transport mechanism includes a transport plate or guide plate 240 for guiding a document to an output receptacle 217. Before reaching the output receptacle 217, the document can, for example, be imaged, denominated, evaluated, analyzed, counted, and/or otherwise processed by a full image scanning module 250 and/or other sensors.

The compact document scanning device 200 in FIG. 2a has an operator interface 261, such as, a touch panel display. According to some embodiments, the touch panel display displays "functional" keys when appropriate. The touch panel display 261 simplifies the operation of the compact document processing system 200. Alternatively or additionally, the operator interface may contain physical keys or buttons and/or another type of display such as an LED display. For example, a ten key numerical keypad may be utilized.

According to some embodiments, a pair of driven stacking wheels 212, 213 are located in the output receptacle 217 and come into contact with the documents as the documents are transported into the output receptacle 217. The stacking wheels 212, 213 are supported for rotational movement about respective shafts 215 journalled on a rigid frame and driven by a motor (not shown). Flexible blades of the driven stacking wheels 212, 213 deliver the documents onto a forward end of a stacker plate 214. While stacking wheels with flexible blades are shown, for example in FIG. 2, other known techniques for stacking documents may be used.

According to some embodiments, the document scanning device 200 is compact, having a height ($H_2$) of about 9 to 12½ inches, a width ($W_2$) of about 11 to 15 inches, and a depth ($D_2$) of about 12 to 16 inches. According to some embodiments, the high-speed scanning device 200 has a footprint of less than 2 square feet. According to some embodiments, the high-speed scanning device 200 has a footprint of less than 1½ square feet. According to some embodiments, the high-speed scanning device 200 has a footprint of less than 1 square feet.

Figure 3A:
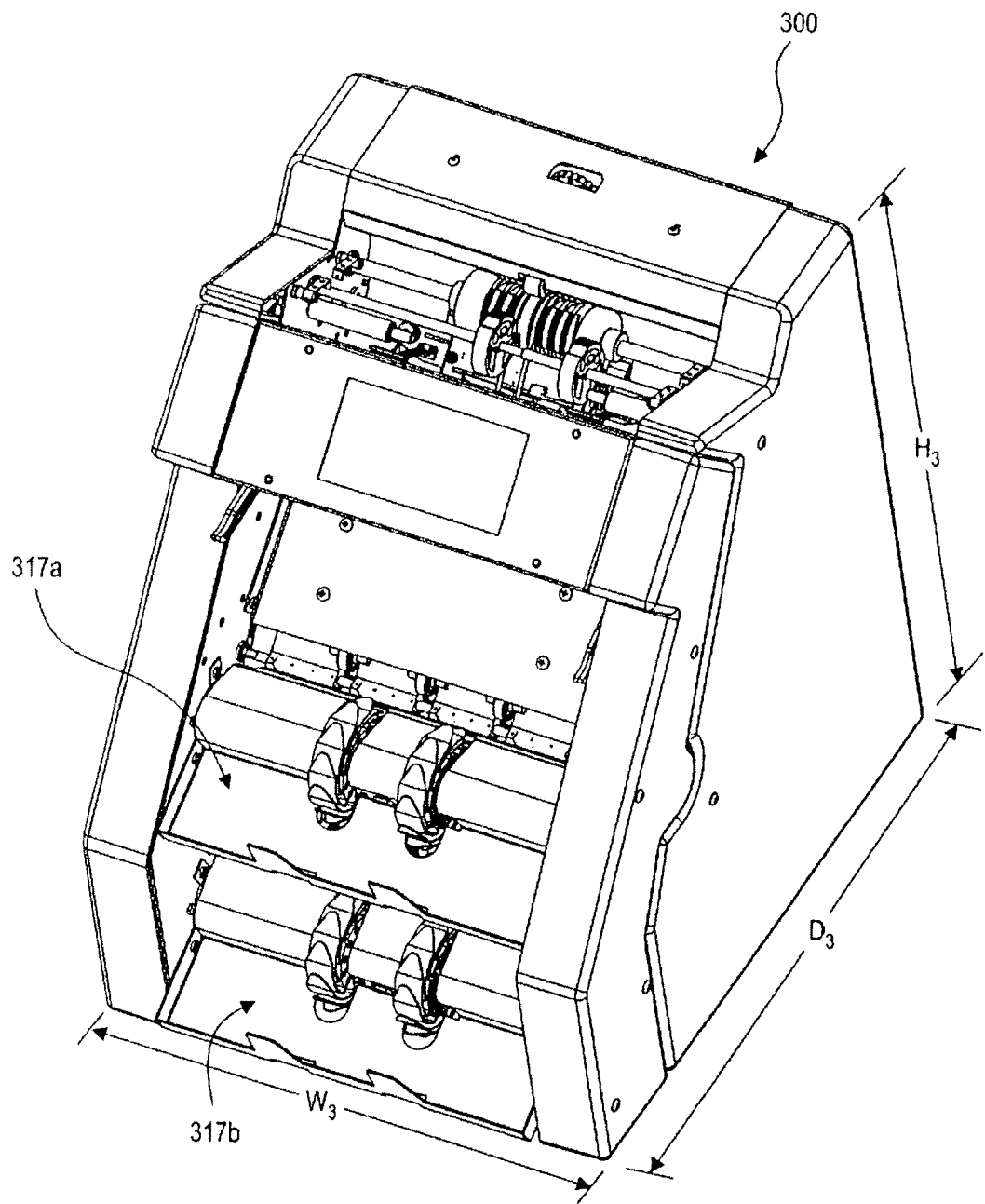
FIG. 3a is a perspective view of a compact document scanning device having multiple pockets according to some embodiments of the present disclosure.
Figure 3B:
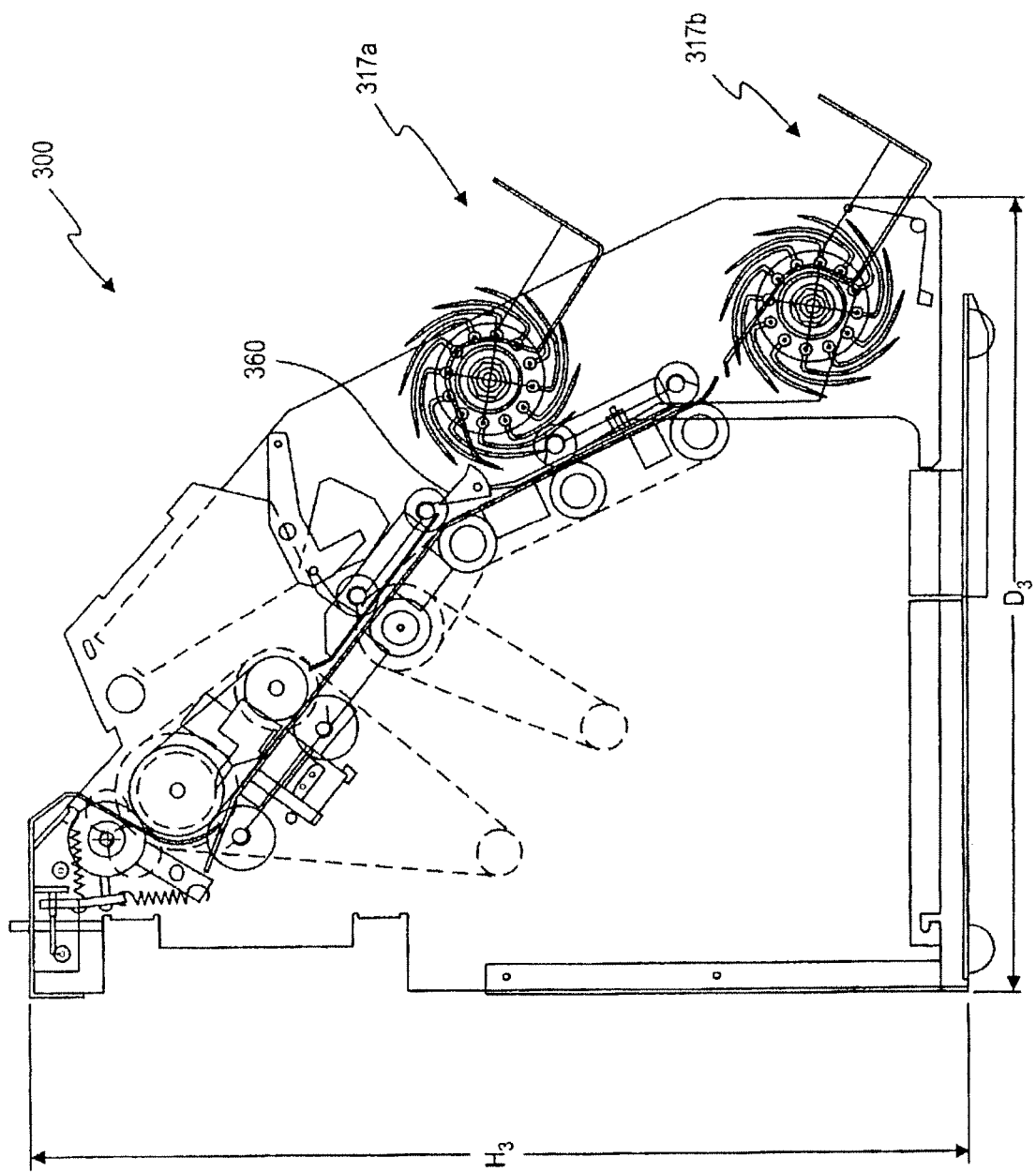

FIGS. 3a and 3b depict an exterior perspective view and a side cross-sectional view of a multi-pocket compact document scanning device 300 containing one or more image scanners, as described in the present disclosure. According to some embodiments, the process for carrying documents through the system is the same as discussed above, except that the processing system has two output receptacles 317a, 317b. In the illustrated embodiment, a diverter 360 directs the documents to either the first or second output receptacle 317a, 317b. When the diverter 360 is in a lower position, documents are directed to the first output receptacle 317a. When the diverter 360 is in an upper position, documents proceed in the direction of the second output receptacle 317b. Details of multiple output receptacles and devices are described in International Publication No. WO 97/45810, which is incorporated herein by reference in its entirety. According to some two pocket embodiments, counterfeit documents may be off-sorted without having to stop the device. Also, such embodiments may be used in sorting between different types of documents, denominations, or series.

According to some embodiments, the document scanning device 300 is compact, having a height ($H_3$) of about 17½ inches, a width ($W_3$) of about 13½ inches, and a depth ($D_3$) of about 15 inches. According to some embodiments, the document scanning device has dimensions of a height ($H_3$) of about 20 inches, a width ($W_3$) of about 15 inches, and a depth ($D_3$) of about 18 inches. The document scanning device 300 may be rested on a tabletop. According to some embodiments, the high-speed scanning device 300 has a footprint of less than 2 square feet. According to some embodiments, the high-speed scanning device 300 has a footprint of less than 1½ square feet. According to some embodiments, the high-speed scanning device 300 has a footprint of less than 210 $in^2$.

According to some embodiments of compact document scanning devices 100, 200, 300, documents are transported, imaged, scanned, and identified at a rate of between about 300 to about 400 documents per minute. According to some embodiments of compact document scanning devices 100, 200, 300, documents are transported, imaged, scanned, and identified at a rate in excess of 600 documents per minute. In other embodiments, documents such as checks or currency bills are transported, imaged, scanned, and identified at a rate in excess of 800 bills or documents per minute by the scanning devices 100, 200, 300. In yet other embodiments, documents such as checks or currency bills are transported, imaged, scanned, and identified at a rate in excess of 1000 bills or documents per minute by the scanning devices 100, 200, 300. In some embodiments, documents are transported, imaged, scanned, and identified at a rate in excess of 1200 bills per minute by the scanning devices 100, 200, 300. According to some embodiments, the scanning devices 100, 200, 300 transport documents at a rate in excess of 1500 bills per minute.

Figure 4A:
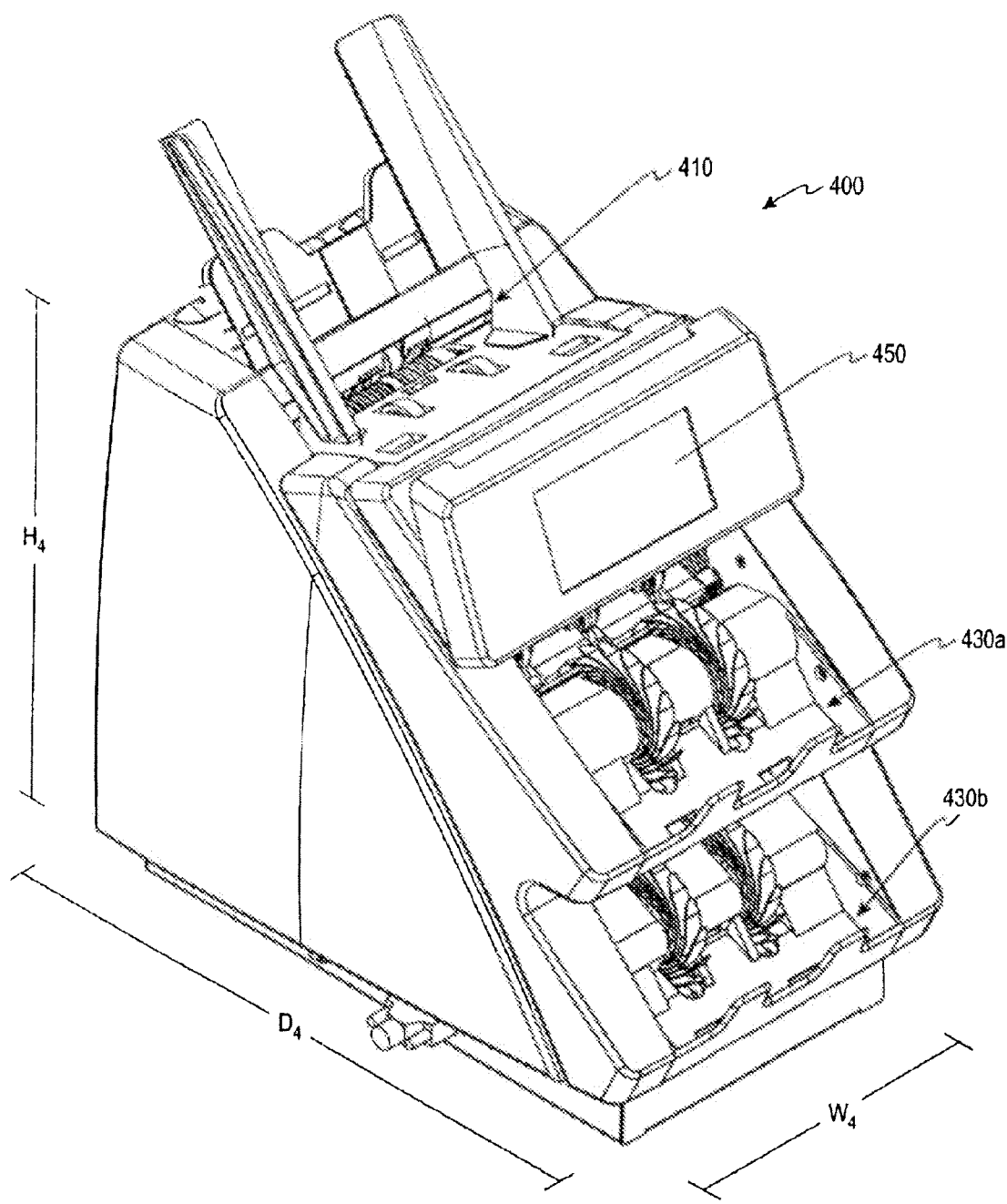
FIG. 4a is a perspective view of a document scanning device according to some embodiments of the present disclosure.
Figure 4B:
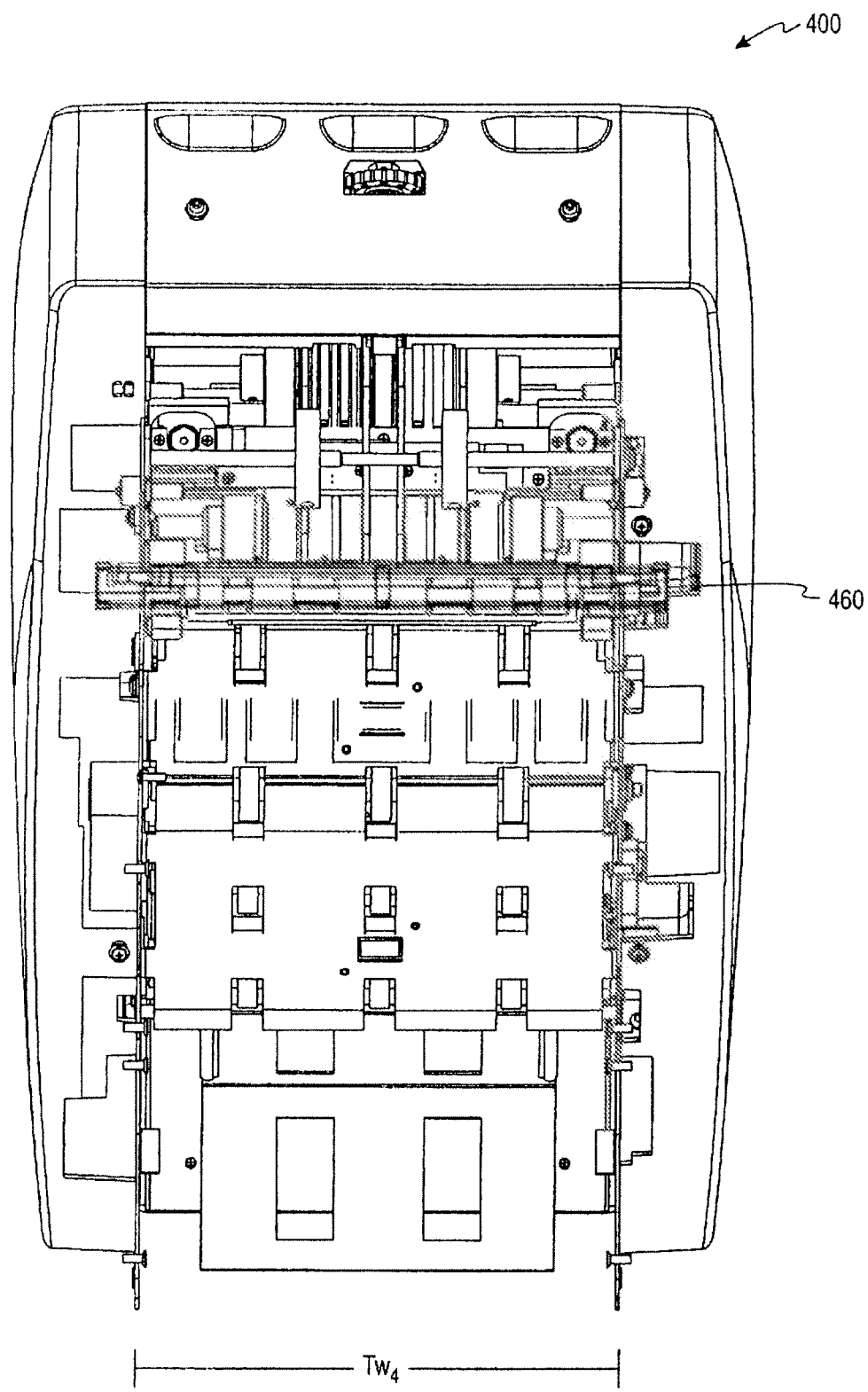
Figure 4C:
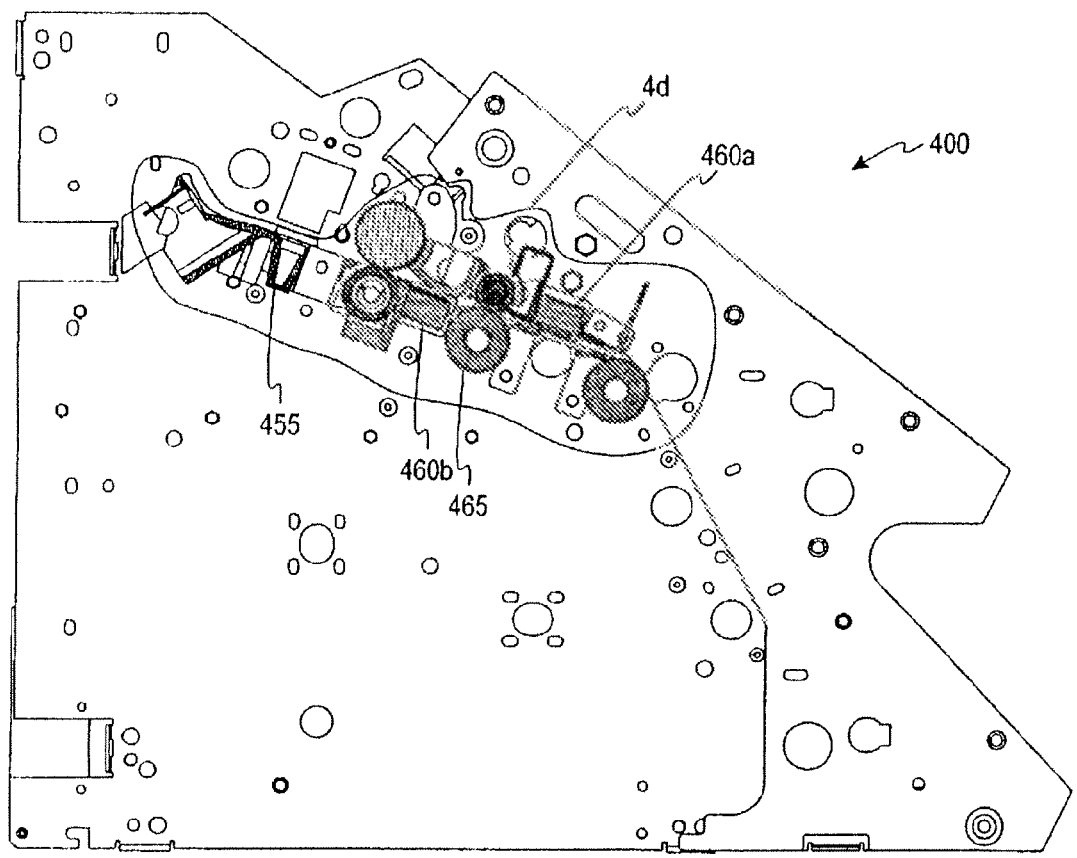

FIGS. 4a-4d depict a document scanning device 400 according to some embodiments of the present disclosure. FIG. 4a is a perspective view, FIG. 4b is a top partial view, and FIG. 4c is a side partial sectional view of document scanning device 400. The document scanning device in the illustrated embodiment has one input receptacle 410 adapted to receive documents to be processed. A transport mechanism is adapted to feed documents from the input receptacle 410 along a transport path to one or both of a first output receptacle 430a and a second output receptacle 430b. According to some embodiments, the document scanning device 400 has an operator interface or control panel 450. According to some embodiments, the operator interface 450 comprises a touch screen adapted to display "functional" keys when appropriate. Alternatively or additionally, the operator interface 450 may contain physical keys or buttons and another type of display such as an LED display. For example, a ten key numerical keypad may be utilized. According to some embodiments the operator interface 450 is adapted to display information regarding the documents being scanned and/or status information concerning the operation of the scanning device 400. For example, according to some embodiments, the operator interface 450 is adapted to display the serial number for a document of concern, such as a currency bill that may be identified as a possible counterfeit bill or a currency bill whose complete serial number was unreadable by OCR and requires manual review and possible correction or completion by the operator.

Documents are fed by the transport mechanism, one at a time or serially past denominating sensor 455 and then past image scanners 460a, 460b, which are adapted to retrieve a full or partial image of each passing document. In some exemplary embodiments, image scanner 460 is an the AMI Semiconductor Model PI228 image sensor or other similar models such as image sensors having different light sources or combinations thereof, including, but not limited to white, red, green, blue, infra-red and/or ultraviolet light image sensors. According to some embodiments, the image obtained using the image scanner may be compressed, for example into a .jpg or .tif format, in order to minimize the transmission bandwidth between the various components of a document scanning system. Image compression is useful for several reasons including the minimization of data transmission between document processing system components.

According to some embodiments, the two-pocket document scanning device 400 is compact, having a height ($H_4$) of or less than about 15 inches, a width ($W_4$) of or less than about 10½ inches, and a depth ($D_4$) of or less than about 17 inches. According to some embodiments, the high-speed scanning device 400 has a footprint of less than about 2 square feet. According to some embodiments, the high-speed scanning device 400 has a footprint of less than about 1½ square feet. According to some embodiments, the high-speed scanning device 300 has a footprint of less than about 1¼ square feet. According to some embodiments, the scanning device 400 weighs less than about 35 lbs. According to some embodiments, the document scanning device 400 is compact and adapted to be rested on a tabletop or countertop. According to some embodiments, the document scanning device can be a part of a larger document processing device such as, for example, larger systems used for currency or other types of document sorting.

Figure 4D:
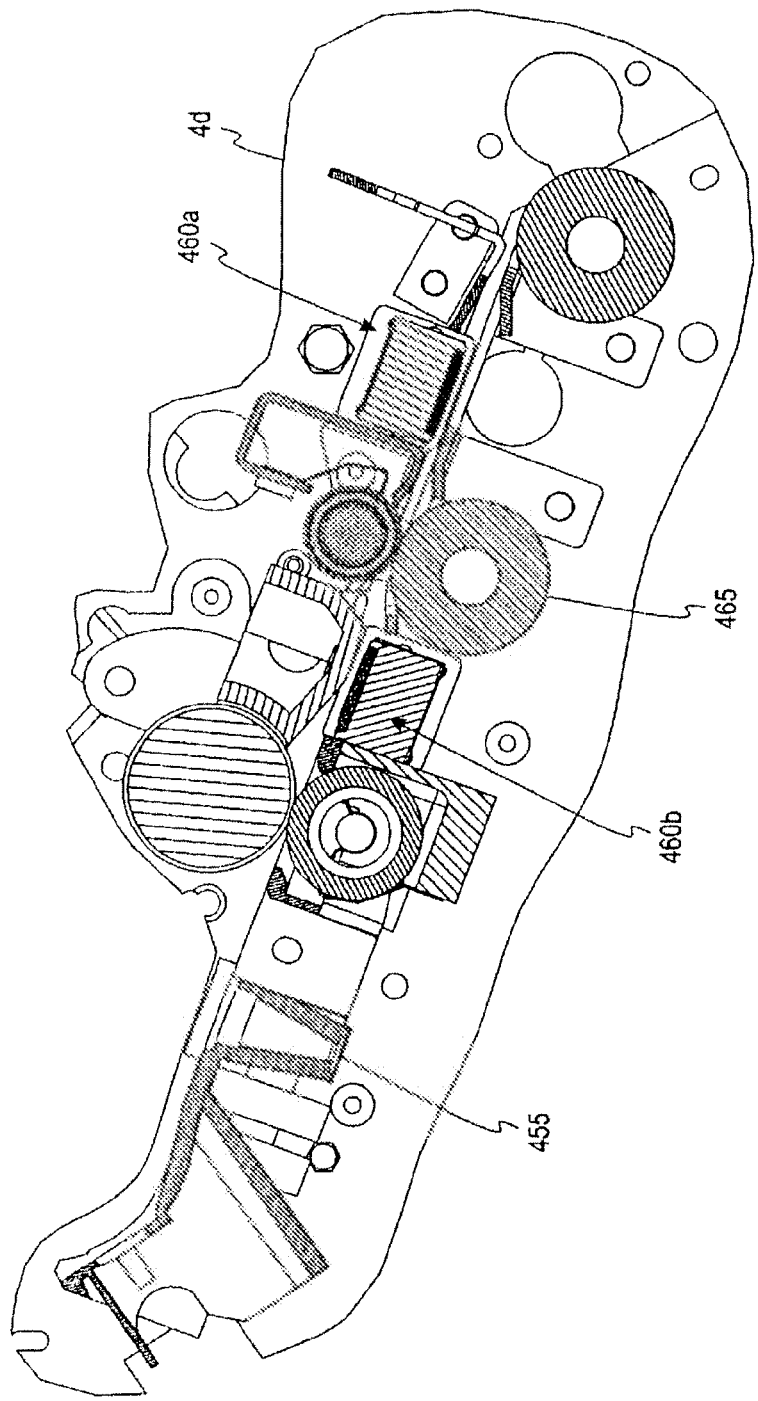
FIG. 4d is an enlarged partial, sectional view of area 4d from FIG. 4c.
Figure 4E:
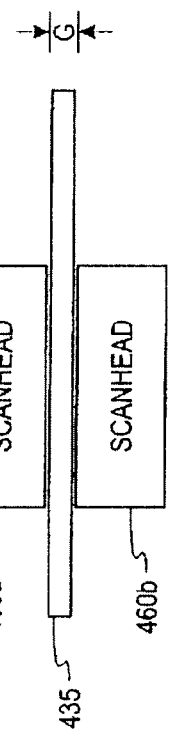
FIG. 4e is a functional block diagram of an image scanner configuration according to some embodiments of the present disclosure.

FIG. 4d illustrates an enlarged area 4d from FIG. 4c. In the embodiment illustrated in FIG. 4d, an upper imager 460a is disposed offset and on the opposite side of the transport path from a lower imager 460b. According to some embodiments, the imagers 460a, 460b extend laterally across the width of the transport path as shown generally in FIG. 4b. According to some embodiments, imagers 460a and 460b are contact image sensors (CIS). According to some embodiments, contact image sensors 460a, 460b are spaced apart on opposing sides of the transport path such that a gap of approximately 0.03 to 0.09 inches exists for documents to pass through. According to some embodiments, contact image sensors 460a, 460b are positioned directly opposite each other and are spaced apart from each other by approximately 0.05 inches, thus, providing a gap of 0.05 inches for documents to be imaged to pass through. According to other embodiments, the image scanner is an array of charge-coupled device (CCD) sensors. According to some embodiments, the image scanners 460a, 460b have a depth of field of approximately 0.06 inches. According to some embodiments, image scanners 460a, 460b may be positioned directly opposite each other and without employing hold down rollers directly opposite each image scanner (see, for example, FIG. 4e). In certain embodiments, wherein the transport path gap adjacent an image scanner, such as, between two opposing image scanners or between an image scanner and an opposing surface or guide of the transport path, is less than the depth of field of the sensors, the image sensors are adapted to obtain images of sufficient resolution to enable data to be extracted from the images of document, such as, by OCR, even though the position of a passing document can fluctuate within the gap as the document passes the sensors. For example, according to some embodiments, a high-speed U.S. currency imaging device 400 is adapted to transport and image the front and back U.S. currency bills at 1000 bills per minute using image sensors 460*a*, 460*b* positioned opposite each other (see, for example, FIG. 4*e*) and separated by a gap with sufficient resolution that the serial numbers of U.S. currency bills 435 may be accurately extracted (for example, via OCR) from the images of the bills. In certain embodiments for the image scanner configuration of FIG. 4*e*, the gap, G, between the oppositely positioned scan heads 460*a*, 460*b* can range from 0.02 to 0.1 inches.

According to some embodiments, device 400 is a high-speed U.S. currency imaging device having an input receptacle adapted to receive U.S. currency in a wide-edge leading manner, that is, U.S. currency is positioned within the input receptacle and transported through the scanning device 400 such that the wide or long edge of the currency is generally perpendicular to the transport direction (see FIG. 6*a* below). According to some embodiments, the device 400 is adapted to obtain an image of the entire front and back of each U.S. currency bill transported through the device and extract, completely or partially, the serial number of each bill. According to some such embodiments, the U.S. scanning device 400 is adapted to transport, image, extract data, and otherwise process U.S. currency at a rate in excess of 1,000 bills per minute.

According to some embodiments, a U.S. currency imaging device 400 has a transport path width, $TW_4$, of approximately 7.5 inches. In certain embodiments, imaging device 400 has a transport width of approximately 9 to 10 inches.

Figure 6A:
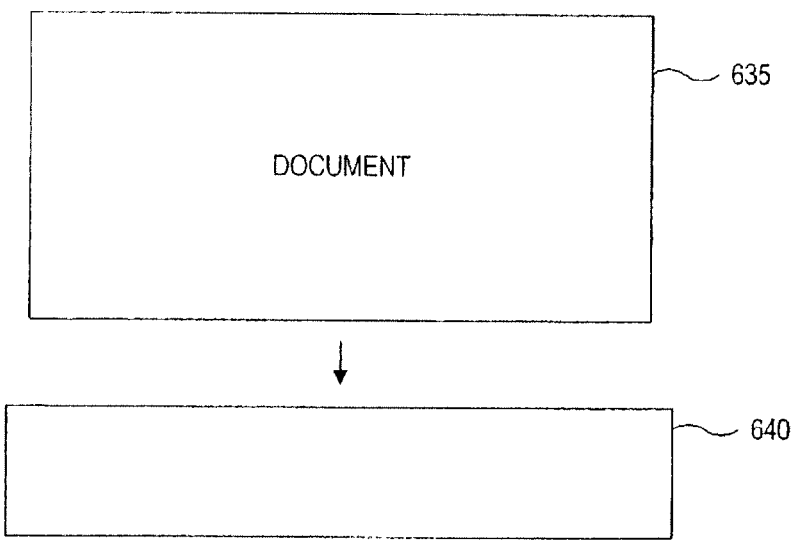
FIG. 6a is a top view of a document being transported past an image scanner in a wide-edge leading manner according to some embodiments of the present disclosure.

According to some embodiments, device 400 is a high-speed U.S. currency and check imaging device having an input receptacle adapted to receive both U.S. currency and standard check in a wide-edge leading manner, that is, documents are positioned within the input receptacle and transported through the scanning device 400 such that the wide or long edge of the document is generally perpendicular to the transport direction (see, for example, FIG. 6*a*). Standard checks generally have a long dimension of 6.0 inches. According to some embodiments, the device 400 is adapted to obtain an image of the entire front and back of each U.S. currency bill and standard check transported through the device and extract, completely or partially, data from the scanned documents such as the serial number of currency bills. Additional data which is extracted from currency bills and checks, according to some embodiments, is described in more detail below such as in connection with FIGS. 7*a*-7*b*. According to some such embodiments, a wide-edge leading U.S. currency and standard check imaging device 400 has a transport path width, $TW_4$, of approximately 7 to 10 inches. According to some such embodiments, the U.S. currency and check scanning device 400 is adapted to transport, image, extract data, and otherwise process U.S. currency and checks at a rate in excess of 1000 bills or documents per minute.

Commercial checks are longer than standard checks. Some commercial checks have a length of up to approximately 9 or 10 inches and a width of approximately 3.5 inches. According to some embodiments, the scanning device 400 is adapted to receive, image, and otherwise process U.S. currency bills and standard checks in a wide-edge leading manner (see FIG. 6*a*) and also adapted to receive, image, and otherwise process larger commercial checks in a narrow-edge leading manner (see FIG. 6*b*). According to some embodiments, such an imaging device 400 has a transport path width, $TW_4$, of 9 to 10 inches.

Some embodiments of device 400 are adapted to receive, image, and process stacks of intermingled currency bills and checks. Alternatively, some embodiments of device 400, are adapted to receive, image, and process stacks of only one type of document at a time. For example, the device 400 may be adapted to first process and image currency bills and then, after the stack of currency bills has been processed, to process separately a stack of checks.

Figure 4F:
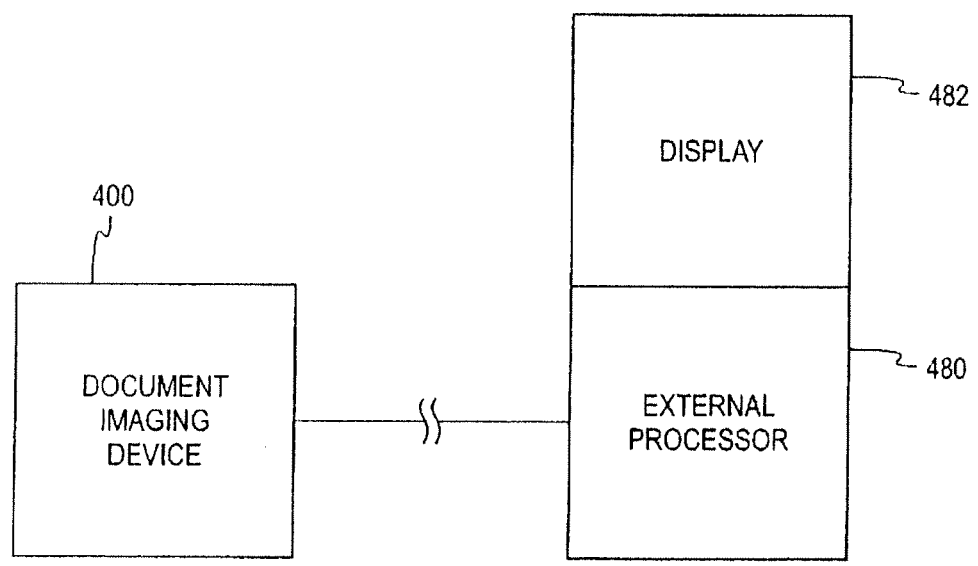
FIG. 4f is a functional block diagram of a document scanning device according to some embodiments of the present disclosure.

FIG. 4*f* is a schematic representation of document imaging device 400 communicatively coupled to an external processor 480 such as a PC. According to some embodiments, the external processor or PC 480 is communicatively coupled to a monitor or display 482.

According to some embodiments, the output receptacles 430*a*, 430*b* of the device 400 are adapted to receive, documents separated as authenticated and non-authenticated (for example, counterfeit or forged) or separated by document types, such as currency bills and checks.

Figure 5:
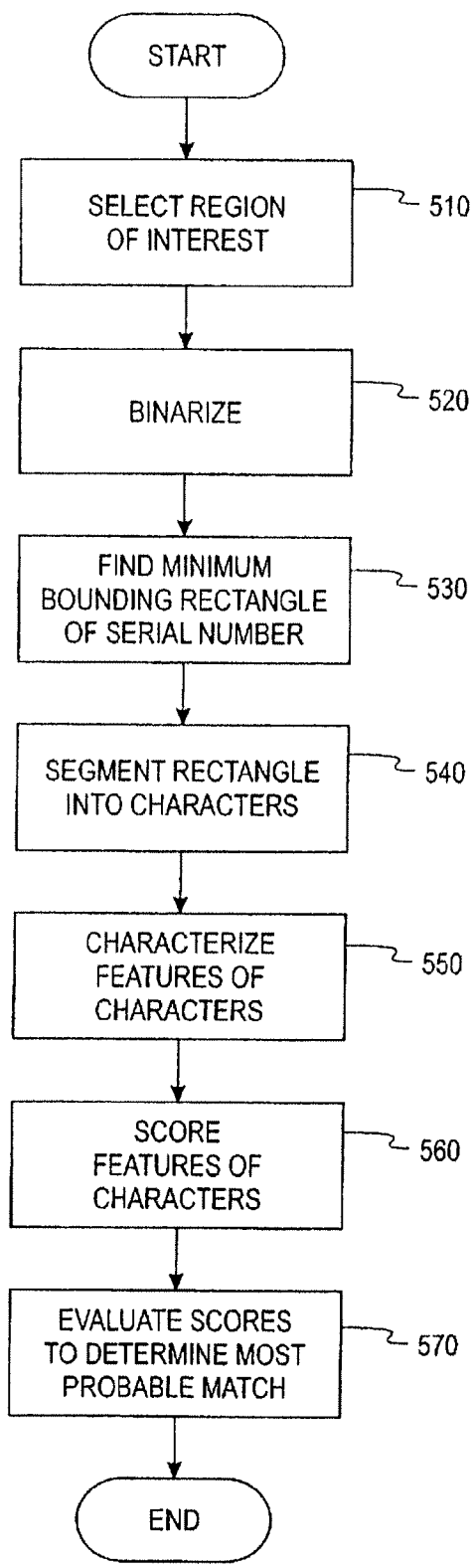
FIG. 5 is a flowchart describing the operation of an OCR algorithm for extracting character information according to some embodiments of the present disclosure.

According to some embodiments, an image scanning device, such as described in FIGS. 1-4 and in other embodiments of the present disclosure, can have a scanning resolution of approximately 100 dots per inch (DPI). Typically, scanning resolutions of 200 DPI or more are used to accommodate OCR software, but the exemplary embodiment in FIG. 5 illustrates an exemplary OCR algorithm adapted to recognize serial numbers on U.S. currency bills at scanning resolutions as low as 100 DPI according to some embodiments. In FIG. 5, an OCR algorithm initially selects an area of interest (step 510), such as a snippet of a serial number from a currency document (see, for example, image 910 in FIG. 9). In the next step, the area of interest 510 or snippet image is binarized (step 520). Next, a minimum bounding rectangle is determined for a particular serial number (step 530), such as a rectangle that encompasses the entire alphanumeric serial number from the binarized image snippet. Next, the bounding rectangle is further subdivided to segment the rectangle into the individual characters of the binarized serial number image (step 540). The features of the binarized characters are then characterized (step 550) using matrix comparison with a template and/or using feature detection to identify certain identifying characteristics of the binarized characters. Next, the features of characters are scored or rated (step 560) through comparison of features to templates of characters or character elements. The scores or ratings are then evaluated to determine the most probable character match (step 570) based on estimated confidence levels for the match. In certain exemplary embodiments, OCR accuracies of or exceeding about 90 percent are obtained for correct recognition of eleven out of eleven characters in the scanning of serial number information at 100 DPI from U.S. currency bills and OCR accuracies of or exceeding 95 percent for correct recognition of ten out of eleven characters and of or exceeding 98 to 99 percent for correct recognition of nine out of eleven characters at 100 DPI for U.S. currency bills. According to some embodiments utilizing 100 DPI scanning of U.S. currencies, OCR accuracies of or exceeding about 97 percent in recognizing eleven out of eleven characters and of or exceeding 99 percent for ten out of eleven characters are obtained. According to some embodiments, the degree of document flutter as a document passes an image sensor can impact the accuracy obtained.

With the capability of extracting character information from currency bills at an approximately 100 DPI scanning resolution, memory and processing demands can be reduced when using the previously described OCR algorithm. Furthermore, according to some embodiments, lower resolution scanning enables the image scanner to image a currency bill quicker than imaging at 200 DPI. In certain embodiments, such as described in connection with FIGS. 1-4 for example, a document scanning device 100, 200, 300, 400 that images a currency bill at 100 DPI can image approximately 1,000 documents per minute with currency bills being fed from the input receptacle 110 and along the transport path using a wide-edge feed (that is, a document is transported through the scanning device in a direction that is perpendicular to a longer edge of the document) and with serial number information being extracted and currency bills further being denominated at approximately 1,000 documents per minute. According to some embodiments, devices imaging currency bills at 200 DPI and performing under similar conditions operate at rates of approximately 450 documents per minute.

According to some embodiments, an image scanner such as image scanning device 400 is adapted to obtain a full image of the front and back of a U.S. currency bill, denominate the bill, extract the bill's serial number, and, if necessary, stop the transport, in less than approximately 80 milliseconds. In some such embodiments, AMI Semiconductor Model PI 228 image sensors are employed. According to some embodiments, an image scanner such as image scanning device 400 is adapted to feed and process U.S. currency bills in a wide-edge leading manner at a rate of about 1000 bills per minute, while obtaining a full image of the front and back of each U.S. currency bill, denominate the bill, extracting the serial number of the bill, and, if necessary, stop the transport in less than approximately 80 milliseconds. According to some embodiments, an image scanner such as image scanning device 400 is adapted to feed and process U.S. currency bills in a wide-edge leading manner at or in excess of about 1000 bills per minute and obtain a full image of the front and back of each U.S. currency bill and to extract the serial numbers of the bills in less than approximately 50 milliseconds after the images of the front and back of a U.S. currency bill has been obtained.

According to some embodiments, an image scanner, such as, image scanning device 400, is adapted to feed and process U.S. currency bills in a wide-edge leading manner at or in excess of about 1000 bills per minute while obtaining a full image of the front and back of each U.S. currency bill and extracting the serial numbers of the bills before the bills have been transported approximately 5 to 6 inches past the last image scanner (for example, image sensor 460a). According to some such embodiments, a multi-output receptacle imaging device 400 is provided wherein a first document diverter is positioned at or less than 5 to 6 inches downstream of the last image scanner and wherein the device is adapted to sort documents based on the scanned imaged and/or extracted data, such as, extracted bill serial numbers, using the diverter.

According to some embodiments, an image scanner, such as, image scanning device 400, is adapted to feed and process U.S. currency bills in a wide-edge leading manner at or in excess of about 1000 bills per minute while obtaining a full image of the front and back of each U.S. currency bill using image sensors positioned opposite each other along a transport path and extracting the serial numbers of the bills before the bills have been transported approximately 5 to 6 inches past the image scanners. According to some such embodiments, a multi-output receptacle imaging device 400 is provided wherein the device is adapted to sort documents based on the scanned images and/or data extracted from images obtained using the image sensors such as extracted bill serial numbers using a diverter positioned at or less than 5 to 6 inches downstream of the image sensors.

According to some embodiments, an image scanner, such as, image scanning device 400, is adapted to feed and process currency documents, such as, U.S. currency bills, at or in excess of about 1000 bills per minute while obtaining a full image of the front and back of each U.S. currency bill and extracting data such as the serial numbers of bills before the documents have traveled approximately 5 to 6 inches past the last image scanner (for example, image sensor 460a). According to some such embodiments, a multi-output receptacle imaging device 400 is provided wherein a document diverter is positioned at or less than 5 to 6 inches downstream of an image scanner and wherein the device is adapted to sort documents based on the scanned imaged obtained from the image scanner and/or data extracted from the obtained image such as extracted bill serial numbers using the diverter.

In certain embodiments, such as described above, the image scanners described for the document scanning devices of the present disclosure have a depth of field of approximately 0.06 inches, which is approximately double the typical depth of field for a financial document scanning device. The use of an increased depth of field allows for improved operation of the transport mechanism by minimizing the need for hold down rollers near the imaging scanner, thereby reducing the number of moving parts in the transport mechanism. Increasing the depth of field for the image scanner to approximately 0.06 inches also provides improved focus for check or currency document imaging particularly for a document that experiences flutter while advancing through the transport mechanism. In certain embodiments, a hold down roller approximately 6 inches long, or approximately as long at the image scanner, is positioned directly opposite an image sensor with the gap between the image sensor and hold down roller sufficient to minimize flutter as a document passes the image scanner. In certain exemplary embodiments, a gap between the hold down roller and the image scanner of 0.003 to 0.006 inches may be used for the scanning of currency documents. In other embodiments, gaps less than and greater than this range may be used.

In certain embodiments, a drive roller (for example, drive roller 465 in FIG. 4c) may be used without the use of a hold down roller. In an exemplary embodiment, the distance from the centerline along the long dimension of imaging scanner 460a and 460b and the centerline along the long dimension of drive roller 465 is approximately 1 inch. In another exemplary embodiment, the distance between the centerlines of the long dimensions of drive rollers 465 is approximately 2 to 2.5 inches. In further exemplary embodiments of document scanning device 400, the gap between the images scanners 460a, 460b and the document being processed is in the range of 0.02 and 0.1 inches.

In certain embodiments, the imaging scanner is capable of capturing an image when the speed of the transport mechanism is allowed to vary. In some embodiments, a belt in the transport mechanism can operate at a velocity ranging from approximately 0 to 100 inches per second or faster. In certain embodiments, a belt transport mechanism can operate at a velocity up to approximately 200 inches per second. A document scanning device with the capability to operate at varying transport mechanism speeds allows the document processing rate of the document scanning device to be decreased and for the device to be stopped and restarted, including when a document is under an image scanner, while maintaining the quality of document image capture. A contact image sensor (CIS) or charge-coupled device (CCD) can be used for imaging in a document scanning device. In one embodiment, an image scanner can read a maximum of 10,000 lines per second, which is approximately 100 μs of exposure per scan line when scanning at a 100 DPI resolution. Line sampling for an image scanner operating at a 200 DPI resolution occurs for every 0.005 inches of document movement and at a 100 DPI resolution for every 0.010 inches of document movement.

According to some embodiments, luminance control techniques are used to minimize exposure effects when the transport mechanism speed is varied. For a luminance control procedure, the brightness of the pixels in the image scanner fluctuate with the transport mechanism velocity. First, the pixels of a sensor array are calibrated to have the same value when exposed to the same calibration material. In one exemplary embodiment, a material having the same spectral properties as the calibration material can be placed over the first few pixels (e.g., approximately the first five or more pixels) of an array, which are then used as tracking pixels. The tracking pixels generally provide a constant output value based upon the calibration. A change in the value(s) of the tracking pixel(s) indicates a change in brightness. When a change in brightness is detected, the imaging device compensates for the brightness change by applying a correction factor (that is, a multiplier) to each pixel of the array including the tracking pixels. The correction factor is determined by calculating brightness drift based on the change in value of the tracking pixels. For example, if the change in brightness increased by a factor of 1.1, then every pixel in the array will be divided by 1.1. This correction method works well for minor fluctuations in luminance, such as on the order of 0.5 to 2.0. In one embodiment, when the luminance fluctuation correction factor exceeds a certain threshold value, such as, at correction factors of less than 0.5 or greater than 2.0, the brightness of the light source is either increased or decreased until the correction factor falls close to 1.0. In the case of a transport mechanism approaching or coming to a complete stop, the brightness of the light source can generally only be decreased to a certain level before the image quality is affected. To overcome this limitation, the document speed of the transport mechanism can be monitored such that when the speed approaches less than half (for example, ⅓ and ¼) of normal run speed (for example, 100 lines per minute), the brightness of the light source is adjusted to the value calculated during calibration and the line scan rate of the sensors is set to be continuous and to occur at the fastest line rate that the sensor allows (for example, 10,000 lines per second). With a constant line scan rate, the luminance of the captured image remains constant, regardless of the speed of the document along the transport mechanism. In this mode however, the process of reading line images will be out of sync with the line sampling requests and thereby out of sync with the document being imaged or scanned. Since the speed of the transport mechanism has decreased by more than a factor of two, two or more line scan reads will occur between sampling requests, such as, for example, every 0.003 inches. It is therefore necessary to combine these multiple reads into a single output that represents the line to be imaged at the point of the sample request. For example, if four line scan reads occur between sampling requests, then the image that is output will be the average of these four line reads.

In certain embodiments, the transport mechanism rate will be increased from between a rate of zero to a certain threshold rate, such as less than one half of the normal run speed. Up to this point, the brightness of the light source will be at the calibrated value and the line scan rate for the sensors will be set at the fastest line rate that the sensor allows (for example, 10,000 lines per second). With a constant line scan rate, the luminance of the captured image will remain constant, regardless of the speed of the document. In this mode however, the process of reading line images will be out of sync with the line sampling requests, and thereby, out of sync with the document, as well. Since the speed of the scanner is less than half of full speed, several line scan reads will occur between sampling requests. These multiple reads will be combined into a single output that represents the line to be imaged at the point of the sample request. For example, if four line scan reads occur between sampling requests, then the image that is output will be the average of these four line reads. When the transport mechanism rate increases to the threshold rate (for example, greater than ½ of full speed), the line scan rate will be resynchronized with the sampling rate, thereby allowing image brightness to fluctuate with the change in the transport speed, with light source brightness adjustments made and/or a correction factor applied thereafter to achieve a generally uniform image of the document being scanned.

In another embodiment, image processing techniques are used in which lines are sampled and stored to memory on a continual basis regardless of the speed of the transport mechanism. The exposure of an image and the resulting luminance, therefore, generally remains the same. Any minor variations in luminance that may occur due to drift in the light source or fluctuations in speed can be corrected using the process discussed above for the luminance control method by using correction factors and adjusting the brightness of the light source. These adjustments for drift corrections are generally minor and are preferably made in between document scans or during idle periods of document scanning so that the effect on image quality is minimized. In one embodiment, the distance a document advances along the transport mechanism during a line scan exposure cycle is measured and stored along with the corresponding line image. The distance a document moves during the exposure cycle defines the importance or weight assigned to the image retrieved from a particular line read. For example, if the document scanning device is stopped, a calculated weight for the image streaming from the image sensor is zero since there is zero document motion. In another example, if the document has moved 0.002 inches in a document scanning system where each pixel is 0.005 inches, that is 200 DPI, then the calculated weight for the image streaming from the image sensor is 40 percent. Following the collection of one or more line scans, the lines that are stored in memory can be interpolated using the weight assigned to each stored line. For example, if an imaging sample request occurs and there are three lines stored in memory, the first line with a 10 percent weight, the second line with a 30 percent weight, and the third line with a 60% weight, then the image line that is output in response to the imaging sample request is the sum of each of the three weighted lines. Thus, the weighting percentage calculated for each line defines how much an individual line scan will contribute to the overall image line that is output.

Figure 6B:
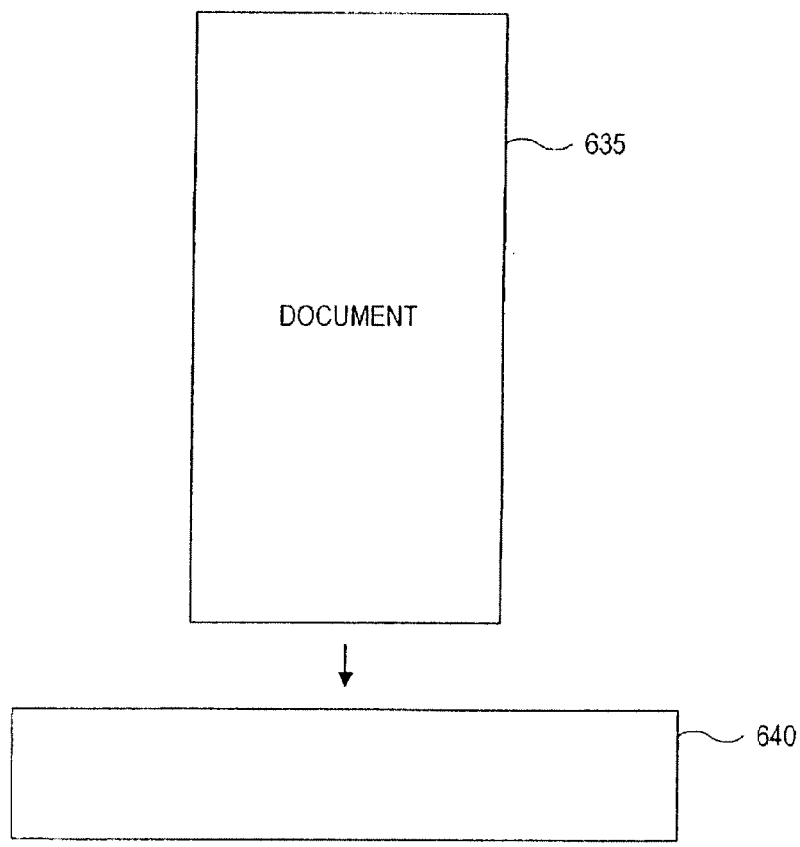
FIG. 6b is a top view of a document being transported past an image scanner in a narrow-edge leading manner according to some embodiments of the present disclosure.

FIGS. 6a and 6b illustrate the transporting and imaging of documents in a wide-edge leading (FIG. 6a) and a narrow-edge leading (FIG. 6b) manner. In FIG. 6a, a transport mechanism transports a document such as a currency bill or check 635 in a direction that is generally perpendicular to a longer edge of the currency bill or document 635. Stated differently, a long or wide edge of the currency bill or document 635 is the leading edge. As shown in FIG. 6b, a transport mechanism transports a currency bill, check, or document 635 in a direction that is generally parallel to a longer or wide edge of the currency bill, check, or document 635. Stated another way, a short or narrow edge of the currency bill, check, or document is the leading edge. In either embodiment, as the transport mechanism moves the currency bill or document 635 past the image scanner 640, a processor or controller of the scanning device controls the image scanner 640 so as to scan the currency bill or document 635, thereby obtaining an image. The image may be of one or both sides of the currency bill.

In certain embodiments, the transport mechanism may be fit with a magnetic sensor being configured to identify the magnetic characters on a check or currency document fed into the document scanning device in a direction that is perpendicular to either the longer edge or the narrower edge of the document.

Figure 7A:
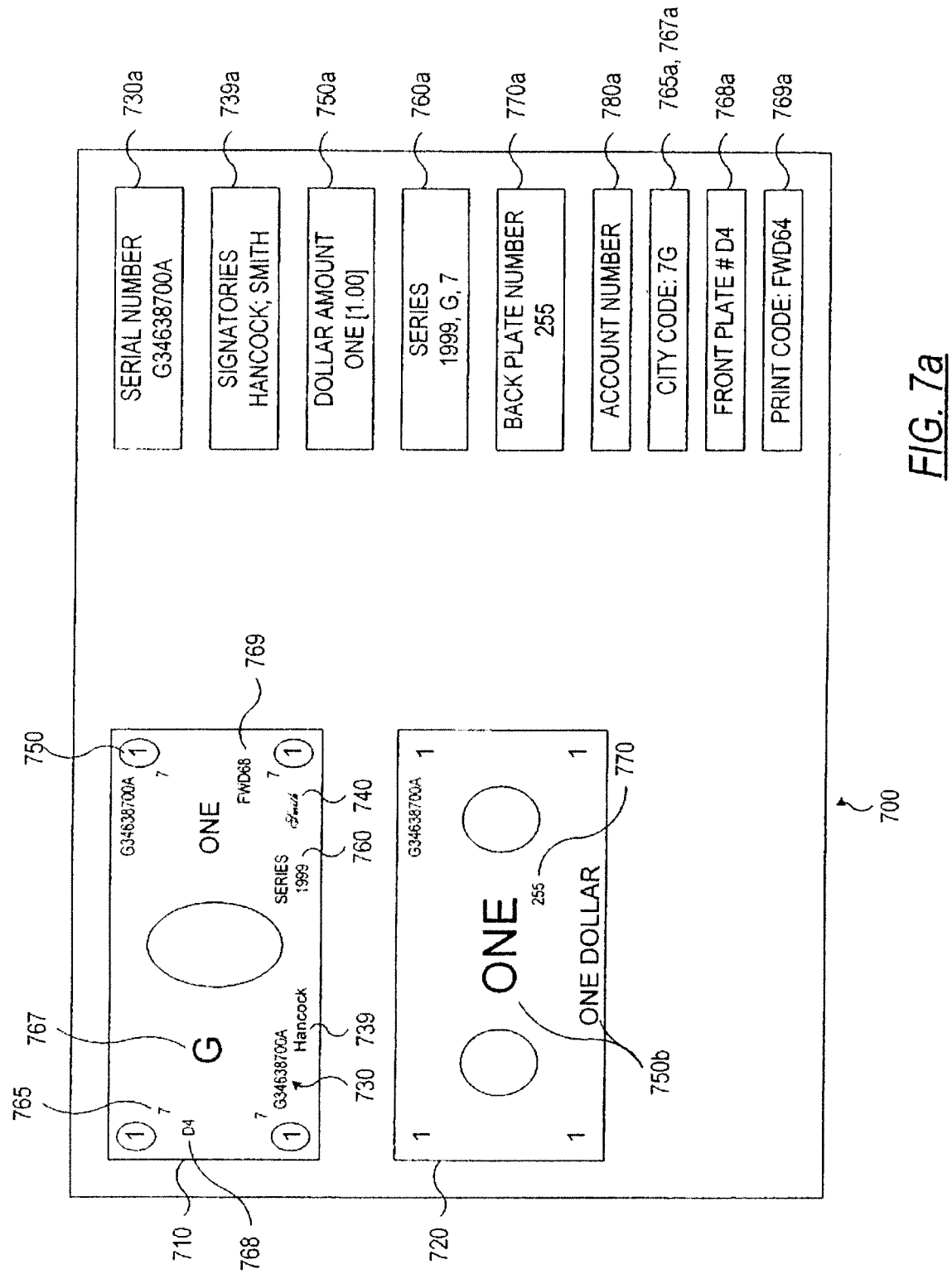
FIG. 7a is a representation of an image file of a currency bill according to some embodiments of the present disclosure.

Referring now to FIG. 7a, an exemplary image file or record 700 for a document according to some embodiments is shown. The image file or record 700 comprises several parts including images and extracted data such as alphanumeric data. A first image section 710 represents the image of one side of an imaged document. The image is a collection of data and is represented here pictorially so as to be more easily explained and understood. In the currency bill sample shown in FIG. 7a, the first image section 710 is the front side of the document scanned, namely, a one dollar bill. Similarly, a second image section 720 comprises data representing the image of the reverse side of the document, in this case, the back side of the currency bill. On both the first and second image sections 710, 720 of the currency bill, there is information that may be important to have extracted and stored separately in the image file for cross-referencing or tracking purposes. For example, the front side of the one dollar bill includes a serial number and the back side includes a plate number. Both of these may be important to have extracted, such as, by OCR, and the extracted data included in the image file and may be cross-referenced for sorting purposes. For example, a plurality of image file or records may be stored in a database which may be queried or sorted by different fields within the records such as a field containing an alphanumeric representation or characters (as opposed to an image of the serial number, for example, in .tif or .pdf) of the serial numbers of currency processed by one or more document scanning devices such as devices 100, 200, 300, 400. For example, for reasons related to bill tracking and counterfeit detection, it may be important to know the serial number of the currency bill or be able to determine who deposited a bill having a particular serial number or to which financial account a bill having a particular serial number was deposited. Once the serial number of a bill is obtained, the serial number can be useful in tracking the distribution of the counterfeit bill. It may also be used to help a government official track the whereabouts of criminals and follow currency bills that are being laundered.

Therefore, in addition to the two image fields 710 and 720, the image file or record 700 also comprises a number of data fields such as a serial number data field 730a, a signatories data field 739a, a denomination data field, a series data field 760a, a back plate data field 770a, a front plate data field, and/or a print code data field 769a. To better understand these various data fields, reference is made to image fields 710 and 720. As can be seen in the images of a $1 bill contained in the image fields 710 and 720, the image of the $1 bill reveals that the $1 bill contains a variety of information including a variety of alphanumeric information. For example, the $1 bill shown has a serial number 730, two signatories 739 (Treasurer's signature) and 740 (signature of the Secretary of Treasury), a numeric denomination 750 in addition to one or more written denominations 750b, series information (767, 760, 765), a back plate number 770, a front plate number 768, and a print code 769. The various data fields (for example, 730a) contain data such as alphanumeric data or characters extracted from the images of the $1 bill. For example, a serial number 730 is extracted from the bill and stored in a data portion 730a of the record 700.

In addition to the image fields and extracted data fields, the image record 700 may also contain other data such as alphanumeric or biometric data associated with person or account associated with the imaged document. Additionally, the image record may contain other information concerning the document such as information obtained from sensor(s) separate from the sensor(s) used to obtain images of the document, such as, for example, data retrieved from authentication sensors. For example, the image file 700 may also include an account number field 780a that is associated with the currency bill. The account number may be added to the image file by the document scanning device 100, 200, 300, 400 or a processor or computer coupled thereto and/or coupled to a database containing records 700, such as, computing device 180 or external processor 480. According to some embodiments, the account number field 780a refers to the account into which the currency bill is/was deposited. This allows someone viewing the image file or record to know what account obtained credit for the bill. For example, if the bill was deposited and later discovered to be counterfeit, by searching the database containing image records 700, it can be determined what account received credit for the counterfeit bill. Appropriate action may then been taken such as flagging the account and/or debiting the account for the value of the counterfeit bill.

In some embodiments, it may also be desired to extract signatory information such as a Treasurer's signature 739 and a signature of the Secretary of Treasury 740. Likewise, in some embodiments, dollar amount information 750, series information 760, and Federal Reserve Bank number 765 and letter 767, and plate number 770 on the backside of a currency bill 720, may be extracted. All of these fields may be used for cross-referencing the serial number with the currency bill for purposes of determining counterfeit bills. For example, the serial number of the bill may be related to the series. If these items do not match, then the bill is a counterfeit. Also, in certain series, the Federal Reserve Bank number 765, 767 may be in different locations. In some series, the letter portion 767 is in a seal. In other series, the number portion 765 is right next to the letter portion 767, with neither being in the seal. The signatory information 739, 740, dollar amount information 750, series information 760, Federal Reserve Bank number 765, 767, front plate number 768, print order code 769, and back plate number 770 may all be extracted and inserted into the appropriate fields 739a, 740a, 750a, 760a, 765a, 767a, 768a, 769a, 770a, respectively, in the image file. According to some embodiments, the software is updateable to handle changes in any fields that change over time.

Other fields may also be included in alternative embodiments, such as, a field relating to the issuing federal reserve bank, the country of origin (if multiple country currencies are accepted), and others. It is also contemplated that foreign currency may have other useful information on the bill, such as, other security measures which it may be useful to extract from the image of the bill. One example would be the size of the currency document. In many foreign countries, the size of the currency bill varies with denomination. As a preliminary measure, the size of the currency bill may be measured to ensure that the bill is the appropriate size.

In other embodiments, the locations of certain items may be different. For example, in later U.S. currency series, the picture may be larger and/or off-center. Also, some of the extracted information may be located in a different position.

Figure 7B:
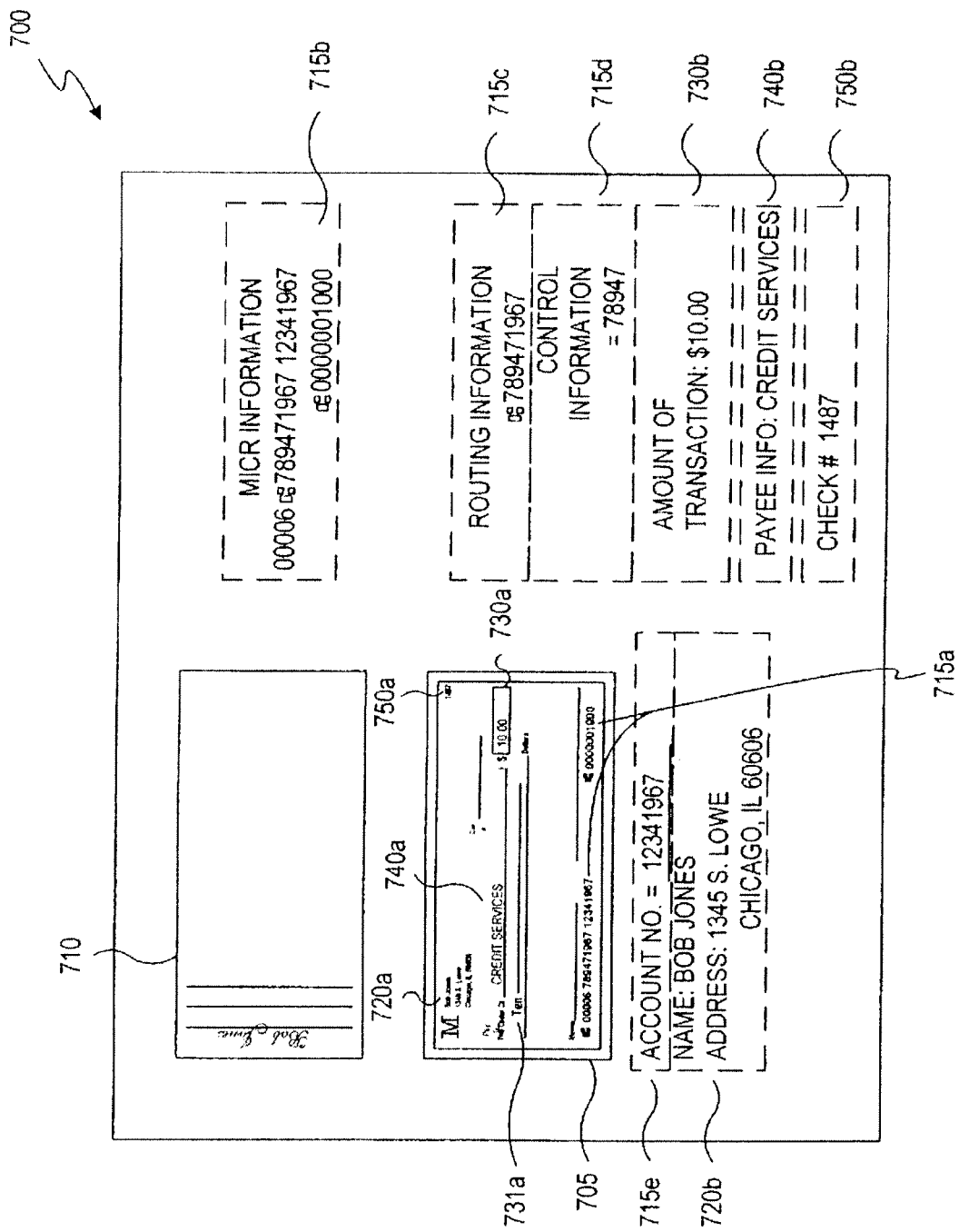
FIG. 7b is a representation of an image file of a check according to some embodiments of the present disclosure.

Turning now to FIG. 7b, an image of a check is depicted. A first image section 705 represents the image of one side of a scanned check. The image is a collection of encoded data and is represented here pictorially so as to be readily understandable to those skilled in the art. In the check sample shown in FIG. 7b, both sides of the check have been scanned. In other embodiments, it may be desired to scan only one side. In the embodiment illustrated, the first image section 705 contains the image of the front side of the scanned check. Similarly, a second image section 710 comprises data representing the image of the reverse side of the document, in this case, the back side of the check. An area 715a is an image of the MICR data. According to some embodiments, the data associated with the MICR code is extracted from the full image scan and inserted into a MICR data field 715b. The MICR information on the check includes the ABA number (that is, the routing and transit number), payor's checking account number, check number, and may include the dollar amount of the check, as well as other data.

Areas 715c, 715d represent data fields containing, respectively, the ABA number and control information. The ABA number and control information is needed so that the image file can be transmitted among financial institutions. The ABA number is a number that corresponds to the bank that issued the check. In other words, the bank to which the image file belongs can easily be recognized by an operator or a processor or computer system associated with the scanning devices 100, 200, 300, 400 or associated with a database containing the image record 700. The data in data fields 715c, 715d may be extracted from the area 715a or from the MICR encoding on the check (such as by a device 100, 200, 300, 400 containing a magnetic MICR reader). The numbers illustrated are used as examples and are not meant to represent the exact digits or number of digits used.

Also taken from the MICR encoding line on the check is data in an account number data field 715e (for example, the ON-US field), which contains the account number for the check extracted from the image of the check. The account number allows an operator or a processor or computer system associated with the scanning devices 100, 200, 300, 400 and/or the database to determine which account to debit or which was debited for the funds.

The image record 700 may also contain an identification data field 720b containing data indicating the name and address of the owner of the account associated with the check. This information may be taken from an identification field 720a on the image of the check. Normally, this information is on the upper left side of the check and usually includes at least the name of the owner of the account, and may include address and telephone information.

On the written portion of the check, an amount of the check is indicated in an amount (or CAR or courtesy amount recognition) box 730a as well as being written out in a LAR (or legal amount recognition) field 731a. This information may be extracted from the image and inserted into an amount data field 730b. Other written information, such as a payee name 740a, may also be extracted from the full image and added into a payee data field 740b. A check number 750a may be extracted and added into a check number data field 750b. It should be recognized that the fields illustrated are not inclusive of all possible fields and types of information which can be stored in an image record 700. Indeed, other types of information can be stored as can pointers to other files having, for example, further information relating to the customer. In some cases, it may also be useful to read the memo line of the check. In addition, it is contemplated that an operator may fill in some of these fields. For example, in an embodiment of the present invention that only requires the customer to sign the document, the payee field and amount field may be added to the image before it is processed. The format of the image fields 705, 710 may be standardized for ease of processing, that is, using .tif, .bmp, .pdf, .gif, or .jpg. This allows other software to process the information in image files for use by the merchant or financial institution. As with respect to FIG. 7a, the data fields contain characters such as alphanumeric data as opposed to images of the corresponding data to facilitate processing of the imaged checks and/or forwarding of the image record 700 or portions thereof and/or searching or querying of a database containing a plurality of image records 700 or portions thereto such as a database containing the data (non-image) portions of the image records 700.

Referring back to the embodiments described in FIGS. 4a-4f, according to some embodiments, during operation a stack of documents, such as currency documents and/or checks, is inserted into input receptacle 410. An identifier is entered for the documents inserted into receptacle 410, such as a customer or depositor name, an account number, or other identifier for a depositor and/or the operator of the device such as a bank employee number. The identifier can be input via an operator interface such as using a keypad or other input device. The device 400 is started and the documents are fed one at a time by the transport mechanism along a transport path past image sensors 460a, 460b, where images of the documents are obtained. For device 400, according to some embodiments, full images are obtained of the front and back of a document. The documents are then transported to output receptacles 430a, 430b. In some embodiments, the documents are transported and fully imaged at a rate of 1,000 documents per minutes. That is, according to some embodiments, the device 400 processes a stack of currency bills at 1000 bills per minute while the device 400 in real-time obtains the images of the front and back of each bill and extracts the serial numbers from the obtained images such as via OCR.

According to some embodiments, image data obtained from the image scanner(s) 460 can be buffered at a memory component along the communication path between the various controller(s) and/or processor(s). Buffering is useful for allowing the scanning process to continue despite possible data bottlenecks in the document scanning system.

According to some embodiments, the images are used to obtain identification characteristics for the document, such as serial number in the case of currency bills, account number or check number in the case of checks, or other encoded or encrypted identifiers. According to some embodiments, the images are also used to denominate the documents such as currency bills. According to some embodiments, bills are denominated using other techniques and/or sensors such as described in, for example, U.S. Pat. Nos. 5,652,802; 5,815, 592; 5,992,601; and 6,256,407, each of which are incorporated herein by reference in their entireties. In the case of a device with more than one output receptacle, such as device 400, the documents can be sorted, for example, by separating out counterfeit documents, separating checks and currency bills, or separating certain denominations of currency documents. According to some embodiments, the device 400 generates a total value for the documents in the stack that were successfully denominated and/or imaged.

According to some embodiments, the device 400 creates a database of image records containing data fields comprising the extracted serial number of the bills and associated account numbers or identifiers. According to some embodiments, image records also contain one or more image fields, such as a field containing the image of the front of a bill, the image of the back of a bill, and/or snippet images of portions of a bill such as an image of the area around the serial number of a bill (for example, the snippet images 830 shown in FIG. 8).

Figure 8:
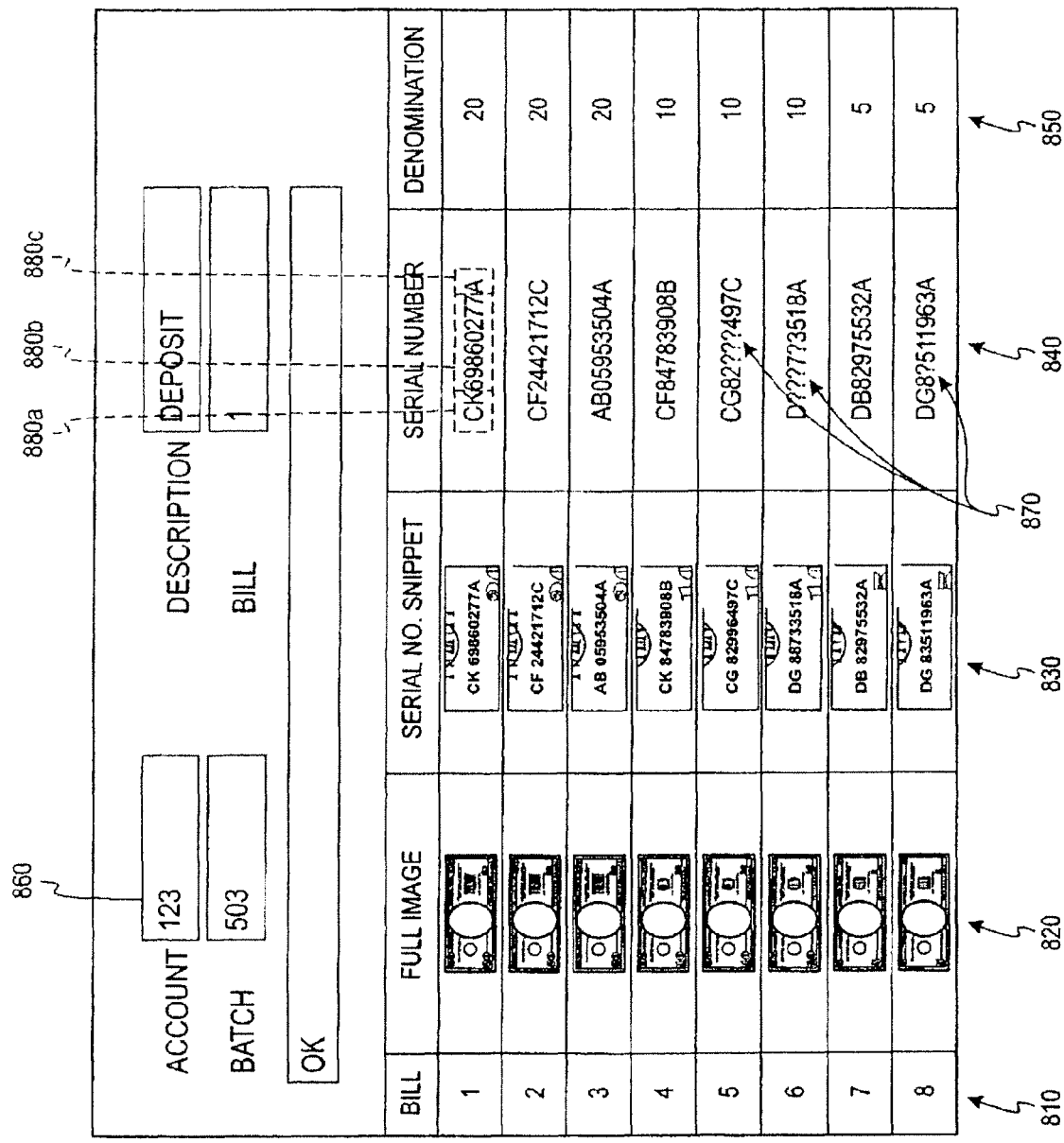
FIG. 8 is a representation of a database of serial number information according to some embodiments of the present disclosure.

FIG. 8 illustrates exemplary records in a database created using device 400. The records in the database include a number of data and image fields, such as the order in which a bill was scanned, that is, bill number 810. Other fields include a full image field, 820, an image field of the snippet of the serial number 830, the extracted serial number characters or text 840 obtained using, for example, OCR techniques, and bill denomination 850. An account number 860 associated with a deposit, for example, can also be included. Some records may have incomplete serial number character information 870 due to unreadable image information. According to some embodiments, incomplete character information 870 can be corrected by an operator. According to some embodiments, the serial number field contains a number of characteristics including alpha character fields 880a, 880c and a numeric field 880b. For example, according to some embodiments, in the first alpha field 880a, the first letter can refer to the series (e.g., bill 2 from FIG. 8 is a series C and bill 3 from FIG. 8 is a series A) of a currency bill. The second letter in the first alpha field 880a can refer to a bank or branch, such as a Federal Reserve Bank, that ordered the particular currency bill. The second alpha field 880c can be used to designate the number of times a particular numeric portion of a serial number has been used. A currency bill may have a unique serial number field based on the alphanumeric characters printed on the bill, but it is possible for an authentic currency bill to have the same exact numeric serial number portion 880b as another authentic currency bill. For example, one bill could have the alphanumeric serial identifier of AA12345678A and another bill could have the alphanumeric identifier of AA12345678B. While the numeric portion of the serial number is identical for both bills, the alphanumeric serial numbers are unique for each currency bill (the field 880c "A" and "B" being different).

According to some embodiments, processing image information can occur directly on a device, such as device 400, or using a PC or other processor 480 (see FIG. 40, or in some combination thereof. For example, for currency bill documents, according to some embodiments, the scanning device 400 obtains an image of a bill, extracts its serial number, and then transfers the image and serial number to the PC. The PC can then create a database with a record for each imaged bill using the information received from the scanning device for storage and subsequent processing. According to some embodiments, the device 400 obtains the images of bills, extracts data from the images such as the serial numbers of the bills, and stores some or all of this information in a database residing in a memory in the device 400. According to some embodiments, the device 400 obtains the images of the bills and then sends those images to a PC or processor 480 communicatively coupled thereto and the PC 480 performs or handles the data extraction, database creation, and/or data storage. According to some embodiments, when OCR or character extraction is completed on an external PC or processor 480, a high-speed board is used on the PC or processor 480. The processor can perform the character recognition using image data obtained from the imaging scanner and communicate with, for example, the controller of the document scanning device. The use of a high-speed board allows the processor 480 to send a signal to a controller (e.g., 150) residing in the scanning device 100, 200, 300, 400 to allow the controller, for example, to divert a certain document before the document has proceeded to far along in the transport mechanism to be properly diverted. The use of a high speed board on a processor 480 can also be useful to allow a PC or processor to manage multiple document scanning devices as shown, for example, in FIGS. 11a-11c.

According to some embodiments, serial numbers, including alphanumeric strings, are extracted from images of currency bills, for example, using OCR techniques to identify individual alphanumeric characters. Sometimes a complete serial number cannot be extracted, for example, when a currency bill has been subjected to wear. Incomplete serial number information can be displayed, for example, on control panel 450 as shown in FIG. 4a and/or on display 482 as shown in FIG. 4f. According to some embodiments, an operator of device 400 or PC/processor 480 can enter any missing data and/or correct extracted data. In the embodiment illustrated in FIG. 9, a screen shot 900 for correcting OCR errors is shown from a display device associated with a PC or control panel. A snippet image 910 of an area of a currency bill containing a serial number is displayed above editing field 920, which easily allows an operator to correct image characters that are unreadable by the OCR algorithm. The unreadable characters can be identified with a standard character such as an "*" or "?" so that the operator readily compare the unreadable characters displayed in field 920 with the image of the serial number area of the currency bill shown in image 910. According to some embodiments, an operator interface is used to correct the extracted serial number 920 such as via a mouse, keyboard, touchscreen, and/or other input device.

According to some embodiments, the correction of unreadable serial number information, including alphanumeric strings, can be performed while the document scanning device 400 continues to process subsequent documents in a batch and/or after the device has processed all documents in a batch and the device has stopped. According to some embodiments, the device stops when an unreadable serial number is encountered and processing of subsequent documents continues after the serial number or unreadable digits of the serial number have been entered by an operator. For example, the document scanning device can stop at a document for which there was an incomplete character extraction and prompt the operator to make the correction after which document processing can continue. In other embodiments, the document scanning device continuously processes documents, meanwhile storing incomplete character extractions into a queue for later correction by an operator. In some embodiments, the document scanning device can off-sort documents with incomplete character extraction for later correction. In other embodiments, a document scanning device can ignore incomplete character extractions and store the incomplete records for subsequent searching. See, for example, the record for Bill 6 in FIG. 8.

According to some embodiments, a document scanning device can be programmed or set where the transport mechanism stops before a particular flagged currency document or check is transported to an output receptacle, such as described in, for example, U.S. application Ser. No. 10/953,635, filed on Sep. 29, 2004 and published as U.S. Pub. No. 2005-0040225, which is incorporated herein by reference in its entirety. For example, an operator can input a particular serial number or denomination for a currency bill and the document scanning device can be set to stop when that particular bill is encountered. In other embodiments, the particular bill can be off-sorted while the document processing continues. Such an embodiment is useful, for example, for an operator to identify documents with certain characteristic(s) that may be located within a stack of currency documents or checks.

According to some embodiments, a document scanning device processes documents continuously, including when a document requiring additional attention is encountered during the scanning process. For example, while imaging a currency bill, an algorithm (e.g., for denomination or OCR) may have difficulty determining the denomination or serial number from the image obtained for the currency bill. The controller 150, in the example of FIG. 1, can then send the entire image of the currency bill requiring attention to control panel(s) 170 where an operator can view the entire image on a screen and correct the denomination and/or serial number through an input device. In certain embodiments, the document scanning device can continue to process documents or stop when a document requires additional attention, such as, for example, when making a correction. For currency bills that do not need additional attention or that have been corrected, only the portion of the currency bill containing the serial number can be stored for subsequent reference. In other embodiments, the entire image of the currency bill can be stored for subsequent reference. In certain embodiments, the document scanning device can communicate with a centralized computer as illustrated, for example, in FIG. 11. The centralized computer can allow for the centralized correction of imaged information from scanned documents for the various document scanning devices connected to the centralized computer.

In certain embodiments, a search algorithm is capable of allowing a customer or operator to search a list or database of serial numbers of other identifiers stored in a memory that is internal to or that is communicatively coupled to a document scanning device. A search algorithm can query one or more fields of data, such as, actual serial numbers or information associated with an actual serial number including date, customer, account number where documents were deposited, time deposit were made, document scanning device used, or any other information that might be useful for authenticating a currency bill or check. The information associated with a serial number or other identifier can be extracted and stored along with the serial number or other identifier at the time the serial number or other identifier is stored in the memory. FIGS. 7 and 8 illustrate some of the examples of how document information can be stored and displayed.

In certain embodiments, a search can be performed of a database of currency bill serial numbers to find, for example, counterfeit currency documents. First, an operator of a device, such as, device 400 and/or a processor 480 containing or communicatively coupled to a database containing the deposit records (such as shown in FIG. 8), can key in a serial number of a currency bill that may have been identified as being counterfeit, such as, by the Federal Reserve. Once keyed in, according to some embodiments, a search algorithm searches the serial number database looking at each character and character position for the keyed-in serial number to find any matches within the serial number database. In addition to providing the serial number for which to search, an operator can also identify how many of the individual digits of the keyed-in serial number are to have a character match and a position match with the serial numbers in the database. For example, a keyed-in serial number of concern for a currency bill can have ten digits and the operator may establish a search condition that eight of the ten digit positions are to have a character match and a position match in order for a record (for example, a serial number for a scanned in currency bill along with other identifying information) and from the database to be displayed. The search may retrieve a group of records with eight of ten numbers meeting the character match and position match with any missing digits displayed as wildcard characters. The serial numbers that comprise a database can come from OCR characters obtained by imaging currency bills. The serial number characters that comprise a database record can also, for example, be input manually or obtained electronically, such as, from an imported database file or a spreadsheet. The database records may contain input errors due to, for example, human factors or errors in OCR that may have gone uncorrected. According to some embodiments, the keyed in serial number or other identifying characteristic(s) that form the parameters of a search can be input or imported to a controller or processor and sent to one or more remote document scanning devices where each of the scanning devices then performs the search on processed currency documents or checks.

Table 1 shows an exemplary embodiment of how a search algorithm can operate. A customer may receive information of a counterfeit currency bill having serial number 1 5 7 3 2 6 9 1 4 8. The operator can then key the ten digit serial number into a PC that has a database of serial numbers extracted from imaged currency bills using, for example, OCR methods stored in the PC's memory. The operator may, for example, specify that seven of the ten digit positions are to have a character match and a position match with the keyed-in serial number.

TABLE 1

Example - Search Algorithm Results

| Searchable Serial Numbers Extracted Using OCR of Imaged Currency Bills | | | | | | | | | | Image of Serial Numbers From Scanned Currency Bill | | | | | | | | | |
|---|---|---|---|---|---|---|---|---|---|---|---|---|---|---|---|---|---|---|---|
| 1 | ? | 7 | 3 | 2 | ? | 9 | 1 | 4 | 8 | 1 | 4 | 7 | 3 | 2 | 6 | 9 | 1 | 4 | 8 |
| 1 | 5 | 7 | 3 | 2 | ? | ? | 1 | 4 | ? | 1 | 5 | 7 | 3 | 2 | 6 | 9 | 1 | 4 | 8 (MATCH) |
| 1 | 5 | 7 | 3 | 2 | 6 | 9 | ? | 4 | 8 | 1 | 5 | 7 | 3 | 2 | 6 | 9 | 7 | 4 | 8 |

In the exemplary results shown in Table 1, three currency bills are identified that meet the search criteria and make them candidates for a possible serial number match. All three identified bills have limited recognition of serial number characters during the OCR extraction that followed imaging of the bills. The image for the bill in the top row was retrieved because of the eight digit match of 1 ? 7 3 2 ? 9 1 4 8 with the keyed-in ten digit serial number of 1 5 7 3 2 6 9 1 4 8. In some embodiments, the operator can view the image of the serial numbers for the corresponding retrieved field by viewing a serial number snippet or an image of an entire bill. For the top row of Table 1, review of the imaged serial number does not show a match with the keyed-in serial number. Review of the imaged serial number for the currency bill in the middle row, however, does identify a match with the keyed-in serial number. The operator is therefore able to identify a counterfeit currency bill based on partially recognized serial numbers from database records of scanned currency bills. The operator can compare the retrieved list and associated serial number images with the keyed-in counterfeit serial number to check for any matches.

Figure 10:
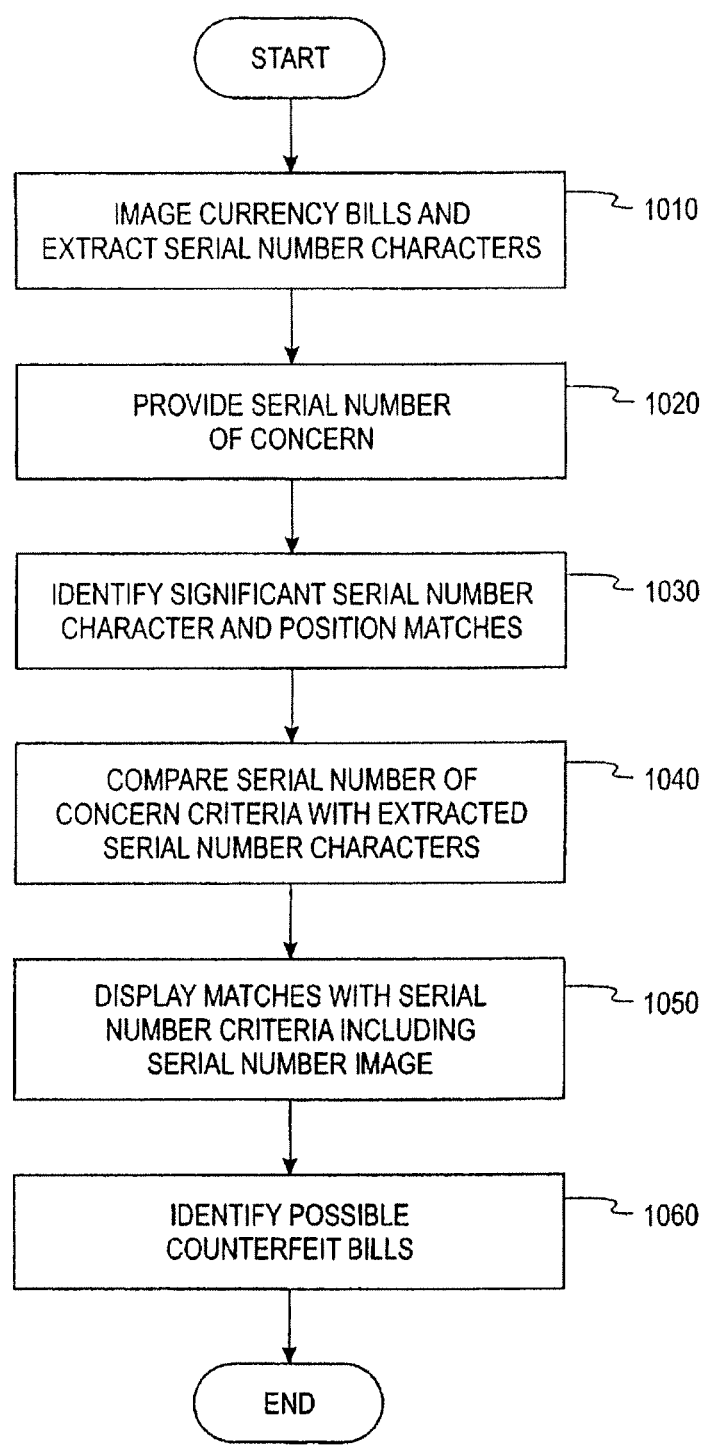
FIG. 10 is a flowchart of a search routine according to some embodiments of the present disclosure.

FIG. 10 illustrates an embodiment in which an operator can key in a serial number and search a group of scanned currency bill serial numbers for a match. In step 1010, an operator images and extracts serial number characters for currency bills using any of the document scanning systems described in this disclosure. In step 1020, the operator keys in a serial number of concern that, for example, was provided by the Federal Reserve as the serial number of known counterfeit currency bill. In step 1030, the operator can specify for how many character and position matches are to be obtained for the given serial number of concern (for example, a partial character and position match for 5 of 10 serial number characters). In step 1040, the full or partial serial number characters extracted from the scanned currency bills are compared to the serial number of concern applying the character and position criteria established by the operator. In step 1050, serial number matches based on the search criteria, if any, are displayed along with the corresponding serial number image. In step 1060, a check for matches with the serial number of concern can be made either through a direct match if a full set of searchable characters was extracted by OCR or by comparing the serial number of concern with the currency bill images for matches obtained with partial searchable characters extracted using OCR.

For certain banking procedures in the U.S., a bank may send currency bills to the Federal Reserve. When the Federal Reserve receives the currency bills, a check can be completed for the bills to determine if there are counterfeit bills present in the transmittal. The Federal Reserve may then prepare a report that is sent to the bank identifying the denomination and the serial number of the counterfeit bill(s). A bank will not receive credit for currency bills deposited with the Federal Reserve that are determined to be counterfeit. Previously, the bank attempting to deposit the counterfeit currency bill has had to take the loss from the Federal Reserve for the value of a counterfeit currency bill since there was no way to track who deposited the counterfeit bill with the bank. With the present disclosure, a bank now has a system for databasing serial numbers for currency bill deposits and the ability to search the database to identify serial numbers of concern. If a matching serial number is found for the currency bill that was determined to be counterfeit, the corresponding account such as identified in the matching database record can be debited the denomination of the counterfeit currency bill. The present disclosure also provides a system for allowing a bank to identify counterfeit currency documents immediately rather than having to send a currency bill, for example, to the Federal Reserve, have the Federal reserve determine the bill is counterfeit, and then returning the bill to the bank for submittal to the Secret Service or directly sending the bill to the Secret Service. With the present disclosure, a bank can immediately track the account or customer that deposited a counterfeit bill and then send the counterfeit directly to the Secret Service, thus bypassing the Federal Reserve and speeding up the process of counterfeit tracking.

In the exemplary document scanning devices illustrated in the present disclosure, serial numbers and other identifying currency bill information for a particular deposit can be obtained by running a deposit through the scanning device. An image of the currency bills can be obtained and OCR can be used to extract serial numbers, including alphanumeric characters. According to some embodiments. customer identifying information will be associated with the deposit and stored in a database record along with an image of the currency bill, the serial number information, the currency bill denominations, and customer identifying information in a database. The database record can be stored internal to the document scanning device or external to the document scanning device on, for example, a PC or in a memory coupled to a computer network. The serial numbers of counterfeit bills that are later identified can then be compared with the database records for deposits made to an entity to determine which depositor may be associated with a counterfeit bill. A system can also be configured to track whether more than one counterfeit serial number has been deposited over a given period of time. In some embodiments, database records can be searched to verify if duplicate serial number records are in the database. For example, an automatic database function may be to compare all databased serial numbers to identify matching or repeating serial numbers and to flag those records for subsequent investigation. A matching serial number can include all the alphanumeric character in a serial number or can be limited to only the numeric portion of a serial number. If the matching algorithm is limited to finding numeric matches, additional operator assistance may be needed to determine whether a currency bill is a counterfeit.

Figure 11A:
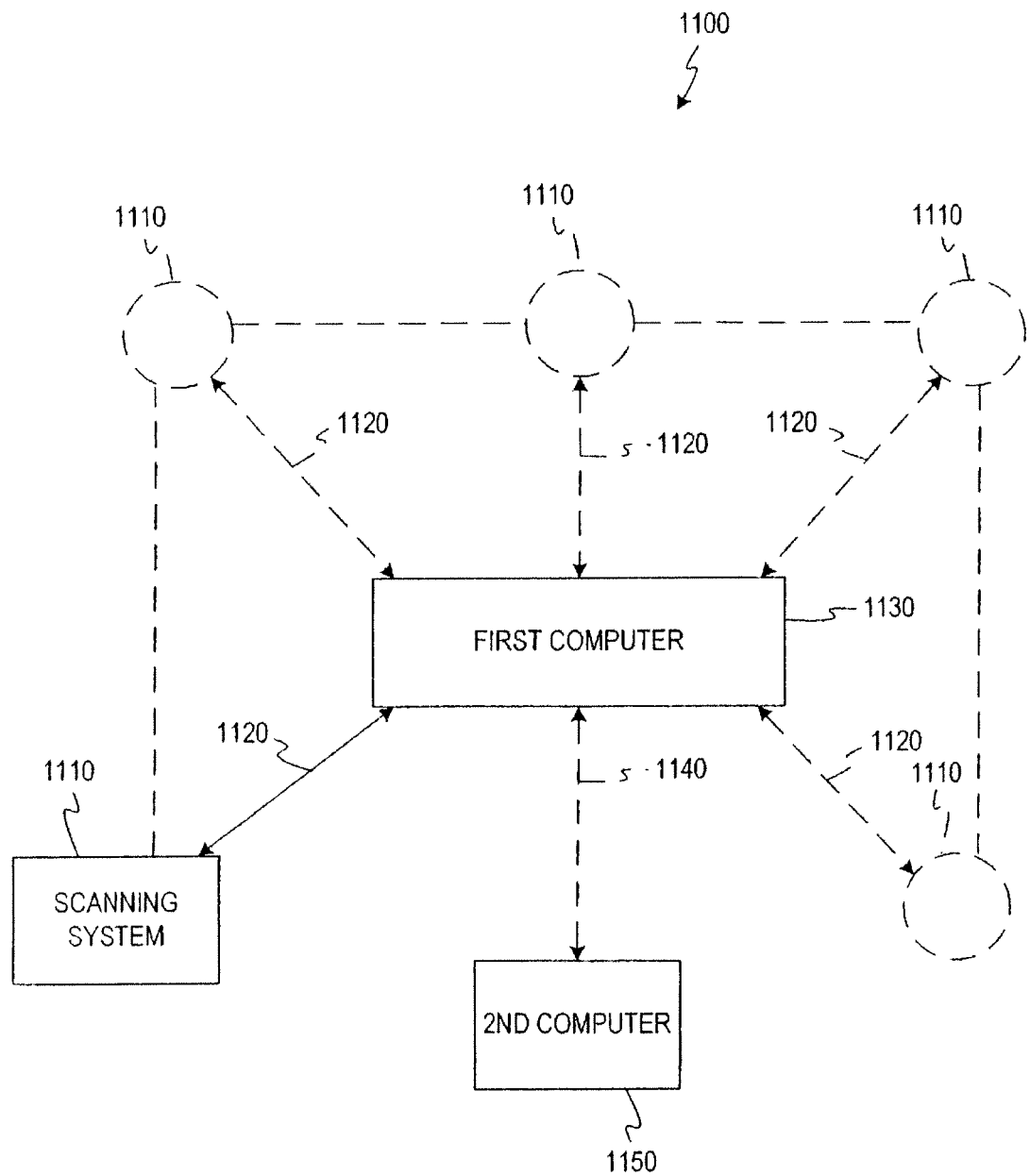
FIG. 11a is a block diagram of a document processing system according to some embodiments of the present disclosure.

FIG. 11*a* is another embodiment of the present invention, and depicts a block diagram of a document processing system 1100. The document processing system 1100 includes a document scanning device 1110, which is configured to receive currency bills. The document scanning device 1110 of FIG. 11*a* may be, for example, the document scanning devices 100, 200, 300, 400 of FIGS. 1-4.

The document scanning device 1110 is connected via a communication link 1120 to a first computer 1130. The first computer 1130 can be any type of computer, such as a personal computer, a server, part of a LAN, or a mainframe. The communication link 1120 can be any link used for data, voice, or video communications that is known in the field of disclosure, such as a telephone line, Ethernet, USB 2.0, FireWire, a wireless network, or other known communication techniques between devices. The communication link 1120 may be over a private line or a public line. In some embodiments, the document scanning device 1110 may be connected to the first computer 1130 via the internet. Alternatively, the communication link 1120 may be over another form of media, such as a radio or microwave link. The first computer 1130 may be located in the same place as the document scanning device 1110 or it may be in a location remote, or separate, from the document scanning device 1110. For example, it is contemplated that the document scanning device 1110 is located at a branch of the bank, while the first computer 1130 is located at the main office or processing center of the bank. In some embodiments, the individual document scanning device 1110 may be linked to each other via the communication link 1120.

In one embodiment, currency bills or other documents are fed into the document scanning device 1110 for deposit into a customer's account. The first computer 1130 is a part of the banking system at a financial institution that holds the customer's account. The first computer 1030 is adapted to credit the customer's account for the amount of a deposit. Before crediting the account, currency bills are scanned by the document scanning device 1110. A full image or an image of a portion of one side of a deposit bill or bills may then be obtained. As discussed herein, the document scanning device 1110 may be similar to the document scanning devices 100, 200, 300, 400 in FIGS. 1-4, and, therefore, may be used to check for counterfeit notes.

In another embodiment, the document scanning device 1110 merely scans the currency bills and the first computer 1130 authenticates the currency documents, as described herein. The images may be transferred via the communication link 1120 to the first computer 1130, which may be located at a bank. The first computer 1130 may then use the stored images to process information (for example, credit the customer's account, update customer's account with the number of counterfeits flagged). The first computer 1130 may run the serial number of the currency bills through a database or a memory to check for counterfeit serial numbers. If a match is found, the suspect bill may be rejected and the amount of the suspect bill debited from the customer's account. Alternatively, the bank may not wish to debit the customer's account every time a counterfeit is found, instead only debiting the account for repeat offenders or for bills over a certain dollar amount. The first computer 1130 may also create a chart for law enforcement personnel of who attempted to deposit the suspect bills.

In another embodiment, the first computer 1130 may store the images of all deposited currency documents to aid in reconciling discrepancies that may arise at a later date. For example, if a deposited currency bill is later found to be counterfeit using any variety of counterfeit detectors, the bank can track that currency bill to the customer that deposited the counterfeit bill. Currently, once a bill is deposited into a financial account (or mixed with any other bills), there is no way for a bank to track the bill. If a bill is later determined to be counterfeit, the bank cannot track the bill to the customer that deposited the counterfeit bill and the bank must, therefore, bear the loss. In certain embodiments, the document images that are captured and stored in memory can be limited to, for example, higher denomination currency bills such as 20s, 50s and 100s. This embodiment can be useful where time and memory space is a concern for the document scanning system since the database of serial numbers or other pertinent document information could be significantly reduced.

According to some embodiments, the system scans and stores the image of all currency notes and/or all documents associated with a transaction. A benefit of such a system is if a customer disputes the amount of a deposit, because of the system, the bank can easily obtain the scanned images of every document deposited to verify whether the amount credited to the customer's account was correct. In these embodiments, it is contemplated that the memory may be located in the scanning device 1110, or it may be located in the first computer 1130 or at both locations.

In another alternative embodiment, the first computer 1130 may be linked via a telephone line or other communication link 1140 to a second computer 1150, which may be a customer's computer, such as a home computer or a computer located at a retail store or an office. The second computer 1150 may also be a computer at another bank or financial institution. The communication link 1140 may be over a public line, a private line, or it may be a wireless link. In this embodiment, the images of documents associated with a transaction are forwarded to the customer as a receipt. According to some embodiments, the first and second computers 1130, 1150 may be linked via the internet. For example, using the internet, a bank may e-mail the information related to a transaction, including, for example, the images of the scanned documents to a customer's computer. In another embodiment, the images are downloaded onto a CD, a disk, a tape, or other storage media by the bank and forwarded to the customer. This may be done at the document scanning device 1110 at the time of deposit, or it may be done later at the bank and the CD, disk, tape, or other storage media may be sent to the customer via regular mail. In both of these embodiments, the document scanning device 1110 is useful because it provides the customer with a detailed record of the transaction shortly after the transaction occurs. The document scanning device 1110 is also beneficial since it stores the serial numbers, which may useful for tracking currency bills as they move through the system. Another benefit of the present disclosure is the usefulness in locating counterfeit bills throughout a region. The various financial institutions in a given region, for example San Francisco or the United States, may all use the same database having the counterfeit serial numbers and/or other counterfeit bill identifications, such as plate numbers and city codes. This way, the financial institutions within the region benefit whenever one financial institution discovers a new counterfeit.

In an embodiment illustrated in FIG. 11*a*, a plurality of document scanning devices 1110 may be connected in a "hub and spokes" network architecture as is known in the art. This is illustrated by a plurality of document scanning devices 1110 shown in phantom. All of the document scanning devices 1110 are linked via the communication links 1120 to the first computer 1130. Likewise, other network architectures may be used. In order to prevent congestion, an image buffer (not shown) on each document scanning device may store data until polled by the controller or the first computer.

Figure 11B:
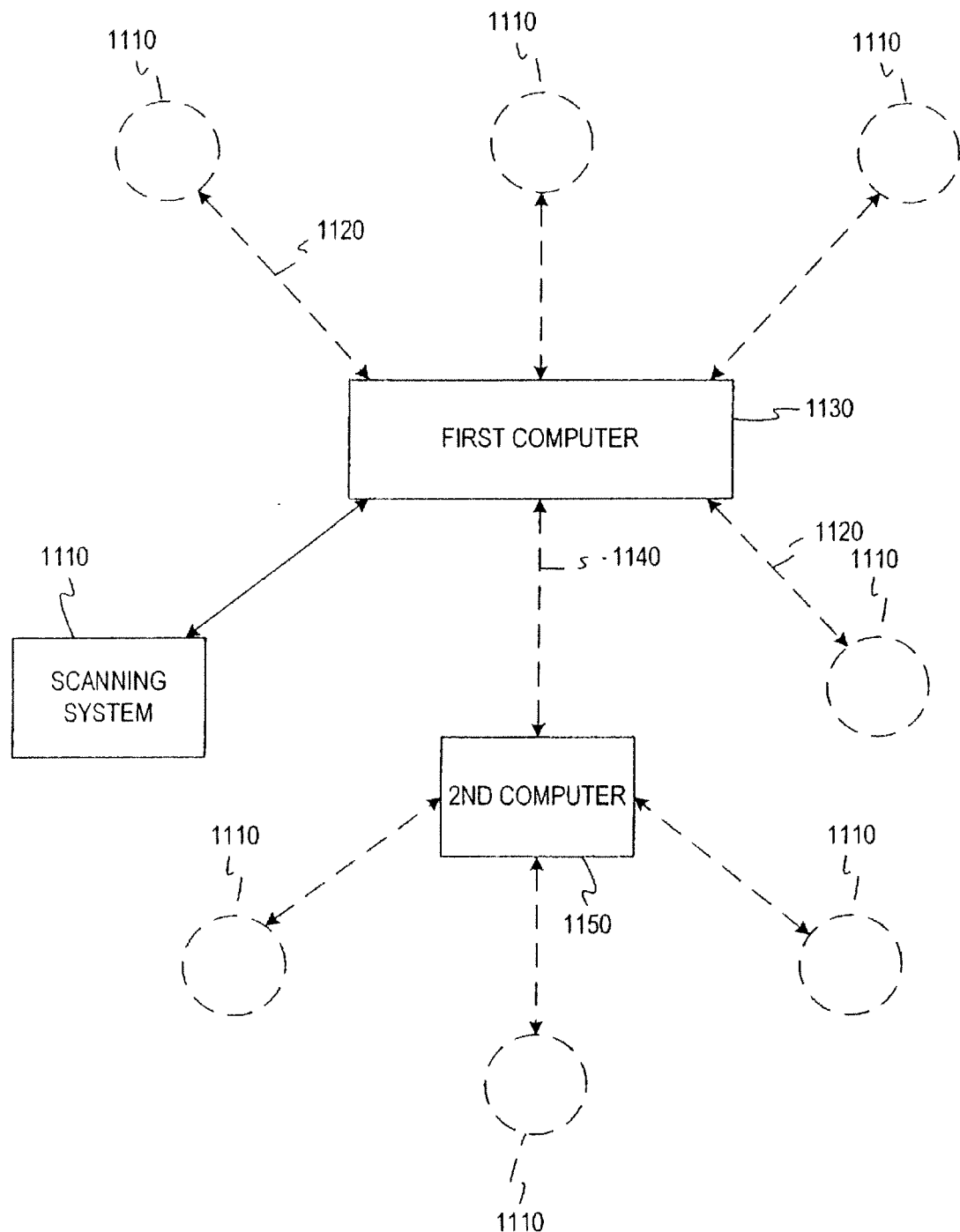
FIG. 11b is a block diagram of a document processing system according to some embodiments of the present disclosure.

Turning now to FIG. 11*b*, an embodiment is illustrated where the second computer 1150 is also in communication with a plurality of the document scanning devices 1110. In this embodiment, the first and second computers 1130, 1150, respectively, are also in communication and can share information with each other. In this embodiment, the second computer 1150 may be at another bank and may be connected via the communication links 1120 to the separate document scanning devices 1110. In this embodiment, the second computer 1150 would transmit information, such as updated serial numbers, to the document scanning devices 1110 and to the first computer 1130. The first computer 1130 would then transmit the information to the document scanning devices 1110 in its network. Alternatively, the second computer 1150 could communicate directly with all of the scanning devices and do the updating. Even if the second computer 1150 is not a bank computer or server, it may still have access to the scanning devices. Some banks may allow their customers to have access to the memory in the document scanning devices 1110 to view images that were deposited to or drawn on the customer's account at the bank.

Figure 11C:
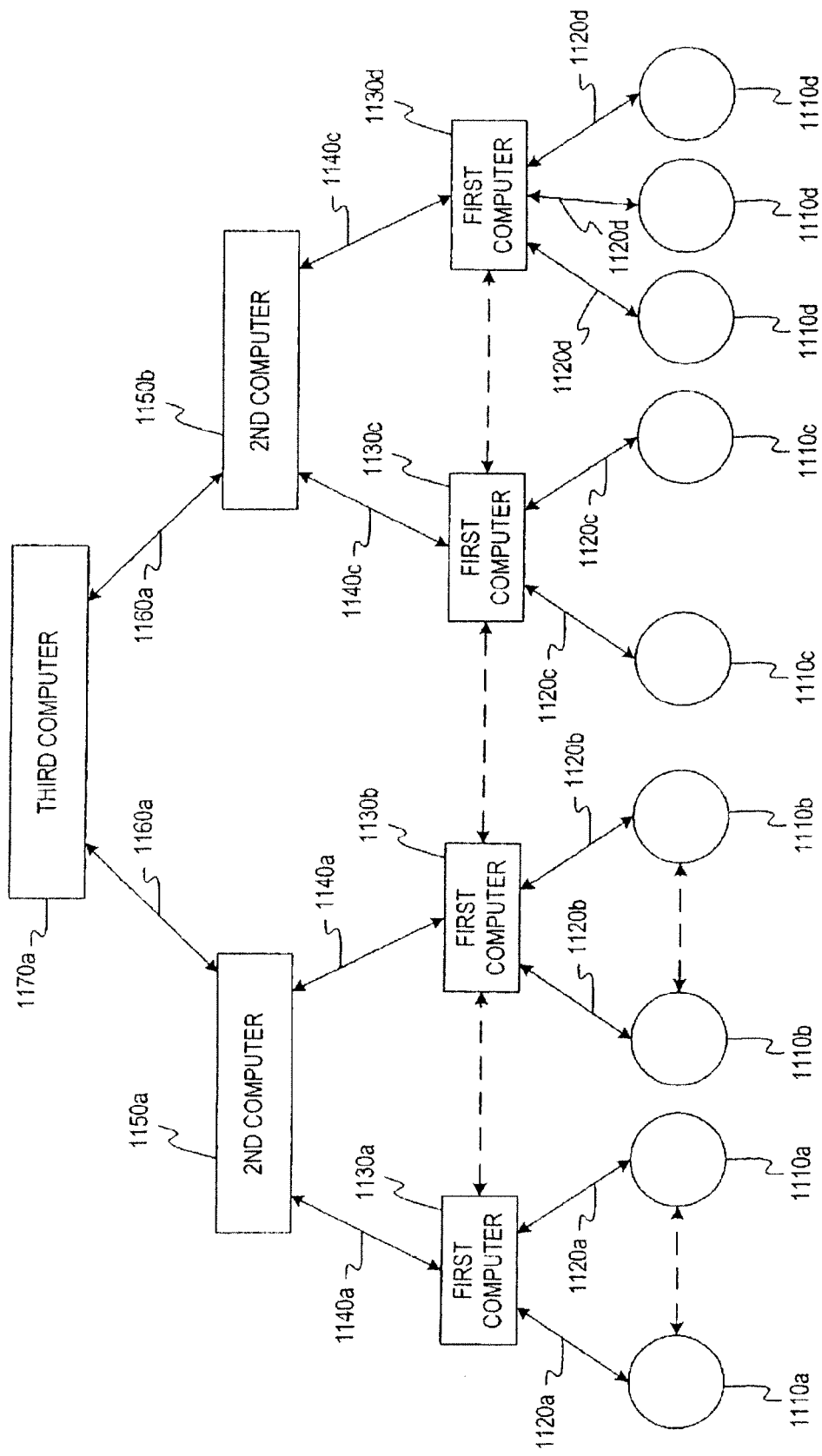
FIG. 11c is a block diagram of a document processing system according to some embodiments of the present disclosure.

Another embodiment is a pyramid structure, depicted in FIG. 11*c*. In this embodiment, document scanning devices 1110*a* are connected via communication links 1120*a* to a first computer 1130*a*. Another set of document scanning devices 1110*b* are connected via communication links 1120*b* to another first computer 1130*b*. The two first computers 1130*a*, 1130*b* are then each linked via the communication links 1140*a* to a second computer 1150*a* which is then in direct communication, via another communication link 1160*a*, with a third computer 1170*a*. Other document scanning devices 1110*c*, 1110*d*, first computers 1130*c*, 1130*d*, and second computer 1150*b* are arranged in a similar fashion. As in the other embodiments, all of the scanning devices 1110*a*, 1110*b*, 1110*c*, 1110*d* may be linked together, or only the scanning devices sharing a same first computer may be linked. Similarly, the first computers may be linked together as may the second computers.

According to some embodiments, such as in FIG. 1, a controller 150 is communicatively coupled with a control panel that is located remote to document scanning device 100. The control panel can also be centralized to more than one document scanning device 100. For example, a control panel similar to control panel 170, can be embedded within or externally connected to first computer 1130 (see, for example, FIGS. 11*a*-11*c*) with multiple document scanning devices 1110 in communication with first computer 1130. An embodiment having such a configuration allows the customer or operator to directly communicate with document scanning device 100 without being physically present at the document scanning location. In some embodiments, control panel 170 from FIG. 1 is centralized at first computer 1130 of FIG. 11*a*. The document scanning system 1110 can then send imaged documents to first computer 1130. In the example of a document whose images are unreadable by the OCR, an operator located remotely at first computer 1130 can view the image of the document and remotely input any missing characters from an incomplete OCR. A single operator or a group of operators located at one or a few central locations can correct OCR errors for multiple document scanning devices.

In some embodiments, the document scanning devices illustrated in the present disclosure can have software that allows a customer or operator to input instructions into the document scanning device for documents whose images are unreadable by, for example, the OCR algorithms.

According to some embodiments, a software algorithm can enhance the document image obtained from the image scanner for situations in which the OCR algorithm cannot extract, for example, the serial number on a currency bill. Following enhancement, the enhanced image can be reprocessed using the OCR algorithm until the digits in the document are successfully obtained. The image enhancement can be executed automatically or manually on a document scanning system. In one embodiment, an enhancement algorithm is triggered when an initial OCR algorithm cannot identify a character or a string of characters from an image. The image is sent to a post-processing enhancement routine. The enhancement routine can include adjusting the image by, for example, changing the contrast or some other image enhancement techniques. The OCR algorithm can then reprocess the enhanced image to extract the desired character or string of characters.

According to some embodiments, the document scanning devices of the present disclosure may have one or more output receptacles, such as illustrated in FIGS. 3 and 4 (output receptacles 317*a*, 317*b* and 430*a*, 430*b*) that can allow for various accommodation of documents that are unreadable or that are identified as needing further attention to authenticate them. In certain embodiments, a document scanning device can process documents continuously, that is, when a document requiring further attention is identified, the document scanning device continues to process the remaining documents rather than stop on the document requiring further attention. In such an embodiment, the document requiring further attention can be sorted into a separate output receptacle or into a holding receptacle in the document scanning device while the remaining documents are processed. The holding receptacle can hold one or more documents that are sequenced according to the order processed. The customer or operator can then inspect the document(s) requiring further attention while the document scanning device continues to process additional documents. Using either a remote or local control panel or other display and input device (for example, a PC or POS terminal), the operator can then take corrective action with the document(s) that need to be inspected. After the customer or operator takes corrective action, the inspected document can be combined with the rest of the processed documents, with the scanning device operations continuing throughout the inspection process.

According to some embodiments, imaging of documents by the document scanning device can provide additional efficiency to the document inspection process. For imaged documents, the operator can view the full or partial image of the document that can, for example, be displayed on a monitor or other display device. The operator can then make any corrections to the scanned information using a control panel or other data entry device. Following corrective action by the operator, the document in the holding receptacle can then be combined with the rest of the processed documents. Since the corrective action is made using an image of the document, the operator can be remote from the document scanning device where the document scanning device is in communication with the display and data entry device being used by the operator. If corrective action for the document requiring attention cannot be made using an image of the document, the operator can still visually inspect the document from the holding receptacle. For embodiments with a single input receptacle and a single output receptacle, such as the document scanning devices illustrated in FIGS. 1 and 2, or for document scanning devices without other multiple forms of holding receptacles, the corrective actions for documents requiring further attention can be handled through inspection of the images of the documents without a physical inspection. In single output receptacle embodiments, the sequence of the documents remains as when the documents were placed in the input receptacle. In certain embodiments, document processing can stop at a document requiring attention or processing can occur continuously while corrections are being made.

According to some embodiments, the denomination of a document of concern may not be included in a total amount that may be calculated for a processed stack of currency documents or checks. In certain embodiments, after the document of concern is further analyzed and determined to be authentic by an operator reviewing an image of the document or physically inspecting the document, the operator can input the denomination of the document into the document processing system. The denomination that was input can then be added to the corresponding total for the stack of documents from which the document of concern was identified.

According to some embodiments, the use of imaging-based technology of the present disclosure can be further used to enhance the procedures for remote deposits, such as deposits from ATMs, retail locations, branch banks or other financial processing centers. For example, for the process in FIGS. 12*a* and 12*b*, correction and proofing can be made to a single deposit that contains both checks and currency bills. Images can be electronically collected for each deposited document. If a document scanning device cannot obtain an accurate read of the information from a check or a currency bill, an operator located, for example, remote to the document scanning device will be able to use the present disclosure to electronically receive and view images of the check and/or currency bill that is in need of attention and make corrections to, for example, serial numbers, account numbers, denomination, or ABA routing numbers. The operator can be making the corrections at a remote location, such as at a terminal and input device associated with first computer 1130 in FIG. 11*a* or first computer 1130, second computer 1150, and/or third computer 1170 from FIGS. 11*b* and 11*c*. The image of the check and/or currency bill documents can remain electronically, magnetically or optically stored for reconciliation or other future viewing, such as if it is later determined that a currency bill and/or check is counterfeit or forged. By the inclusion of a customer and/or transaction number for each deposit, the counterfeit or forged documents can then be traced to the depositor to extract the counterfeit or forged document value from their account.

Figure 12A:
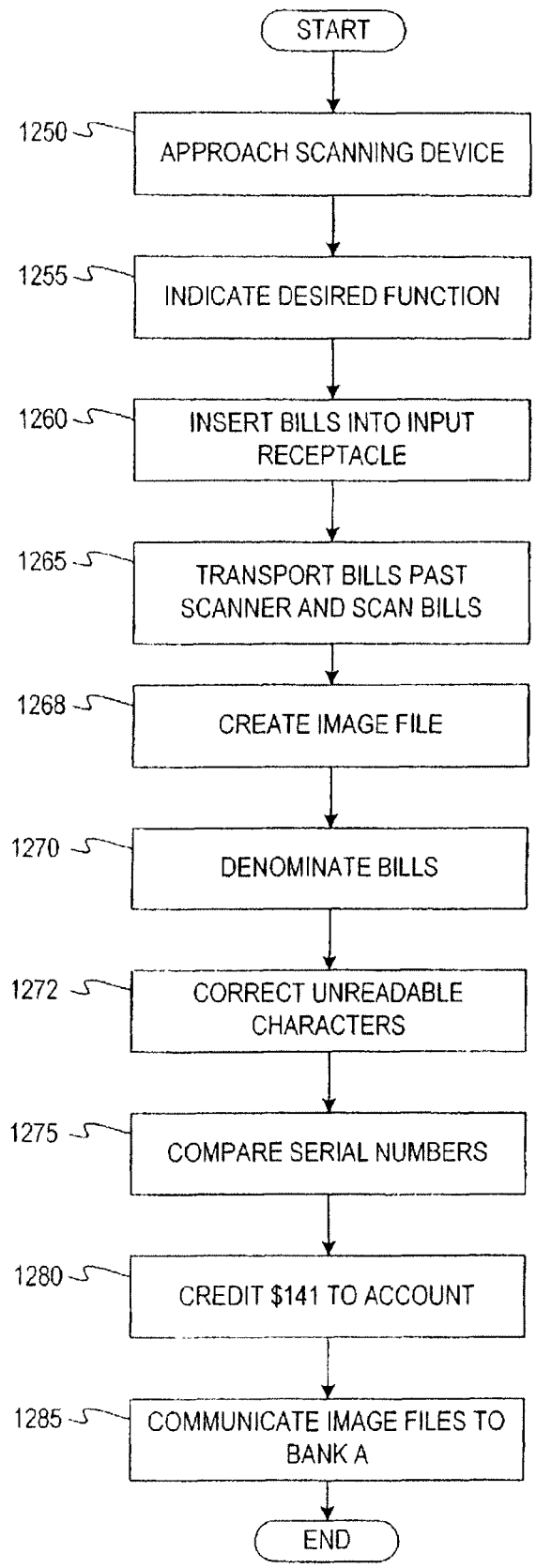
FIG. 12a is a flowchart describing the operation of a document processing system according to some embodiments of the present disclosure.

FIG. 12*a* is a flow chart according to certain embodiments of the present disclosure. At step 1250, a person approaches a scanning device. The person wants to deposit currency bills into a checking account at Bank A. Next, at step 1255, the person indicates on the scanning device what he wants to do (deposit money) and where (account number at Bank A). This may be similar to how a person would use a standard ATM, with the machine reading a card for certain information (bank name and account number) and the customer inputting other information (what they want done and how much money).

Once the machine has the information, it may instruct the person to insert the bills into an input receptacle (step 1260). In this example, the person has deposited ten currency bills totaling $141 (one fifty, three twenties, one ten, four fives, and one single). At step 1265, the bills are then transported one by one past an image scanner which scans each bill as described above. An image file is created containing the image of each currency bill and its serial number (step 1268). The bills are then denominated at step 1270. In one embodiment, correction to the unreadable OCR characters (step 1272) can be completed for unreadable currency bill serial numbers, as an example, as described above. Serial numbers of the bills are then compared to counterfeit serial numbers in a list (step 1275). In this example, none of the bills contain serial numbers that match the list of counterfeit serial numbers. Therefore, the $141 is credited to the person's account at Bank A (step 1280). At step 1285, the image files of the currency bills are communicated to Bank A for storage. It is also contemplated that the denomination of the currency bills may be determined prior to or concurrently with the counterfeit testing.

Figure 12B:
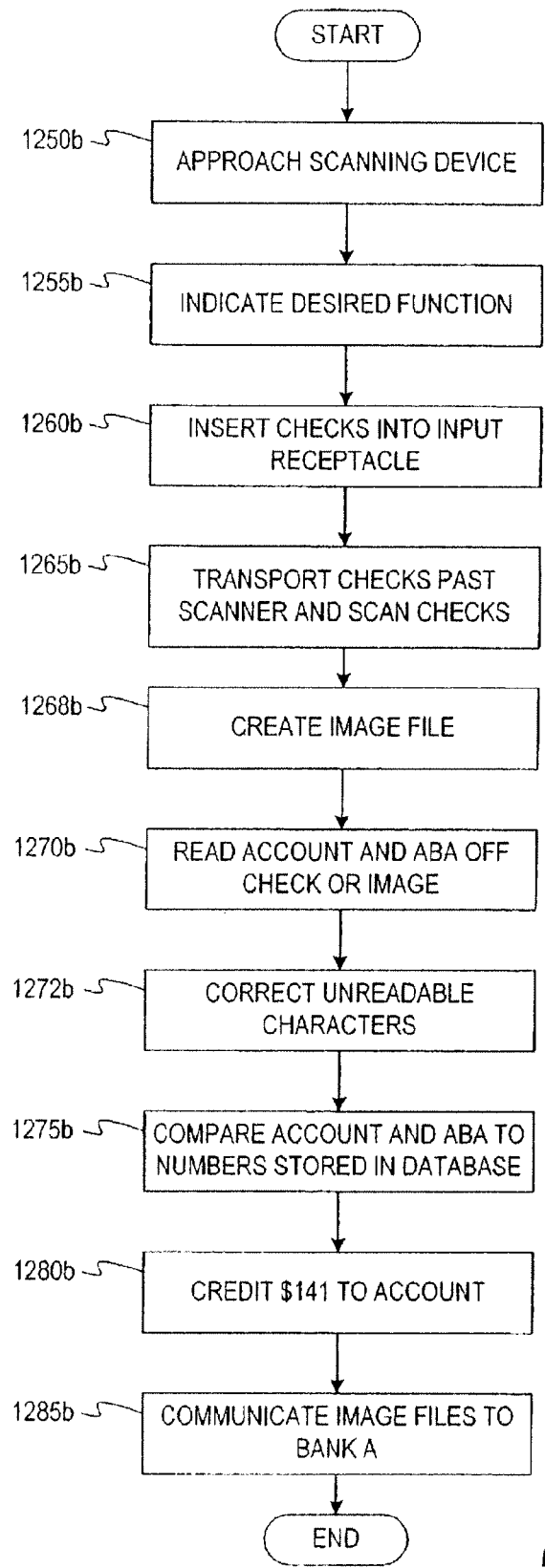
FIG. 12b is a flowchart describing the operation of a document processing system according to some embodiments of the present disclosure.

Turning now to FIG. 12b, an example depicting how a check may be deposited is described. At step 1250b, a customer approaches the scanning device. The person wants to deposit checks into a checking account at Bank A. Next, at step 1255b, the person indicates on the scanning device what he wants to do (deposit checks) and where (account number at Bank A). This may be similar to how a person would use a standard ATM, with the machine reading a card for certain information (bank name and account number) and the customer inputting other information (what they want done and how much).

Once the machine has the information, it may instruct the person to insert the checks into an input receptacle (step 1260b). In this example, the person has deposited four checks totaling $141 (one for sixty six dollars, one for fifty dollars, one for twenty dollars, and one for five dollars). At step 1265b, the checks are then transported one by one past an image scanner which scans each check as described above. An image file is created containing the image of each check (step 1268b). The amounts of the checks are then obtained by reading the courtesy amount (CAR) and/or the legal amount at step 1270b. In one embodiment, correction to unreadable characters (step 1272) from the scans of the checks can be completed for unreadable account and/or check numbers, as an example, as described above. The ABA, account and/or check numbers of the checks are then compared to the flagged numbers in the memory (step 1275b). In this example, none of the data matches data in the memory. Therefore, the $141 is credited to the person's account at Bank A (step 1280b). At step 1285b, the image files of the checks are communicated to Bank A for storage. It is also contemplated that the denomination of the checks may be determined prior to or concurrently with the counterfeit testing.

Figure 13:
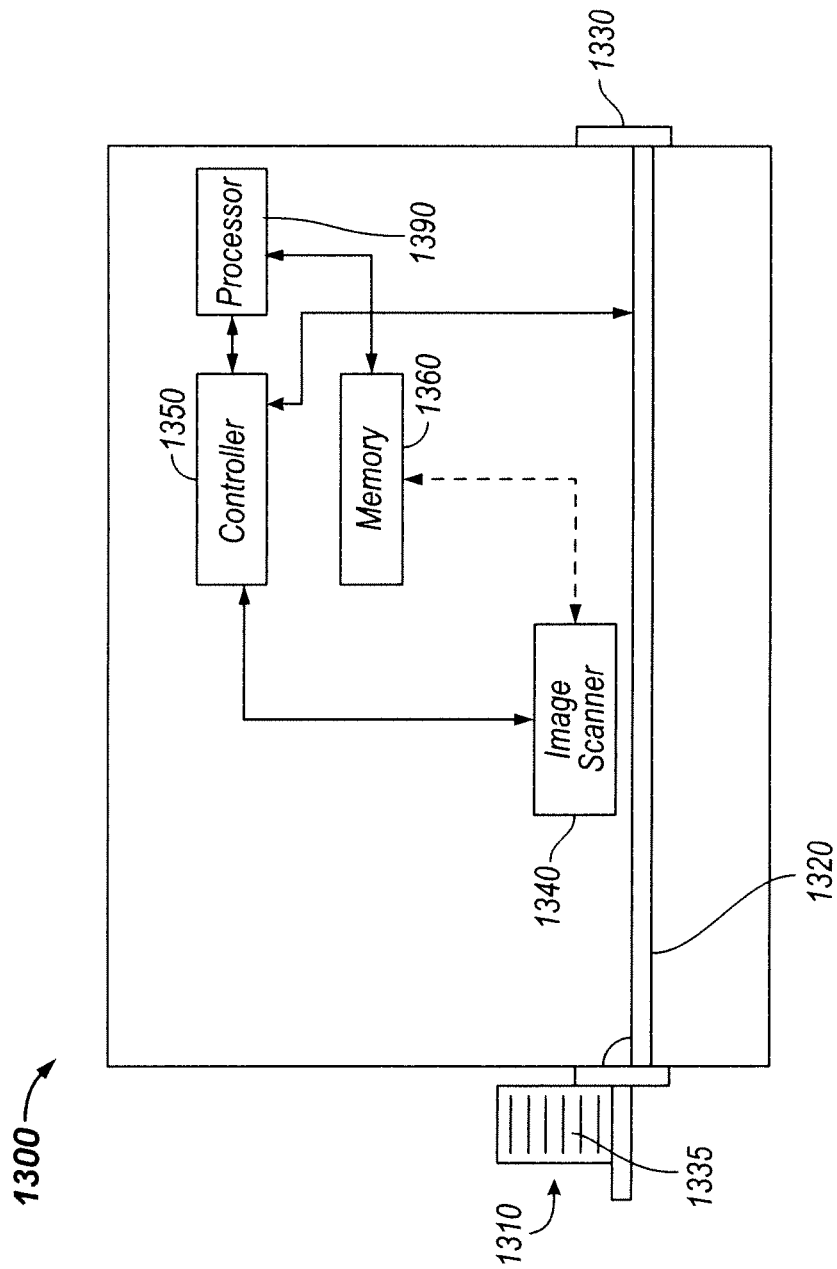
FIG. 13 a functional block diagram of a currency note scanning device according to some embodiments of the present disclosure.
Figure 14A:
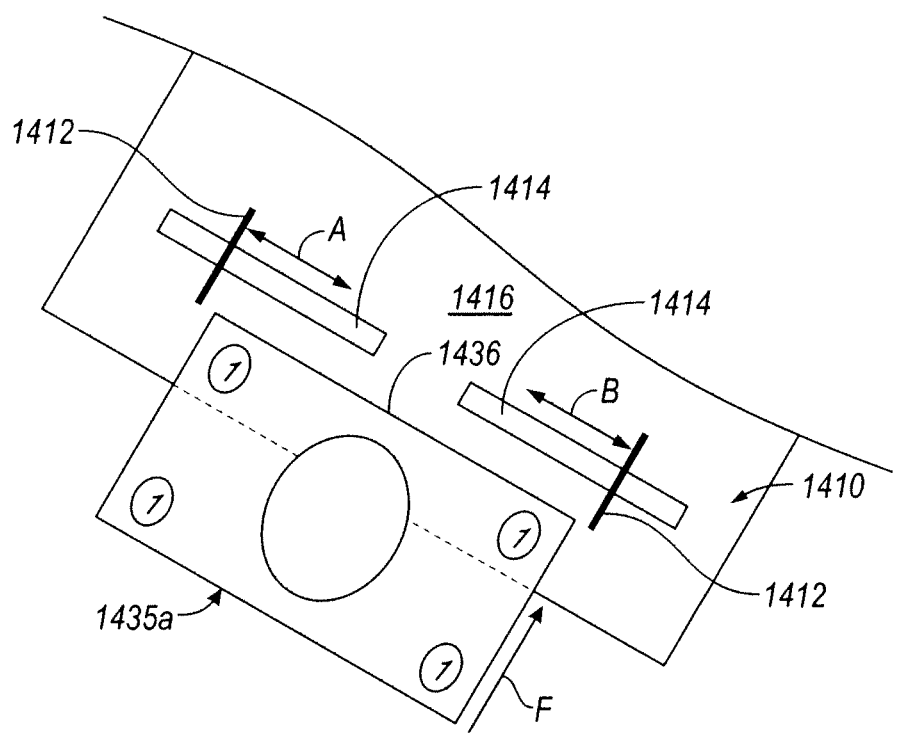
FIG. 14a is a top view of an input receptacle according to some embodiments of the present disclosure.
Figure 14B:
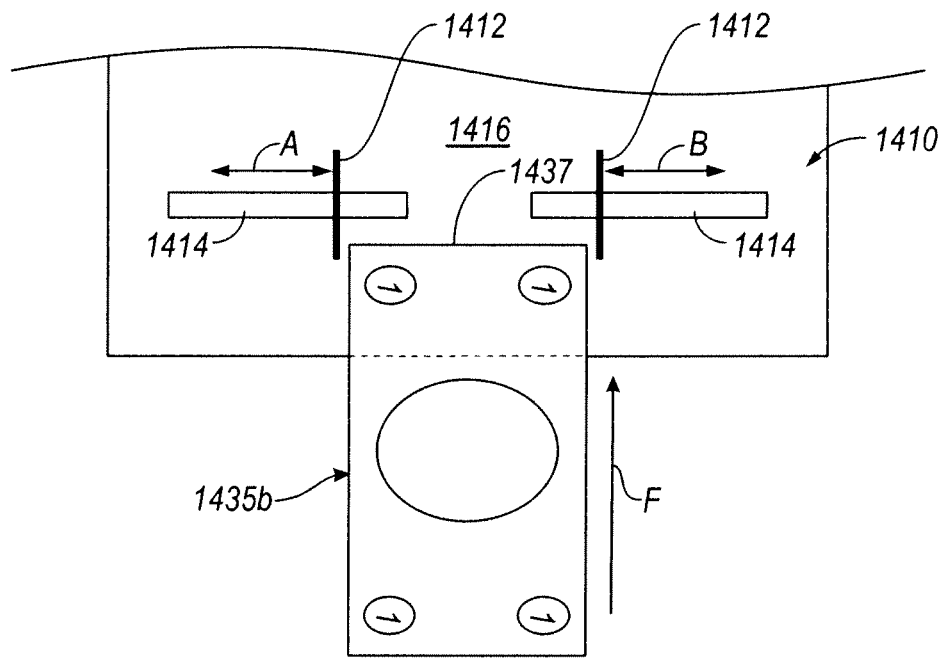
FIG. 14b is a top view of the input receptacle of FIG. 14a with the slidable guides adjusted to accommodate a narrower edge of a document.

Turning to FIG. 13, a block diagram of a currency note processing device 1300 is illustrated according to certain embodiments of the present disclosure. The currency note processing device 1300 can include an input receptacle 1310, a transport mechanism 1320, an output receptacle 1330, an image scanner 1340, a controller 1350, a memory 1360, and a processor 1390. In certain embodiments, the input receptacle 1310 is configured to receive one currency note at a time. In other embodiments, the input receptacle is configured to receive a plurality of currency notes 1335, for example, in the form of a stack of currency bills. It is contemplated that the input receptacle 1310 may be adapted to receive the plurality of currency notes 1335 with either a wide edge or a narrow edge of the plurality of the currency notes 1335 being initially fed into the device 1300. FIGS. 14a,b depicts one non-limiting example of such an adaptable input receptacle 1410. FIG. 14a shows a currency note 1435a being fed with its wide-edge 1436 leading; while FIG. 14b shows a currency note 1435b being fed with its narrow-edge 1437 leading. Arrows F indicates the direction in which currency notes are fed into a device comprising the input receptacle 1410. The input receptacle 1410 includes two slidable guides 1412. The slidable guides 1412 are adapted to slide along slots 1414, in the directions of arrows A and B, that are formed in an input receptacle base 1416. It is contemplated that the slidable guides 1412 and the input receptacle base 1416 may be formed of several materials, including, but not limited to, plastic, metal, glass, fiberglass, etc. It is further contemplated that the slots may be of any of a variety of sizes or shapes.

Referring back to FIG. 13, the output receptacle 1330 is configured to receive the plurality of currency notes 1335 once the device 1300 processes the plurality of currency notes 1335. It is contemplated that the output receptacle 1330 receives the plurality of currency notes in either a wide-edge leading or a narrow-edge leading orientation. In certain embodiments, it is contemplated that the device 1300 may include two or more output receptacles. For example, in such embodiments, the device 1300 may stack and/or store the plurality of received currency notes 1335 in different output receptacles according to the denomination of the note. Alternatively, the device 1300 may separate properly denominated currency notes from no-call currency notes. A no-call currency note may be a currency note that the device 1300 cannot denominate because, for example, the currency note is old and worn, or the currency note might have a piece of tape or marking causing a no-call. Additionally, a no-call currency note may be a currency note that the device 1300 cannot extract desired information for other similar reasons (e.g., the note is poorly printed, the note is soiled, the note has a tear, etc.).

According to some embodiments, the image scanner is located within the device 1300, desirably positioned adjacent to the transport path such as above the transport mechanism 1320 or transport path. As the plurality of currency notes 1335 are processed, the image scanner 1340 obtains a image of each of the plurality of currency notes 1335 being processed by the device 1300. It is contemplated that in certain embodiments, the image scanner 1340 obtains an image of the entire currency note, including both sides of the currency note 1335. The device 1300 can include two image scanners, one above the transport mechanism 1320 or transport path and the other below the transport mechanism 1320 or transport path, similar to the image scanners 460a,b depicted in FIG. 4e. In certain embodiments, the image scanner 1340 can obtain an image of an entire side of the currency note 1335, while in other embodiments, the image scanner 1340 can obtain one or more separate and distinct portions, or snippets, of one or both sides, of a currency note, as illustrated, for example, by the snippet of the serial number 830 in FIG. 8.

The transport mechanism 1320 transports each of the plurality of the currency notes 1335, one at a time, from the input receptacle 1310 along a transport path to the image scanner 1340 for scanning. Then the transport mechanism 1320 transports each of the plurality of currency notes 1335 from the image scanner 1340 along a transport path to the output receptacle 1330. In certain embodiments, it is contemplated that the transport mechanism 1320 can transport the plurality of currency notes 1335 at rates of approximately 1,000 to 1,200 currency notes per minute with the wide-edge of the currency note leading. It is also contemplated that the transport mechanism can transport the plurality of currency notes 1335 at rates of approximately 500 to 600 currency notes per minute with the narrow-edge of the currency note leading.

It is also contemplated that in certain embodiments, a currency note processing device can include one image scanner and a transport mechanism that can transport a plurality of currency notes past or through the image scanner two times, such that a device with one image scanner may obtain an image of both sides of each of the plurality of currency notes.

The controller 1350 can be coupled to the transport mechanism 1320, the image scanner 1340, and/or the processor 1390. The controller 1350 generally communicates with the processor 1390 to control and/or vary the timing of the image scanner 1340 and the transport mechanism 1320.

The memory 1360 can be coupled to the image scanner 1340 and adapted to store the image or the image snippet(s) of the plurality of currency notes. The memory 1360 can further be adapted to store computer-type programs, such as, for example, cropping algorithms, deskewing algorithms, denominating algorithms, authentication algorithms, denomination images, and extraction algorithms. Extraction algorithms can include, for example, OCR, CAR, LAR, bar code recognition, or fitness criteria recognition. The memory 1360 is further adapted to store any data extracted from the images, such as, for example, a serial number, a series number, a denomination, a signatory, or a plate number. Other data that can be stored may include, for example, Federal Reserve Bank, bar code ticket number, ticket amount, account number, bank routing number, check date, ticket date, time, country code, MICR data, authentication features.

The processor 1390 can be coupled to the memory 1360 and the controller 1350. The processor 1390 can communicate with the controller 1350 to coordinate the timing of the image scanner 1340 and the transport mechanism 1320.

In certain embodiments, it is contemplated that the processor 1390 applies one or more denominating algorithms to the stored images, or image snippets, to denominate the plurality of currency notes 1335. The processor 1390 may create image snippets by executing a cropping algorithm or a computer program/code that searches the image for the edges of the currency note. Once the program determines the edges of the currency note, the program can then crop, or virtually cut, the image of the currency note out from the superfluous surrounding image.

The processor 1390 can also execute a deskewing program/code, which uses geometry and mathematical formulas and/or equations to orient the image of the currency note such that currency note edges are squared up. Squaring up an image's edges allows the processor 1390 to more readily position a grid or coordinate system on the image, where the origin of the coordinate system is, for example, placed at one corner of the currency note image and the x-axis and y-axis are positioned along the wider and narrower edges of the currency note, respectively. The coordinate system can also be placed with the origin at the center of the currency note image with the x-axis and y-axis parallel to the wider and narrower edges of the currency note, respectfully. It is contemplated that in certain embodiments, the processor can place a coordinate system on the image of the currency note without first deskewing the image. It is further contemplated that the coordinate system can be positioned with the origin of the x-axis and y-axis placed at any known position on the image of the currency note. In certain embodiments, the processor can directly position a coordinate system on the currency note image, or image snippet, without deskewing and/or cropping the original image generated by the image scanner.

According to certain embodiments, the processor locates, crops and/or deskews a portion of the currency note image. One non-limiting example of an image portion is depicted in FIGS. 15*a,b*, which depicts an image of a currency note 1538 (FIG. 15*a*) with an image portion 1539 having a width w and a height h. It is contemplated in certain embodiments, the image portion can be located anywhere on the face or portrait side of a currency bill, or on the non-face side of a currency bill. Additionally, the processor 1390 can be adapted to apply a denominating algorithm to the image portion 1539 to denominate the currency note 1538. It is contemplated that in certain embodiments, the processor can apply the denominating algorithm to an entire side of the currency note image to determine the denomination of a currency note. It is also contemplated that the processor can apply the denominating algorithm to any of a variety of portions of the currency note image.

One non-limiting example of a denominating algorithm used to denominate U.S. currency bills is a luminance algorithm that uses data to denominate currency bills. The luminance algorithm can sample and digitally process an image or a portion of an image (e.g., image portion 1539) of a currency bill to determine the currency bill's correct denomination. The luminance algorithm can determine or calculate the luminance of pixels in sample areas 1539*a-n* of the image or image portion 1539. For example, the luminance algorithm can calculate the average luminance of the pixels in sample areas (e.g., 1539*a-n*) having a width w and a height $\Delta$h, depicted in FIGS. 15*b,c*. Desirably, the width w of the sample areas can be in the range of 0.3 inches to 0.7 inches and the height $\Delta$h can be in the range of 0.03 inches to 0.1 inches. Accordingly, the luminance algorithm determines a fixed number of average luminance values for "n" number of sample areas parallel to the wider edge of the currency note image (e.g., 1538) or image portion (e.g., 1539).

In certain embodiments, the average luminance data samples obtained can be subjected to digital processing, including a normalizing process to deaccentuate variations due to "contrast" fluctuations in the scanned image of the printed pattern or indicia existing on the surface of the scanned currency bill. The collection of normalized average luminance data samples represent a characteristic pattern that is fairly unique for a given currency bill denomination and incorporates sufficient distinguishing features between characteristic patterns for different currency denominations so as to accurately differentiate therebetween.

It can be desirable to generate and store a series of master characteristic patterns using standard currency bills for each denomination of currency that is to be detected. The "standard" currency bills used to generate the master characteristic patterns are desirably currency bills that are slightly used bills. According to certain embodiments, two characteristic patterns are generated and stored within the device memory for each detectable currency denomination. The stored patterns can correspond, respectively, to optical scans performed on the non-face surface of a currency bill along "forward" and "reverse" directions relative to the pattern printed on the currency bill. In certain embodiments it is contemplated that any number of a variety of patterns are generated and stored within the device memory to be used to denominate the currency bills. For example, in certain embodiments, the device stores four characteristic patterns for each denomination of bill being processed; two of the patterns for the non-face surface and two of the patterns for the face surface of the currency bill.

According to some embodiments, the processor is adapted to identify seven (7) different denominations of U.S. currency, i.e., $1, $2, $5, $10, $20, $50 and $100. Accordingly, a master set of, for example, 14 different characteristic patterns can be stored within the system memory for subsequent denomination purposes (e.g., seven denominations for which the processor can identify two characteristics for each denomination). In certain embodiments, the processor can execute the luminance algorithm to generate a characteristic pattern to compare with, for example, each of the 14 prestored characteristic luminance patterns. According to some embodiments, the processor then generates, for each comparison, a correlation number representing the extent of similarity between corresponding sample areas of the plurality of average luminance data samples for the compared patterns. According to some such embodiments, denomination identification is based on designating the scanned bill as belonging to the denomination corresponding to the stored characteristic luminance pattern for which the correlation number resulting from pattern comparison is determined to be the highest. Other denominating techniques are known to those skilled in the art and fall within the scope of the present disclosure. For example, various currency processing equipment which denominate currency notes have been developed and/or sold. It is contemplated that the denominating algorithms therein may be used in conjunction with the present disclosure such as by examining the image of a currency note and/or portion(s) thereof as opposed to the signals generated by one or more detectors such as optical detectors. It is further contemplated that up to four or more characteristic patterns per denomination can be identified or prestored. It is also contemplated that certain series of certain note denominations can also have unique characteristic patterns that can be identified and/or prestored.

It is contemplated that in certain instances the device may return a no-call result when comparing the luminance data samples with the stored master characteristic patterns, thus failing to denominate the currency bill. According to some embodiments, in the case of a no-call, the processor and/or controller can direct the transport mechanism to off-sort the currency bill to a different output receptacle than the one for properly denominated currency bills.

In certain embodiments, the sample areas (e.g., 1539*a-n*) can overlap. FIG. 15*b* depicts two pairs of overlapping sample areas 1539*b,c* and 1539*f,g*. It is contemplated that "n" number of sample areas can be obtained as necessary to reliably and accurately denominate the plurality of currency notes 1335. In certain embodiments, it is contemplated that the denominating algorithm calculates average luminance values for 100-140 sample areas. In other embodiments, the denominating algorithm calculates approximately 50-70 average luminance values. Examples of characteristic patterns may be found in U.S. Pat. No. 5,295,196, entitled "Method and Apparatus for Currency Discrimination and Counting," which is incorporated herein by reference in its entirety.

Referring back to FIG. 13, according to certain embodiments, the processor 1390 can denominate the plurality of currency notes 1335 by comparing either the entire image of a currency note or a portion of an image of a currency note with a stored master image of a currency note and/or portion(s) thereof, also referred to as a denomination image. The processor 1390 can be adapted to apply a denominating algorithm that, for example, compares the luminance of certain pixels of the scanned image with the luminance of certain pixels of a stored master denomination image. Based on the comparison of the pixel luminance of the similarly positioned pixels, the processor 1390 can determine the denomination of the currency notes. Denomination can also occur using a number of different processes. For example, a value symbol from a note can be recognized using OCR techniques or a note can be center-scanned along the notes lengthwise axis. In other embodiments, an area of a note having a unique characteristic to a particular denomination can be analyzed and compared to a prestored data. In certain embodiments, an image taken from a sampled note can be compared with a stored master image using cross-correlation or R-squared (correlation coefficient) techniques.

According to certain embodiments, the image scanner 1340 works with the processor 1390 to extract information from either the original image, a cropped image, a deskewed image, or an image snippet. The information extracted from the currency note image can be the same as or similar to the information extracted from the currency bill depicted in, for example, FIG. 7*a*, including such information as serial number 730*a*, signature 739*a*, denomination 750*a*, series 760*a*, back plate number 770*a*, front plate number 768*a*, or print code 769*a*. It is contemplated that other information can be extracted from the currency notes. The extracted information may uniquely identify the currency note or currency bill, such as the serial number.

According to certain embodiments, the image scanner 1340 and/or processor 1390 can extract information from currency note images using one or more optical character recognition ("OCR") algorithms. An OCR algorithm can include locating specific fields within the image or image snippet and determining or extracting character information associated with the currency note. It is contemplated that in certain embodiments different methods of extracting desired information from currency notes can be used (e.g., CAR, LAR, bar code, etc.). Extracted information can be stored in a text file and represented by, for example, one or more ASCII characters.

In certain embodiments, the currency note processing device 1300 may store extracted information in memory 1360. According to some embodiments, the processor 1390 is adapted to compare the extracted information with counterfeit information stored in memory 1360 to identify counterfeit currency notes. One non-limiting example of counterfeit information is a serial number of a known or suspected counterfeit currency note. In certain embodiments, when the extracted serial number matches, or substantially matches the serial number of a known or suspected counterfeit currency bill, the device 1300 can transport such a currency bill to a different output receptacle than the one used for non-suspect currency bills. According to some embodiments, the device comprises an operator interface configured to permit an operator to set how many characters of the extracted serial number must match with a serial number on the counterfeit list before the device off-sorts the currency bill.

In certain embodiments it is contemplated, the processor identifies counterfeit notes by comparing data from a currency note, for example, serial number, series number, plate number, etc. with data from a list containing the same or substantially similar data associated with counterfeit or suspect counterfeit notes. It is contemplated that the list of data associated with counterfeit and suspected counterfeit currency notes can be stored in a number of locations including the memory 1360, a separate memory located in the device 1300, or a separate memory located in a separate device/machine communicatively linked to the device 1300. In certain embodiments, the device 1300 is connected to a communications link to automatically or manually download an updated counterfeit and suspect counterfeit list from a remote database. It is contemplated that according to some embodiments, the device connects with the remote database in real-time. According to some embodiments, the connection to the remote database is a permanent connection and according to some embodiments, the connection is an on-demand connection. For example, according to some embodiments, the device is adapted to automatically receive real-time updated counterfeit or suspect counterfeit information, as such information becomes available. Alternatively, an operator can decide when to connect the device via the communications link to download updated counterfeit or suspect counterfeit information to a local database stored in a local memory such as a memory residing in the device 1300 and a memory coupled to the device 1300 and physically located near the device 1300. The local database may store all or part of the counterfeit data stored in the remote data based. For example, according to some embodiments, the local database stores only a list of serial numbers and their corresponding denominations associated with counterfeit bills. It is also contemplated that the comparison of serial numbers may be completed on a processor external to device 1300 that is linked to the device 1300 and a memory storing counterfeit information.

In certain embodiments, the device 1300 executes or deploys a correction routine to automatically adjust an error in the information extracted from the image or image snippet. The correction routine can be in the form of a computer code or program stored in the memory 1360. For example, when one or more digits in a serial number can not be determined with an adequate degree of confidence using an initial OCR algorithm, a correction routine may be employed to examine the image of the digit in more detail. For example, according to some embodiments, a correction routine may employ a image smoothing and/or contrast adjustment routine before applying an OCR algorithm to the image of the questioned digit(s) again. The automatic correction routine can be implemented in the background as the device 1300 processes a plurality of currency notes 1335. Alternatively, the automatic correction routine can be implemented on the demand of an operator, including after the device 1300 physically processes a plurality of currency notes 1335 (i.e., post-processing). For example, according to some embodiments, the device 1300 automatically runs a correction routine to correct errors or omissions in the desired information extracted from the image or image snippet of an imaged currency note while continuing the imaging and processing of subsequent currency notes in a stack of currency notes 1335. Alternatively, according to some embodiments, the device 1300 automatically runs a correction routine to correct errors or omissions in the desired information extracted from the image or image snippet after a plurality of currency notes 1335 are fully processed. Automatically correcting the errors after the device 1300 physically processes the plurality of currency notes 1335 allows the processor 1390 and memory 1360 to use more resources. For example, the processor 1390 will have additional processing power and memory to run additional and/or larger more complex extraction algorithms.

According to certain embodiments, the device 1300 can automatically correct an error in the desired extracted information while the device 1300 simultaneously processes the plurality of currency notes 1335. An example of error correction of extracted information can include using additional algorithms or optionally run the same extraction algorithm multiple times on the currency note image or image snippet(s) to correct errors. According to some embodiments, the controller 1350 and/or processor 1390 can be adapted to cause the transport mechanism 1320 to vary the transport speed to allow for additional time for the algorithms operating on the processor to automatically correct the errors.

According to certain embodiments, the currency note processing device 1300 can further include a buffer memory (not shown). The buffer memory may be additional memory in the memory 1360 of the device 1300. Alternatively, the buffer memory can be a separate memory unit coupled to the memory 1360. The buffer memory can be in the form of, for example, a RAM memory, a hard drive memory, or a flash memory.

The buffer memory may be coupled to the controller 1350 and/or processor 1390 such that the controller 1350 can reduce the rate the transport mechanism 1320 transports the plurality of currency notes 1335 from the input receptacle 1310 to the image scanner 1340 when the buffer memory approaches a buffer memory limit. The buffer memory limit can be a predetermined percentage of memory in the device 1300. For example, the operator or the manufacturer may set the buffer memory limit within a range of 50 to 95 percent of total memory in the device 1300. When the device 1300 processes a plurality of currency notes 1335, the device 1300 can use a substantial amount of processing power and memory. The buffer memory gives the device 1300 extra memory to use while processing the plurality of currency notes 1335 to minimize the overwriting of images and image snippets of previously processed currency notes stored in the memory 1360. Once the buffer memory limit is reached, the controller 1350 can reduce the rate of the transport mechanism 1320 from, for example, 1000 currency notes per minute to 500 currency notes per minute or even lower to allow the memory to free up and allow the device to continue to process currency notes. The rate change of the transport mechanism can occur incrementally, such as, for example, from 1,000 notes per minute to 900 notes per minute to 800 notes per minute and then back to 1,000 notes per minute once the memory becomes available. According to some embodiments, slowing down the transport mechanism gives the processor more time to finish analyzing queued images or image portions. Once the processor determines that it is done analyzing certain images or image portions, such images or image portions may be overwritten with new images or image portions. As the processor catches up with processing stored images/image portions and more memory becomes available to be overwritten with new images/image portions, the processor may cause the speed of the transport mechanism to be gradually increased until the transport mechanism again is operating at its optimal speed.

According to certain embodiments, the currency note processing device 1300 is programmed to stop the transport mechanism 1320 from transporting any of the plurality of currency notes 1335 from the input receptacle 1310 to the image scanner 1340 when the buffer memory approaches a buffer memory overrun condition. The buffer memory overrun condition can be a predetermined percentage of memory in the device 1300. For example, the operator or the manufacturer may set the buffer memory overrun condition within a range of 95 to 100 percent of total memory in the device 1300.

It is contemplated that according to certain embodiments, the currency note processing device described herein may also be a document processing device adaptable to receive a plurality of documents containing intermingled currency notes and checks. The device can be adapted to receive the plurality of intermingled documents with a wide-edge or a narrow-edge of the plurality of documents being initially fed into the document processing device (e.g. wide-edge leading or narrow-edge leading). It is contemplated that in certain embodiments, the input receptacle can be adapted to receive a portion of the plurality of intermingled currency notes and checks with the wide-edge leading and further capable of receiving other documents with the narrow-edge leading.

For example, the input receptacle can be adapted to receive a plurality of documents including currency bills and standard size checks fed with their wide-edge leading, and larger business checks fed with their narrow-edge leading. According to some embodiments, minimizing the input receptacle width to only accommodate the width of currency notes (e.g., U.S. currency bills) and consumer size checks (e.g., 2.5"×6"), as opposed to large commercial checks (e.g., 8.25"×3"), results in a smaller overall width of the device. However, these dimensions still allow the device to accept the larger business checks in a narrow-edge leading manner. Likewise, according to some embodiments, such a device is provided which has a smaller footprint given its shorter width. According to some such embodiments, the document processing device accepts currency notes and standard checks in a wide-edge leading manner and commercial checks in a narrow-edge leading manner and employs a shorter transport path associated with a wide-edge leading orientation and is contained in a device having a smaller footprint. It is contemplated that in certain embodiments the device can process intermingled currency notes and checks in the wide-edge leading manner at a rate of up to approximately 1,000 to 1,200 documents per minute, with the processing rate ranging from approximately 250 documents per minute (predominantly checks) up to 1,200 documents per minute (predominantly currency). It is also contemplated that the same device may process the larger business checks in a narrow-edge leading manner at a rate of up to 100 documents per minute.

In certain embodiments, a document processing device can identify all no-call documents. No-call documents include currency notes the device fails to properly denominate or to extract desired information (e.g., serial number), or checks the device fails to completely process (e.g., extract the amount of the check, or extract the MICR data). In certain embodiments, the document processing device is further adapted to identify and sort/separate all no-call documents from properly processed documents by placing the no-call documents in a separate output receptacle. For example, in certain embodiments, the device can identify all no-call checks and sort them into an output receptacle that is different than the output receptacle storing the other documents (including properly processed currency notes and check and no-call currency notes). According to some embodiments, separating the no-call checks from the other documents spares the operator from searching the stack of output documents to find the no-call checks when needed for further processing. In some embodiments, the document processing device may stack and/or store the processed currency notes in one output receptacle and stack and/or store the processed checks in a different output receptacle.

In certain embodiments, the image scanner can obtain an image of at least one portion of the document, also referred to as a snippet. Some non-limiting examples of snippets include, but are not limited to, an image of MICR data on a check or a portion thereof, an image of a barcode on a document (e.g., check or currency note), an image of a serial number on a currency bill, an image of any portion of a currency bill or check.

In certain embodiments, the processor and/or the image scanner executes a cropping algorithm and a deskewing algorithm to crop and deskew one or more portions of a scanned image, which results in one or more image snippets. In certain embodiments, it is contemplated that the processor denominates the currency notes by applying one or more denominating algorithms to the stored images, or image snippets in the same or similar manner as the currency note processing device 1300 described above. The processor can also denominate the currency notes by comparing the scanned image or image snippet(s) with the denomination image in the same or similar manner as described above in relation to the currency note processing device 1300. The processor can also be adapted to process the checks using an extraction algorithm. Extraction algorithms can be adapted to determine a check amount; determine a routing, a bank account, and a check number; determine a payee and/or a drawer and drawee name; and determine an endorser name and storing such extracted data in, for example, a text file.

According to certain embodiments, the image scanner generally works with the processor to extract information from either the original image, the cropped and/or deskewed image, or the image snippet(s). For currency bills, the information extracted from the document image can be the same as or similar to the information extracted from the currency bill depicted in FIG. 7a, including such information as a serial number 730a, signature 739a, denomination 750a, series 760a, back plate 770a, front plate 768a, or print code 769a. For checks, the information extracted from the document image can be routing number, bank account number, check number, check amount (e.g., numerical amount and/or written amount), payee name, drawer signature, drawee name, endorsement signature, drawer name, contact information, or memo field information.

In certain embodiments, the document processing device can store the extracted information from the image or image snippet in the memory. The processor can then compare the extracted information with information identifying a counterfeit or forged document also stored in the memory. To determine a counterfeit currency bill, the processor can compare, for example, the extracted serial number with a list of known or suspected counterfeit serial numbers. To determine a forged check, the processor can compare, for example, the extracted routing number with a list of known or suspected routing numbers connected with fraudulent activity or forgery. The processor can compare the extracted information with the lists of known or suspected counterfeit and forged documents in the same or similar manner as processor 1390 described above. If the extracted information matches, or substantially matches, for example, the serial number or routing number of a known or suspected counterfeit or forged document(s), the document processing device can transport such a document to a different output receptacle than the one used for non-suspect documents.

It is contemplated that the operator can, for example, determine how many characters of the extracted serial number must match with a serial number on the counterfeit list before the device off-sorts the currency bill into a different output receptacle. It is further contemplated that in certain embodiments, the processor can compare other extracted information from the documents with a list of the same type of information relating to known or suspected counterfeit or forged documents. For example, the processor can compare an extracted bank account number with a list of bank account numbers known or suspected to be connected with fraud or forgery.

It is contemplated that the list of known and suspected counterfeit and forged documents can be stored in a number of locations including the device's memory, in a separate memory located in the device, or in a separate memory located in a separate device/machine. In certain embodiments, the device can connect to a communications link to automatically or manually download updated lists of known and suspected counterfeit and forged documents in the same or similar manner as the device 1300 described above.

In certain embodiments, the processor can be configured to execute a correction routine that is capable of automatically adjusting an error in the information extracted from the image or image snippet. The correction routine functions in the same or similar manner as the correction routine described above in relation to the currency note procession device 1300.

It is contemplated that according to certain embodiments, the device can be configured to process checks containing a MICR code parallel to a narrow-edge or shorter side of the check. Additionally, it is contemplated that the device can be configured to process a check having a barcode, wherein the barcode is either parallel to the wide-edge or the narrow-edge of the check. The barcode can contain a variety of information, including but not limited to, routing number, account number, check number, drawer information, drawee information, etc. The processor and/or image scanner can execute one of the extraction algorithms to extract the MICR data from the image or snippet. In certain embodiments, the scanner can be configured to directly scan and retrieve the information encoded in the barcode.

According to certain embodiments, the document processing device further includes a communications link. The communications link can connect the device to a network system. The processor can be configured to compare extracted information with information on the network system. For example, the network system can contain a list of known or suspect counterfeit documents and/or known or suspected forgery documents. The documents can be identified by, for example, serial numbers for currency bills and by routing or bank account numbers for forgery documents. In certain embodiments, the device can off-sort documents matching a document on the network system list. It is contemplated that the network system can be updated in real-time.

According to some embodiments, the communications link can connect the device to a banking network. The processor can be configured to transmit the scanned images, snippets, and/or extracted information to a financial institution through the banking network, also known as the send-it-forward feature. According to certain embodiments, a bank can receive transmitted images and/or extracted information and give its customer a provisional credit for the currency bills and checks sent forward electronically over the communications link.

The send-it-forward feature also allows the bank to start processing the currency bills and/or checks before the currency bills and/or checks themselves physically arrive at the bank. Thus, banks can perform counterfeit searches of the soon to be deposited currency bills' serial numbers and determine the counterfeits, if any, before the bank receives and deposits and/or credits the customer's account. The send-it-forward feature also allows the bank to start processing the checks before the physical checks are deposited with the bank. Thus, the bank can determine any forgeries, if any, as well as determine if there are sufficient funds in the drawer's account, etc. It is contemplated that the communications link can be any type of connection that allows for electronic data transfer, for example, an internet connection, a dial-up connection, an email connection, a Wi-Fi connection, a LAN connection, an Ethernet connection, a wireless connection, a Bluetooth connection, etc.

According to certain embodiments, the communications link may connect the device with a banking network wherein the processor can be configured to transmit a deposit amount to a financial institution (e.g., a bank). The bank can receive the deposit amount electronically through the communications link and store the deposit amount along with customer identifying information. Once the bank receives the plurality of physical documents from the customer, the bank can process the documents in a similar document processing device. The bank's document processing device can calculate the deposit amount and compare the bank's calculated deposit amount with the stored deposit amount sent via the communications link by the customer. If the deposit amounts of the customer and the bank match, then the device can display the deposit amount to the teller. If the deposit amounts do not match, then the deposit amount is not revealed to the teller and a message may be sent to the bank manager, the customer, or both. This embodiment is also known as blind balancing. Blind balancing deposits provides banks and bank customers with a desired fraud prevention mechanism that prevents tellers from embezzling/stealing any amount actually deposited over the customer's declared/calculated deposit amount. Blind balancing is advantageous because, for example, often a customer will think it is depositing one amount and disclose that amount to a bank (i.e., $10,000), but when the teller processes the documents the deposit amount may turnout to be greater than the amount the customer calculated. Thus, without blind balancing, a dishonest teller may easily steal the difference without raising much suspicion.

According to certain embodiments, the document processing device or system may further comprise a printer. The printer can be coupled to the document processing device to allow a user to print a receipt that documents the transaction (e.g. deposit of cash or checks). For example, in a document processing device embodied in an automated teller machine ("ATM"), a user may deposit several documents including checks and currency bills. The device can be configured to scan the documents and provide the user with an option to print a copy of the images scanned/deposited. The user may customize the printed receipt by selecting to print images of only the checks, only the currency bill serial numbers, or any combination. It is contemplated that in certain embodiments, the system comprises an interface configured to permit a user to print a receipt containing any combination of images, image snippets, and extracted information from the currency bills and/or checks.

In certain embodiments, a free standing document processing device includes a printer. According to some embodiments, the device is configured to allow a user to print a log of extracted information. The log can be a list of the serial numbers of currency bills processed, of the check routing and account numbers processed, or other information extracted from the documents.

While the present invention has been described with reference to one or more particular embodiments, those skilled in the art will recognize that many changes may be made thereto without departing from the spirit and scope of the present invention. Each of these embodiments and variations thereof is contemplated as falling within the spirit and scope of the claimed invention, which is set forth in the claims following the disclosure. By way of example, the following embodiments are illustrative examples of the present disclosure.

Alternative Embodiment A

A document processing device includes an input receptacle configured to receive a plurality of documents, an image scanner configured to obtain a document image of at least a portion of one side of each of the plurality of documents, the scanner further being configured to extract information from the document image. A transport mechanism is configured to transport each of the plurality of documents one at a time from the input receptacle passed the image scanner and to an output receptacle. A controller is coupled to the transport mechanism and to the image scanner. The controller is configured to at least partially control the transport mechanism and the image scanner. A memory is coupled to at least one of the controller and the image scanner. The memory is configured to store at least one of information extracted from the document image and master information identifying at least one of counterfeit and forged documents. A processor is coupled to the memory. The processor is configured to compare the information extracted from the document image with master information stored in the memory. The master information identifies at least one of counterfeit and forged documents. The processor is further configured to identify at least one of a suspected counterfeit and forged document based on the comparison operation. The document processing device continuously transports documents during the comparison and identification operations, and the information extracted from the document image at least partially contains character information obtained from a predetermined field of the document image. The processor contains a search routine configured to search the character information.

Alternative Embodiment B

The device of embodiment A can also include the input receptacle having a single receptacle configured to receive intermingled currency bills and checks.

Alternative Embodiment C

The device of embodiment B can also include the input receptacle being configured to receive currency bills and checks intermingled in a single stack of documents, with the input receptacle further being configured to transfer the currency bills into the transport mechanism in a direction perpendicular to a wider edge of said currency bill and to transfer the checks into the transport mechanism perpendicular to at least one of a wider edge and a narrower edge of the check.

Alternative Embodiment D

The device of embodiment A can also include the image scanner having a depth of field of approximately 0.060 inches.

Alternative Embodiment E

The device of embodiment A can also include the image scanner being capable of simultaneously scanning a front side and a back side of the documents.

Alternative Embodiment F

The device of embodiment A can also include the transport mechanism being configured to transport the documents at a rate varying between 0 and 100 inches per second.

Alternative Embodiment G

The device of embodiment F can also include a luminance control technique that is initiated for the image scanner when the transport mechanism is transporting documents at a non-constant rate.

Alternative Embodiment H

The device of embodiment F can also include an image processing technique that is initiated for the image scanner when the transport mechanism is transporting documents at a non-constant rate.

Alternative Embodiment I

The device of embodiment A can also include the transport mechanism being configured to transport the documents at a rate of up to 1,000 documents per minute.

Alternative Embodiment J

The device of embodiment A can also include the transport mechanism being further configured to transport intermingled currency bills and checks, with the currency bills and checks being transported in a direction perpendicular to the wider edge of the currency bills and the checks.

Alternative Embodiment K

The device of embodiment A can further include an evaluation unit configured to determine currency denomination using information extracted from a predetermined field of the document image.

Alternative Embodiment L

The device of embodiment A can also include the image scanner being further configured to locate a field in the document image and further configured to extract characters from the field as information to be associated with the document.

Alternative Embodiment M

The device of embodiment A can also include that at least one of the image scanner and the processor contains a correction routine configured to adjust an error in extracted information from the document image.

Alternative Embodiment N

The device of embodiment M can also that the correction routine allows adjustment of the error by manual input into an input device.

Alternative Embodiment O

The device of embodiment M can also include that the processor operates remotely from the image scanner.

Alternative Embodiment P

The device of embodiment M can also include that the correction routine allows for adjustment of the error automatically.

Alternative Embodiment Q

The device of embodiment P can also include that the automatic adjustment of the error occurs after the device finishes transporting the plurality of documents, with the correction routine being capable of using additional algorithms.

Alternative Embodiment R

The device of embodiment L can also include that the image scanner employs optical character recognition to extract characters from a field and wherein at least one of the image scanner and the processor contains a correction routine configured to adjust an error in optically-recognized extracted characters, wherein the correction routine comprises an image enhancement routine configured to process a document image followed by an extraction of characters from the document image.

Alternative Embodiment S

The device of embodiment A can also include that the character information extracted from the documents includes serial numbers and the search routine is configured to search for partial serial numbers.

Alternative Embodiment T

A document processing system includes a plurality of document scanning devices that extract information from document images, and a central processor remotely connected to the document scanning devices. The central processor is configured to receive the document images and the extracted information from the document scanning devices and is further configured to employ a correction routine configured to adjust an error in the extracted information from the document image.

Alternative Embodiment U

A currency note processing device includes at least one input receptacle configured to receive a plurality of currency notes, an image scanner configured to obtain at least a partial image of at least one side of each of the plurality of currency notes, and a transport mechanism configured to transport each of the plurality of currency notes one at a time from the input receptacle to the image scanner and from the image scanner to an output receptacle. A controller is coupled to the transport mechanism and to the image scanner, the controller being configured to at least partially control the transport mechanism and the image scanner. A memory is coupled to the image scanner, the memory being configured to store the at least partial image of each of the plurality of currency notes. A processor is coupled to the memory, the processor configured to denominate the plurality of currency notes by applying a denominating algorithm to the stored at least partial image of each of the plurality of currency notes.

Alternative Embodiment V

The currency note processing device of embodiment U can also include that the input receptacle is configured to receive currency notes and transfer the currency notes into the transport mechanism in a direction perpendicular to a wider edge of the currency notes at a rate up to 1000 currency notes per minute.

Alternative Embodiment W

The currency note processing device of embodiment U can also include that the image scanner is further configured to extract information from the image of each of the plurality of currency notes.

Alternative Embodiment X

The currency note processing device of embodiment W can also include that the extracted information uniquely identifies each of the plurality of currency notes.

Alternative Embodiment Y

The currency note processing device of embodiment W can also include that the extracted information is at least one of a serial number, a signature, a denomination, a series, a back plate, a front plate, and a print code.

Alternative Embodiment Z

The currency note processing device of embodiment U can also include that the image scanner further includes an optical character recognition capability to locate a field in the document image and to extract characters from the field as information to be associated with the currency note.

Alternative Embodiment AA

The currency note processing device of embodiment U can also include that the processor is further configured to denominate the plurality of currency notes by comparing the stored at least partial image with a denominating image.

Alternative Embodiment AB

The currency note processing device of embodiment W can also include that the memory is configured to store one of extracted information from the image of each of the plurality of currency notes and master information identifying counterfeit currency notes.

Alternative Embodiment AC

The currency note processing device of embodiment AB can also include that the processor is configured to compare the extracted information with the master information identifying the counterfeit currency notes. The processor can be further configured to identify at least one of a suspected counterfeit currency note based on the comparison operation.

Alternative Embodiment AD

The currency note processing device of embodiment W can also include that at least one of the image scanner and the processor contains a correction routine capable of automatically adjusting an error in the extracted information from an image.

Alternative Embodiment AE

The currency note processing device of embodiment AD can also include that the automatic adjustment of the error occurs at least partially after the device processes the plurality of currency notes using an additional algorithm.

Alternative Embodiment AF

The currency note processing device of embodiment U can further include a buffer memory coupled to the memory and coupled to the controller, wherein the controller reduces the rate the transport mechanism transports the currency notes from the input receptacle to the image scanner when the buffer memory approaches a predetermined buffer limit.

Alternative Embodiment AG

The currency note processing device of embodiment AF can also include that the controller stops the transport mechanism from transporting the currency notes when the buffer memory approaches a buffer overrun condition.

Alternative Embodiment AH

The currency note processing device of embodiment U can also include that at least one of the image scanner and the processor applies a deskewing algorithm for deskewing the partial image of at least one side of each of the plurality of currency notes.

Alternative Embodiment AI

The currency note processing device of embodiment U can also include that the image of at least one side of each of the plurality of currency notes is an image of an entire currency note, the processor being configured to apply a cropping algorithm to crop a portion of the image of an entire currency note.

Alternative Embodiment AJ

The currency note processing device of embodiment AI can also include that the processor is configured to apply a deskewing algorithm for deskewing the cropped portion of the image.

Alternative Embodiment AK

The currency note processing device of embodiment AJ can also include that the processor is configured to apply a denominating algorithm to the cropped and the deskewed portion of the image to denominate the currency note.

Alternative Embodiment AL

The currency note processing device of embodiment AI can also include that the processor is configured to apply an extraction algorithm to the cropped and the deskewed image to extract information from the image.

Alternative Embodiment AM

The currency note processing device of embodiment AL can also include that the extracted information includes a serial number associated with a currency note.

Alternative Embodiment AN

A document processing device includes an input receptacle configured to receive a plurality of documents, an image scanner configured to obtain a document image of at least a portion of at least one side of each of the plurality of documents with the scanner further being configured to extract information from the document image of each document, and a transport mechanism configured to transport each of the plurality of documents one at a time from the input receptacle to the image scanner and from the image scanner to an output receptacle. A controller is coupled to the transport mechanism and to the image scanner, the controller configured to at least partially control the transport mechanism and the image scanner. A memory is coupled to at least one of the controller and the image scanner, the memory being configured to store the extracted information from the document image. A processor is coupled to the memory, the processor configured to execute a correction routine that applies a first algorithm for automatically adjusting errors identified in the extracted information.

Alternative Embodiment AO

The document processing device of embodiment AN can also include that the input receptacle is a single input receptacle configured to receive intermingled currency notes and checks.

Alternative Embodiment AP

The document processing device of embodiment AO can also include that the transport mechanism is configured to transport the intermingled currency notes and the checks at a rate of up to 1,000 documents per minute. The currency notes and the checks are in a direction perpendicular to a wider edge of the currency notes and the checks and the device is further configured to transport the checks in a direction perpendicular to a narrower edge of the checks at a rate of about 50-100 documents per minute.

Alternative Embodiment AQ

The document processing device of embodiment AO can also include that at least one of the document images includes an image of at least a portion of a MICR code.

Alternative Embodiment AR

The document processing device of embodiment AQ can also include that the image scanner extracts information from the MICR code image.

Alternative Embodiment AS

The document processing device of embodiment AO can also include that the check contains a MICR code parallel to a narrower edge of the check. The image scanner is further configured to extract information from the MICR code parallel to the narrower edge of the check.

Alternative Embodiment AT

The document processing device of embodiment AO can also include that the check contains a barcode parallel to at least one of a wider edge of the check and a narrower edge of the check. The image scanner is further configured to extract information from the barcode.

Alternative Embodiment AU

The document processing device of embodiment AU can also include that the memory is further configured to store a denominating image. The processor is further configured to compare the extracted information with the denominating image for denominating the currency notes.

Alternative Embodiment AV

The document processing device of embodiment AO can also include that the document image is an image of an entire document, and the processor crops and deskews a portion of the document image.

Alternative Embodiment AW

The document processing device of embodiment AV can also include that the processor executes a cropping algorithm and a deskewing algorithm to crop and deskew the document image.

Alternative Embodiment AX

The document processing device of embodiment AV can also include that the processor applies an algorithm to the cropped and the deskewed document image to denominate the currency notes.

Alternative Embodiment AY

The document processing device of embodiment AX can also include that the algorithm is a denominating algorithm.

Alternative Embodiment AZ

The document processing device of embodiment AX can also include that the algorithm calculates a predetermined number of average luminance samples of pixels within the cropped and deskewed image.

Alternative Embodiment BA

The document processing device of embodiment AZ can also include that the processor compares the average luminance samples with at least one master characteristic pattern to denominate the currency notes.

Alternative Embodiment BB

The document processing device of embodiment AV can also include that the processor applies an algorithm to the cropped and the deskewed portion of the side of the plurality of documents to extract information from the image.

Alternative Embodiment BC

The document processing device of embodiment AN can also include that the processor operates remotely to the image scanner.

Alternative Embodiment BD

The document processing device of embodiment AN can also include that the image scanner is configured to locate a field within the document image and to extract characters from the field as information to be associated with a corresponding document.

Alternative Embodiment BE

The document processing device of embodiment AN can also include that the automatic adjusting of the error occurs at least partially after the device processes the plurality of documents using an additional algorithm.

Alternative Embodiment BF

The document processing device of embodiment AN can also include that the transport mechanism transports the documents having an error that cannot be automatically corrected to a separate output receptacle.

Alternative Embodiment BG

The document processing device of embodiment AN can also include that at least one of the image scanner and the processor deskews the portion of at least one side of each of the plurality of documents.

Alternative Embodiment BH

The document processing device of embodiment AN can also further include a buffer memory coupled to the memory and coupled to the controller, wherein the controller is configured to reduce the rate the transport mechanism transports the currency notes from the input receptacle to the image scanner when the buffer memory approaches a predetermined buffer limit.

Alternative Embodiment BI

The document processing device of embodiment BH can also include that the controller is configured to stop the transport mechanism from transporting the currency notes when the buffer memory approaches a buffer overrun condition.

Alternative Embodiment BJ

The document processing device of embodiment AN can further include a communications link between the document processing device and a network system, wherein the processor is further configured to compare the extracted information with information on the network system.

Alternative Embodiment BK

The document processing device of embodiment BJ can also include that the information on the network system is a suspect list of at least one of known counterfeit documents and known forgery documents.

Alternative Embodiment BL

The document processing device of embodiment BK can also include that the controller is configured to cause the transport mechanism to transport documents matching at least one of the known counterfeits and the known forgery documents to a separate output receptacle.

Alternative Embodiment BM

The document processing device of embodiment AN can further include a communications link between the document processing device and a banking network, wherein the processor is further configured to transmit at least one of the extracted information and the document image to a financial institution over the banking network.

Alternative Embodiment BN

The document processing device of embodiment BM can also include that the processor is configured to transmit at least one of the document images and the extracted information to a bank for at least one of processing the checks, denominating the currency notes, comparing the currency notes to known counterfeits, and comparing the checks to known forgeries.

Alternative Embodiment BO

The document processing device of embodiment BM can also include that the processor is configured to transmit at least one of the document images and the extracted information to a bank for a provisional credit to a customer account.

Alternative Embodiment BP

The document processing device of embodiment BM can also include that the processor is configured to transmit a deposit amount for the plurality of documents to a banking device to allow a financial institution to perform a blind balancing of the plurality of documents.

Alternative Embodiment BQ

The document processing device of embodiment BP can also include that the blind balancing includes displaying the deposit amount of the plurality of documents only if the plurality of documents balances with the deposit amount transmitted to the banking device.

Alternative Embodiment BR

The document processing device of embodiment AN can further include a printer for printing at least one of a portion of the document image and a portion of the extracted information.

Alternative Embodiment BS

The document processing device of embodiment BR can also include that the document processing device is an automated banking machine configured to print a receipt including at least one of a portion of the extracted information and a portion of the document image.

Alternative Embodiment BT

The document processing device of embodiment BS can also include that the receipt further includes customer identifying information.

Alternative Embodiment BU

The document processing device of embodiment BS can also include that the automated banking machine is an automated teller machine.

Alternative Embodiment BV

A document processing method includes receiving a plurality of documents in an input receptacle, obtaining a document image of at least a portion of one side of each of the plurality of documents, extracting information from the document image, transporting each of the plurality of documents one at a time from the input receptacle to an output receptacle, storing at least one of information extracted from the document image and master information identifying at least one of counterfeit and forged documents, identifying suspect documents by comparing the information extracted from the document image with the master information identifying at least one of counterfeit and forged documents, and searching the information extracted from the document image for character data extracted from a predetermined field of the document image.

Alternative Embodiment BW

The document processing method of embodiment BV can also include that the plurality of documents are continuously transported one at a time from the input receptacle to the output receptacle.

Alternative Embodiment BX

A currency note processing method includes the acts of receiving a plurality of documents in at least one input receptacle, obtaining at least a partial image of at least one side of each of the plurality of currency notes, transporting each of the plurality of currency notes one at a time from the input receptacle to an output receptacle, storing the at least partial image, and denominating the plurality of currency notes using the stored at least partial image.

Alternative Embodiment BY

A document processing method includes the acts of receiving a plurality of documents in an input receptacle, obtaining a document image of at least a portion of at least one side of each of the plurality of documents, extracting information from the document image, transporting each of the plurality of documents one at a time from the input receptacle to an output receptacle, storing the information extracted from the document image, and automatically correcting errors in the information extracted from the document image.

Alternative Embodiment BZ

A computer-readable medium is encoded with instructions for processing a plurality of documents in a document processing system. The instructions include extracting information from a document image obtained from at least a portion of one side of each of the plurality of documents, controlling a transport mechanism that transports each of the plurality of documents one at a time along a transport path from an input receptacle to an output receptacle, controlling an image scanner located along the transport path between the input receptacle and the output receptacle where the image scanner is configured to obtain the document image, identifying suspect documents by comparing the information extracted from the document image with master information identifying at least one of counterfeit and forged documents, and searching the extracted information for character data obtained from a predetermined field of the document image.

Alternative Embodiment CA

A computer-readable medium is associated with a document processing system. The computer-readable medium is encoded with instructions for processing a plurality of currency notes. The instructions include extracting information from at least a partial image of at least one side of each of the plurality of currency notes, controlling a transport mechanism and an image scanner where the transport mechanism transports each of the plurality of currency notes one at a time from an input receptacle to an output receptacle and the image scanner is used to obtain the currency note image, and denominating the plurality of currency notes using the at least partial image.

Alternative Embodiment CB

A computer-readable medium is associated with a document processing system. The computer-readable medium is encoded with instructions for processing a plurality of documents. The instructions include extracting information from a document image obtained from at least a portion of at least one side of each of the plurality of documents, controlling a transport mechanism that transports each of the plurality of documents one at a time along a transport path from an input receptacle to an output receptacle, controlling an image scanner located along the transport path between the input receptacle and the output receptacle where the image scanner is configured to obtain the document image, and automatically correcting errors identified in the information extracted from the document image.

What is claimed is:

1. A document processing system, comprising:
   an input receptacle configured to receive a plurality of documents associated with a deposit transaction, the plurality of documents including currency bills;
   an image scanner configured to obtain a document image of at least a portion of at least one side of each of the plurality of documents;
   a transport mechanism configured to transport each of the plurality of documents one at a time from the input receptacle past the image scanner and to at least one output receptacle;
   a memory coupled to the image scanner and being configured to store the document image of each of the documents; and
   a processor configured to:
   (1) denominate each of the currency bills,
   (2) calculate a bank deposit amount for the received plurality of documents associated with the deposit transaction,
   (3) perform a blind balancing of the received plurality of documents associated with the deposit transaction by comparing the calculated bank deposit amount with a customer deposit amount received by the document processing system for the deposit transaction such that the customer deposit amount is not displayed when the calculated bank deposit amount does not balance with the received customer deposit amount, and
   (4) display an indication for a balanced deposit amount only in response to the calculated bank deposit amount balancing with the received customer deposit amount.

2. The document processing system of claim 1, wherein the customer deposit amount received by the document processing system is associated with a prior provisional credit.

3. The document processing system of claim 1, wherein the processor is further configured to cause a credit to be credited to a customer account associated with the deposit transaction.

4. The document processing system of claim 1, wherein the document processing system has a foot print of less than 2 square feet and wherein the document processing system weighs less than 35 pounds.

5. The document processing system of claim 1, wherein the image scanner is configured to obtain a document image of a currency bill at approximately 100 dots per inch while the transport mechanism transports the currency bills at the rate of about 1000 documents per minute.

6. The document processing system of claim 1, wherein the transport mechanism is configured to transport each of the plurality of documents in a wide-edge leading manner at a rate of approximately 450 documents per minute and wherein the image scanner is configured to obtain a document image of a currency bill at approximately 200 dots per inch while the transport mechanism transports the currency bills at the rate of about 450 documents per minute.

7. The document processing system of claim 1, wherein the image scanner is configured to obtain a document image of a currency bill having at least approximately 100 dots per inch while the transport mechanism transports the currency bills at the rate of at least about 450 documents per minute.

8. The document processing system of claim 1, wherein the plurality of documents further includes checks; the image scanner further being configured to extract information from the document image of each of the documents; wherein the memory is further configured to store the document image of each of the documents, the information extracted from each of the document images, or both; wherein the processor is further configured to extract an amount of each of the checks; wherein the received customer deposit amount is received by the document processing system via a communications link coupled to the document processing system; and the processor being further configured to send a message in response to the calculated bank deposit amount not balancing with the received customer deposit amount.

9. The document processing system of claim 1, wherein the plurality of documents further includes checks; the image scanner further being configured to extract information from the document image of each of the documents; wherein the memory is further configured to store the document image of each of the documents, the information extracted from each of the document images, or both; wherein the processor is further configured to extract an amount of each of the checks; wherein the received customer deposit amount is received by the document processing system via a communications link coupled to the document processing system.

10. The document processing system of claim 1, wherein the processor is further configured to send a message in response to the calculated bank deposit amount not balancing with the received customer deposit amount.

11. The document processing system of claim 10, wherein the document processing system is configured to send the message to a bank manager, a customer associated with the deposit transaction, or both.

12. The document processing system of claim 1, wherein the received customer deposit amount is received by the document processing system via a communications link coupled to the document processing system.

13. The document processing system of claim 1, wherein the plurality of documents further includes checks.

14. The document processing system of claim 13, wherein the processor is further configured to extract an amount of each of the checks.

15. The document processing system of claim 1, wherein the image scanner is further configured to extract information from the document image of each of the documents.

16. The document processing system of claim 15, wherein the memory is further configured to store the information extracted from each of the document images.

17. The document processing system of claim 15, wherein the information extracted for each currency bill includes a serial number, a signature, a denomination, a series, a back plate, a front plate, a print code, or any combination thereof.

18. The document processing system of claim 15, wherein the information extracted for each currency bill includes a serial number and a denomination.

19. The document processing system of claim 15, wherein the plurality of documents includes checks and the information extracted for each check includes a routing number, a bank account number, a check number, a check amount, a payee name, a drawer signature, a drawee name, an endorsement signature, a drawer name, contact information, memo field information, or any combination thereof.

20. The document processing system of claim 15, wherein the plurality of documents includes checks and the information extracted for each check includes a routing number, a bank account number, a check number, or any combination thereof.

21. The document processing system of claim 15, wherein the currency bills are U.S. currency bills and the transport mechanism is configured to transport the U.S. currency bills, the image scanner is configured to obtain the document images of the U.S. currency bills, and the image scanner is configured to extract the information at a rate in excess of 1000 documents per minute.

22. The document processing system of claim 15, wherein the documents further include checks and the currency bills are U.S. currency bills, and wherein the transport mechanism is configured to transport the checks and the U.S. currency bills, the image scanner is configured to obtain the document images of the checks and the U.S. currency bills, and the image scanner is configured to extract the information at a rate in excess of 1000 documents per minute.

23. The document processing system of claim 1, wherein the document processing system is configured to store the received customer deposit amount along with customer identifying information for use in the blind balancing of the deposit transaction.

24. The document processing system of claim 1, wherein the plurality of documents includes currency bills and checks and wherein the input receptacle is a single receptacle configured to receive intermingled currency bills and checks.

25. The document processing system of claim 1, wherein the input receptacle is configured to receive currency bills and checks, the transport mechanism being configured to transport the currency bills in a direction perpendicular to a wider edge of said currency bills and to transport the checks in a direction perpendicular to at least one of a wider edge and a narrower edge of said checks.

26. The document processing system of claim 1, wherein the transport mechanism is configured to transport the documents at a rate varying between 0 inches and 100 inches per second.

27. The document processing system of claim 1, wherein the transport mechanism is configured to transport the documents and the image scanner is configured to obtain the document images at a rate between about 300 and about 400 documents per minute.

28. The document processing system of claim 1, wherein the transport mechanism is configured to transport the documents and the image scanner is configured to obtain the document images at a rate in excess of 600 documents per minute.

29. The document processing system of claim 1, wherein the transport mechanism is configured to transport the documents and the image scanner is configured to obtain the document images at a rate in excess of 800 documents per minute.

30. The document processing system of claim 1, wherein the transport mechanism is configured to transport the documents and the image scanner is configured to obtain the document images at a rate in excess of 1000 documents per minute.

31. The document processing system of claim 30, wherein the image scanner has a depth of field of approximately 0.060 inches (0.15 centimeters).

32. The document processing system of claim 30, wherein the image scanner is capable of simultaneously scanning a front side and a back side of each of the documents.

33. The document processing system of claim 1, wherein the currency bills are U.S. currency bills and the transport mechanism is configured to transport the U.S. currency bills and the image scanner is configured to obtain the document images of the front and back of each of the U.S. currency bills at a rate of 1000 documents per minute.

34. The document processing system of claim 1, wherein the currency bills are U.S. currency bills and the transport mechanism is configured to transport the U.S. currency bills and the image scanner is configured to obtain the document images of the U.S. currency bills at a rate in excess of 1000 documents per minute.

35. The document processing system of claim 1, wherein the transport mechanism is configured to transport the documents and the image scanner is configured to obtain the document images at a rate in excess of 1200 documents per minute.

36. The document processing system of claim 1, wherein the transport mechanism is configured to transport the documents at a rate in excess of 1500 documents per minute.

37. The document processing system of claim 1, wherein the image scanner is configured to initiate an image processing technique when the transport mechanism is transporting documents at a non-constant rate.

38. The document processing system of claim 37, wherein the image processing technique adjusts the brightness of a light source of the image scanner based on fluctuations in the transport speed of the transport mechanism.

39. The processing system of claim 1, wherein the display of the indication for the balanced deposit amount comprises displaying the balanced deposit amount on a display.

40. A method of processing documents using a document processing system, the method comprising the acts of:
receiving a plurality of documents associated with a deposit transaction in an input receptacle of the document processing system, the plurality of documents including currency bills;
transporting each of the plurality of documents one at a time from the input receptacle to an output receptacle;
imaging, via an image scanner of the document processing system, at least a portion of at least one side of each of the plurality of documents to obtain a document image for each of the documents;
storing the document images of each of the documents in a memory coupled to the image scanner;
determining a value associated with each of the documents;
receiving a customer deposit amount associated with the deposit transaction;
calculating a bank deposit amount based on the determined value associated with each of the documents;
comparing the calculated bank deposit amount with the received customer deposit amount to perform a blind balancing of the plurality of documents such that the customer deposit amount is not displayed when the calculated bank deposit amount does not match the received customer deposit amount; and
displaying, via a display device, an indication for a balanced deposit amount only in response to the calculated bank deposit amount matching the received customer deposit amount.

41. The method of claim 40, wherein the customer deposit amount received by the document processing system is associated with a prior provisional credit.

42. The method of claim 40, further comprising the act of crediting a customer account associated with the deposit transaction.

43. The method of claim 40, wherein the document processing system has a foot print of less than 2 square feet and wherein the document processing system weighs less than 35 pounds.

44. The method of claim 40, wherein the act of transporting includes transporting each of the plurality of documents in a wide-edge leading manner at a rate of about 1000 documents per minute and wherein the act of imaging includes imaging the currency bills at approximately 100 dots per inch.

45. The method of claim 40, wherein the act of transporting includes transporting each of the plurality of documents in a wide-edge leading manner at a rate of about 450 documents per minute and wherein the act of imaging includes imaging the currency bills at approximately 200 dots per inch.

46. The method of claim 40, wherein the act of transporting includes transporting each of the plurality of documents in a wide-edge leading manner at a rate of at least about 450 documents per minute and wherein the act of imaging includes obtaining currency bill images having at least approximately 100 dots per inch.

47. The method of claim 40, wherein the plurality of documents further includes checks; the method further comprising the act of extracting information from the document image of each of the documents; wherein the act of storing further comprises storing in the memory the document image of each of the documents, the information extracted from each of the document images, or both; the method further comprising the act of extracting an amount of each of the checks; and wherein the act of receiving further comprises receiving the customer deposit amount associated with the deposit transaction via a communications link coupled to the document processing system.

48. The method of claim 47, further comprising the act of sending a message in response to the calculated bank deposit amount not matching the received customer deposit amount.

49. The method of claim 48, wherein the message is sent to a bank manager, a customer associated with the deposit transaction, or both.

50. The method of claim 40, wherein the act of receiving comprises receiving the customer deposit amount associated with the deposit transaction via a communications link.

51. The method of claim 40, wherein the plurality of documents further includes checks and wherein the act of receiving comprises receiving currency bills and checks associated with a deposit transaction.

52. The method of claim 51, wherein the act of determining a value includes extracting an amount of each of the checks.

53. The method of claim 40, further comprising the act of extracting information from the document image of each of the documents.

54. The method of claim 53, wherein the act of storing includes storing the information extracted from each of the document images.

55. The method of claim 53, wherein the act of extracting comprises extracting for each currency bill a serial number, a signature, a denomination, a series, a back plate, a front plate, a print code, or any combination thereof.

56. The method of claim 53, wherein the plurality of documents includes checks and the act of extracting comprises extracting for each check a routing number, a bank account number, a check number, a check amount, a payee name, a drawer signature, a drawee name, an endorsement signature, a drawer name, contact information, memo field information, or any combination thereof.

57. The method of claim 53, wherein the act of extracting comprises extracting for each currency bill a serial number, a denomination, or both.

58. The method of claim 53, wherein the plurality of documents includes checks and the act of extracting comprises extracting for each check a routing number, a bank account number, a check number, or any combination thereof.

59. The method of claim 53, wherein the currency bills are U.S. currency bills, and wherein the act of transporting includes transporting the U.S. currency bills at a rate in excess of 1000 documents per minute, the act of imaging includes imaging the U.S. currency bills at a rate of 1000 documents per minute, and the act of extracting includes extracting the information at a rate in excess of 1000 documents per minute.

60. The method of claim 53, wherein the documents further include checks and the currency bills are U.S. currency bills, and wherein the act of transporting includes transporting the checks and the U.S. currency bills at a rate in excess of 1000 documents per minute, the act of imaging includes imaging the checks and the U.S. currency bills at a rate of 1000 documents per minute, and the act of extracting includes extracting the information at a rate in excess of 1000 documents per minute.

61. The method of claim 40, further comprising the act of storing the received customer deposit amount along with customer identifying information for use in the blind balancing of the deposit transaction.

62. The method of claim 40, wherein the plurality of documents includes currency bills and checks and wherein the act of receiving includes receiving intermingled currency bills and checks.

63. The method of claim 40, wherein the act of transporting includes transporting the documents in a direction perpendicular to a wider edge of the documents.

64. The method of claim 40, wherein the act of transporting includes transporting the documents at a rate varying between 0 inches and 100 inches per second.

65. The method of claim 40, wherein the act of transporting includes transporting the documents at a rate between about 300 and about 400 documents per minute and the act of imaging includes imaging the documents at a rate between about 300 and about 400 documents per minute.

66. The method of claim 40, wherein the act of transporting includes transporting the documents at a rate in excess of 600 documents per minute and the act of imaging includes imaging the documents at a rate in excess of 600 documents per minute.

67. The method of claim 40, wherein the act of transporting includes transporting the documents at a rate in excess of 800 documents per minute and the act of imaging includes imaging the documents at a rate in excess of 800 documents per minute.

68. The method of claim 40, wherein the act of transporting includes transporting the documents at a rate in excess of 1000 documents per minute and the act of imaging includes imaging the documents at a rate in excess of 1000 documents per minute.

69. The method of claim 40, wherein the currency bills are U.S. currency bills and the act of transporting includes transporting the U.S. currency bills at a rate in excess of 1000 documents per minute and the act of imaging includes imaging the front and back of each of the U.S. currency bills at a rate of 1000 documents per minute.

70. The method of claim 40, wherein the currency bills are U.S. currency bills and the act of transporting includes transporting the U.S. currency bills at a rate in excess of 1000 documents per minute and the act of imaging includes imaging the U.S. currency bills at a rate of 1000 documents per minute.

71. The method of claim 40, wherein the act of transporting includes transporting the documents at a rate in excess of 1200 documents per minute and the act of imaging includes imaging the documents at a rate in excess of 1200 documents per minute.

72. The method of claim 40, wherein the act of transporting includes transporting the documents at a rate in excess of 1500 documents per minute.

73. The method of claim 40, wherein the act of displaying the indication for the balanced deposit amount comprises displaying the balanced deposit amount.

74. A method of processing documents using a document processing system, the method comprising the acts of:
receiving a plurality of documents associated with a deposit transaction in an input receptacle of the document processing system, the documents at least including currency bills;
transporting each of the documents one at a time from the input receptacle to at least one output receptacle;
imaging, via an image scanner of the document processing system, at least a portion of at least one side of each of the documents to obtain at least one document image for each of the documents;
storing the at least one document image of each of the documents in a memory coupled to the image scanner;
determining, using the stored document images, a value associated with each of the documents;
receiving a customer deposit amount associated with the deposit transaction;
calculating a bank deposit amount based on the determined value associated with each of the documents;
comparing the calculated bank deposit amount with the received customer deposit amount to perform a blind balancing of the plurality of documents such that at least one of the deposit amounts is not displayed when the calculated bank deposit amount does not match the received customer deposit amount; and
only in response to the calculated bank deposit amount balancing with the received customer deposit amount, displaying on a display a value equal to the received customer deposit amount.

75. The method of claim 74, further comprising sending a message in response to the calculated bank deposit amount not matching the received customer deposit amount.

76. The method of claim 75, further comprising sending the message to a bank manager, a customer associated with the deposit transaction, or both.

77. The method of claim 74, wherein the customer deposit amount received by the document processing system is associated with a prior provisional credit.

78. The method of claim 74, further comprising the act of crediting a customer account associated with the deposit transaction.

79. The method of claim 74, wherein the document processing system has a foot print of less than 2 square feet and wherein the document processing system weighs less than 35 pounds.

80. The method of claim 74, wherein the act of transporting includes transporting each of the documents in a wide-edge leading manner at a rate of about 1000 documents per minute and wherein the act of imaging includes imaging the currency bills at approximately 100 dots per inch.

81. The method of claim 74, wherein the act of transporting includes transporting each of the documents in a wide-edge leading manner at a rate of about 450 documents per minute and wherein the act of imaging includes imaging the currency bills at approximately 200 dots per inch.

82. The method of claim 74, wherein the act of transporting includes transporting each of the plurality of documents in a wide-edge leading manner at a rate of at least about 450 documents per minute and wherein the act of imaging includes obtaining currency bill images having at least approximately 100 dots per inch.

83. A U.S. currency bill processing system, comprising:
an input receptacle configured to receive a plurality of U.S. currency bills associated with a deposit transaction;
an image scanner configured to obtain a U.S. currency bill image of at least a portion of at least one side of each of the U.S. currency bills;
a transport mechanism configured to transport each of the plurality of U.S. currency bills one at a time from the input receptacle past the image scanner and to at least one output receptacle;
a memory coupled to the image scanner and being configured to store the U.S. currency bill image of each of the U.S. currency bills; and
a processor configured to:
(1) denominate each of the U.S. currency bills,
(2) calculate a bank deposit amount for the plurality of U.S. currency bills associated with the deposit transaction,
(3) perform a blind balancing of the plurality of U.S. currency bills associated with the deposit transaction by comparing the calculated bank deposit amount with a customer deposit amount received by the currency bill processing system for the deposit transaction such that the customer deposit amount is not displayed when the calculated bank deposit amount does not match the customer deposit amount, and
(4) cause a value equal to the calculated deposit amount to be displayed on a display of the currency bill processing system only in response to the calculated bank deposit amount matching with the received customer deposit amount.

84. The document currency bill processing system of claim 83, wherein the customer deposit amount received by the currency bill processing system is associated with a prior provisional credit.

85. The currency bill processing system of claim 83, wherein the currency bill processing system has a foot print of less than 2 square feet and wherein the currency bill processing system weighs less than 35 pounds.

86. The currency bill processing system of claim 83, wherein the image scanner is configured to obtain a U.S. currency bill image having at least approximately 100 dots per inch while the transport mechanism transports the U.S. currency bills at the rate of at least approximately 450 U.S. currency bills per minute.

87. The currency bill processing system of claim 83, wherein the processor is further configured to cause a message to be sent in response to the calculated bank deposit amount not matching the customer deposit amount received by the currency bill processing system.

88. The currency bill processing system of claim 87, wherein the processor is further configured to cause the message to be sent to a bank manager, a customer associated with the deposit transaction, or both.

\* \* \* \* \*

UNITED STATES PATENT AND TRADEMARK OFFICE
CERTIFICATE OF CORRECTION

| | | |
|---|---|---|
| PATENT NO. | : 8,625,875 B2 | Page 1 of 1 |
| APPLICATION NO. | : 13/402633 | |
| DATED | : January 7, 2014 | |
| INVENTOR(S) | : Csulits et al. | |

It is certified that error appears in the above-identified patent and that said Letters Patent is hereby corrected as shown below:

In the Claims

Column 60, Line 43, Claim 84, Line 1 delete "document."

Signed and Sealed this
Eleventh Day of November, 2014

Michelle K. Lee
*Deputy Director of the United States Patent and Trademark Office*